(12) United States Patent
Zhang et al.

(10) Patent No.: US 10,989,542 B2
(45) Date of Patent: Apr. 27, 2021

(54) ALIGNING MEASURED SIGNAL DATA WITH SLAM LOCALIZATION DATA AND USES THEREOF

(71) Applicant: Kaarta, Inc., Pittsburgh, PA (US)

(72) Inventors: Ji Zhang, Pittsburgh, PA (US); Kevin Joseph Dowling, Gibsonia, PA (US)

(73) Assignee: Kaarta, Inc., Pittsburgh, PA (US)

( * ) Notice: Subject to any disclaimer, the term of this patent is extended or adjusted under 35 U.S.C. 154(b) by 0 days.

(21) Appl. No.: 16/745,775

(22) Filed: Jan. 17, 2020

(65) Prior Publication Data

US 2020/0217666 A1 Jul. 9, 2020

Related U.S. Application Data

(63) Continuation of application No. PCT/US2018/042346, filed on Jul. 16, 2018, which is
(Continued)

(51) Int. Cl.
*G06T 17/05* (2011.01)
*G01C 21/20* (2006.01)
*G01C 21/16* (2006.01)
*G01S 5/02* (2010.01)
*H04W 4/38* (2018.01)
(Continued)

(52) U.S. Cl.
CPC ......... *G01C 21/206* (2013.01); *G01C 21/165* (2013.01); *G01S 5/0252* (2013.01); *G06T 17/05* (2013.01); *H04W 4/029* (2018.02); *H04W 4/38* (2018.02); *H04W 84/18* (2013.01)

(58) Field of Classification Search
None
See application file for complete search history.

(56) References Cited

U.S. PATENT DOCUMENTS 6,009,188 A 12/1999 Cohen et al.
6,111,582 A 8/2000 Jenkins
(Continued)

FOREIGN PATENT DOCUMENTS

CN 102508258 A 6/2012
CN 102819863 A 12/2012
(Continued)

OTHER PUBLICATIONS

"Measurement accuracy of Lidarbased SLAM systems", Sep. 2016, 1-15.
(Continued)

*Primary Examiner* — Said Broome
(74) *Attorney, Agent, or Firm* — GTC Law Group PC & Affiliates

(57) ABSTRACT

A method includes retrieving a map of a 3D geometry of an environment the map including a plurality of non-spatial attribute values each corresponding to one of a plurality of non-spatial attributes and indicative of a plurality of non-spatial sensor readings acquired throughout the environment, receiving a plurality of sensor readings from a device within the environment wherein each of the sensor readings corresponds to at least one of the non-spatial attributes and matching the plurality of received sensor readings to at least one location in the map to produce a determined sensor location.

21 Claims, 37 Drawing Sheets

Related U.S. Application Data a continuation-in-part of application No. PCT/US2018/040269, filed on Jun. 29, 2018, which is a continuation-in-part of application No. PCT/US2018/015403, filed on Jan. 26, 2018, which is a continuation-in-part of application No. PCT/US2017/055938, filed on Oct. 10, 2017, which is a continuation-in-part of application No. PCT/US2017/021120, filed on Mar. 7, 2017, said application No. PCT/US2018/015403 is a continuation of application No. PCT/US2017/021120, filed on Mar. 7, 2017, said application No. PCT/US2018/042346 is a continuation of application No. PCT/US2018/015403, filed on Jan. 26, 2018.

(60) Provisional application No. 62/527,341, filed on Jun. 30, 2017, provisional application No. 62/451,294, filed on Jan. 27, 2017, provisional application No. 62/406,910, filed on Oct. 11, 2016, provisional application No. 62/307,061, filed on Mar. 11, 2016, provisional application No. 62/533,261, filed on Jul. 17, 2017.

(51) Int. Cl.
*H04W 4/029* (2018.01)
*H04W 84/18* (2009.01)

(56) References Cited

U.S. PATENT DOCUMENTS

| | | | |
|---|---|---|---|
| D432,930 S | 10/2000 | Sanoner | |
| 6,208,347 B1 | 3/2001 | Migdal et al. | |
| 8,406,994 B1* | 3/2013 | Pu | G01C 21/26 701/408 |
| 8,996,228 B1 | 3/2015 | Ferguson et al. | |
| 9,031,809 B1 | 5/2015 | Kumar et al. | |
| 9,043,069 B1 | 5/2015 | Burnette et al. | |
| 9,143,413 B1* | 9/2015 | Manku | H04M 15/846 |
| 9,315,192 B1 | 4/2016 | Zhu et al. | |
| D823,920 S | 7/2018 | Wiegmann | |
| 2003/0001835 A1 | 1/2003 | Dimsdale et al. | |
| 2003/0160785 A1 | 8/2003 | Baumberg | |
| 2005/0168437 A1 | 8/2005 | Carl et al. | |
| 2005/0286757 A1 | 12/2005 | Zitnick et al. | |
| 2007/0097120 A1 | 5/2007 | Wheeler et al. | |
| 2007/0262988 A1 | 11/2007 | Christensen et al. | |
| 2007/0291233 A1 | 12/2007 | Culbertson et al. | |
| 2008/0033645 A1 | 2/2008 | Levinson et al. | |
| 2009/0043439 A1 | 2/2009 | Barfoot et al. | |
| 2009/0237297 A1 | 9/2009 | Davis et al. | |
| 2009/0262974 A1 | 10/2009 | Lithopoulos et al. | |
| 2010/0090899 A1 | 4/2010 | Zhao et al. | |
| 2010/0111370 A1 | 5/2010 | Black et al. | |
| 2010/0286905 A1 | 11/2010 | Goncalves et al. | |
| 2011/0134225 A1 | 6/2011 | Saint-Pierre et al. | |
| 2011/0178708 A1 | 7/2011 | Zhang et al. | |
| 2011/0282622 A1 | 11/2011 | Canter | |
| 2011/0300929 A1 | 12/2011 | Tardif et al. | |
| 2012/0123615 A1 | 5/2012 | Bourzier | |
| 2013/0085378 A1 | 4/2013 | Wedan et al. | |
| 2013/0135305 A1 | 5/2013 | Bystrov et al. | |
| 2013/0176305 A1 | 7/2013 | Ito et al. | |
| 2013/0181983 A1 | 7/2013 | Kitamura et al. | |
| 2013/0321418 A1 | 12/2013 | Kirk | |
| 2013/0325244 A1 | 12/2013 | Wang et al. | |
| 2014/0043436 A1 | 2/2014 | Bell et al. | |
| 2014/0125768 A1 | 5/2014 | Bell et al. | |
| 2014/0193040 A1 | 7/2014 | Bronshtein | |
| 2014/0214255 A1* | 7/2014 | Dolgov | G05D 1/0248 701/23 |
| 2014/0278570 A1 | 9/2014 | Plummer et al. | |
| 2014/0297092 A1 | 10/2014 | Delp | |
| 2014/0300885 A1 | 10/2014 | Debrunner et al. | |
| 2014/0300886 A1 | 10/2014 | Zogg et al. | |
| 2014/0301633 A1 | 10/2014 | Furukawa et al. | |
| 2014/0333741 A1 | 11/2014 | Nerurkar et al. | |
| 2014/0350836 A1* | 11/2014 | Stettner | G01S 17/931 701/301 |
| 2014/0379256 A1 | 12/2014 | Stipes et al. | |
| 2015/0063683 A1 | 3/2015 | Fu | |
| 2015/0063707 A1 | 3/2015 | Fu | |
| 2015/0142378 A1 | 5/2015 | Hebert et al. | |
| 2015/0317832 A1 | 11/2015 | Ebstyne et al. | |
| 2015/0331111 A1 | 11/2015 | Newman et al. | |
| 2016/0070265 A1 | 3/2016 | Liu et al. | |
| 2016/0125226 A1 | 5/2016 | Huang | |
| 2016/0140757 A1 | 5/2016 | Voth | |
| 2016/0189348 A1 | 6/2016 | Canter | |
| 2016/0234476 A1 | 8/2016 | Millett | |
| 2016/0274589 A1 | 9/2016 | Templeton et al. | |
| 2016/0349746 A1 | 12/2016 | Grau | |
| 2016/0379366 A1 | 12/2016 | Shah et al. | |
| 2017/0116781 A1 | 4/2017 | Babahajiani et al. | |
| 2017/0122736 A1 | 5/2017 | Dold et al. | |
| 2017/0123066 A1 | 5/2017 | Coddington et al. | |
| 2017/0191826 A1 | 7/2017 | Nagori et al. | |
| 2017/0208251 A1 | 7/2017 | Shamir et al. | |
| 2019/0003836 A1 | 1/2019 | Zhang et al. | |
| 2019/0235083 A1 | 8/2019 | Zhang et al. | |
| 2019/0346271 A1 | 11/2019 | Zhang et al. | |
| 2020/0142074 A1 | 5/2020 | Huber et al. | |
| 2020/0233085 A1 | 7/2020 | Zhang et al. | |
| 2020/0349761 A1 | 11/2020 | Zhang et al. | |

FOREIGN PATENT DOCUMENTS

| | | |
|---|---|---|
| CN | 104913763 A | 9/2015 |
| CN | 105164494 A | 12/2015 |
| CN | 109313024 A | 2/2019 |
| DE | 102014019671 A1 | 6/2016 |
| EP | 2133662 B1 | 2/2012 |
| EP | 3109589 A1 | 12/2016 |
| EP | 3427008 A1 | 1/2019 |
| EP | 3526626 A1 | 8/2019 |
| EP | 3574285 A1 | 12/2019 |
| EP | 3646058 A1 | 5/2020 |
| EP | 3656138 A1 | 5/2020 |
| HK | 1261850 | 1/2020 |
| JP | 2019518222 A | 6/2019 |
| JP | 2019532433 A | 11/2019 |
| JP | 2020507072 A | 3/2020 |
| WO | 2014048475 A1 | 4/2014 |
| WO | 2014120613 A1 | 8/2014 |
| WO | 2014130854 A1 | 8/2014 |
| WO | 2015105597 A2 | 7/2015 |
| WO | 2017155970 A1 | 9/2017 |
| WO | 2018071416 A1 | 4/2018 |
| WO | 2018140701 A1 | 8/2018 |
| WO | 2019006289 A1 | 1/2019 |
| WO | 2019018315 A1 | 1/2019 |
| WO | 2019099605 A1 | 5/2019 |
| WO | 2019165194 A1 | 8/2019 |
| WO | 2019178429 A1 | 9/2019 |
| WO | 2019195270 A1 | 10/2019 |
| WO | 2020009826 A1 | 1/2020 |

OTHER PUBLICATIONS

"Safety Efficiency Performance for Near Earth Flight", www.nearearth.aero, 2015, pp. 1-2.

17763885.5, "European Application Serial No. 17763885.5, Extended European Search Report dated Sep. 17, 2019", Kaarta, Inc., 7 pages.

Belfiore, "This Mobile Device Can Map Your Future Home", https://www.bloomberg.com/news/articles/2017-03-09/this-mobile-device-can-map-your-future-home, Mar. 9, 2017, 1-10.

Besl, et al., "A Method for Registration of 3-D Shapes", IEEE Transactions on Pattern Analysis and Machine Intelligence, vol. 14, No. 2, Feb. 1992, pp. 239-256.

(56) References Cited

OTHER PUBLICATIONS

Chen, et al., "Object modelling by registration of multiple range images", Image and Vision Computing, vol. 10, iss. 3, Apr. 1992, pp. 145-155.
Lopez, "Combining Object Recognition and Metric Mapping for Spatial Modeling with Mobile Robots", Master's Thesis in Computer Science at the School of Computer Science and Engineering, 2007, pp. 21-23, 44-56.
PCT/US18/40269, "International Application Serial No. PCT/US18/40269, International Preliminary Report on Patentability dated Jan. 9, 2020", Kaarta, Inc., 12 pages.
PCT/US18/40269, "International Application Serial No. PCT/US18/40269, International Search Report and Written Opinion dated Oct. 19, 2018", Kaarta, Inc., 19 Pages.
PCT/US18/40269, "International Application Serial No. PCT/US18/40269, Invitation to Pay Additional Fees and, Where Applicable, Protest Fee dated Aug. 9, 2018", Kaarta, Inc., 2 Pages.
PCT/US18/42346, "International Application Serial No. PCT/US18/42346, International Preliminary Report on Patentability dated Jan. 21, 2020", Kaarta, Inc., 11 pages.
PCT/US18/42346, "International Application Serial No. PCT/US18/42346, International Search Report and Written Opinion dated Oct. 1, 2018", Kaarta, Inc., 13 Pages.
PCT/US18/61186, "International Application Serial No. PCT/US18/61186, International Search Report and Written Opinion dated Mar. 18, 2019", Kaarta, Inc., 11 pages.
PCT/US18/61186, "International Application Serial No. PCT/US18/61186, Invitation to Pay Additional Fees and, Where Applicable, Protest Fee mailed on Jan. 16, 2019", Kaarta, Inc., 2 pages.
PCT/US19/22384, "International Application Serial No. PCT/US19/22384, International Search Report and Written Opinion dated Aug. 7, 2019", Kaarta, Inc., 14 pages.
PCT/US2017/021120, "Application Serial No. PCT/US2017/021120, International Search Report and the Written Opinion dated May 31, 2017", 8 pages.
PCT/US2017/021120, "International Application Serial No. PCT/US2017/021120, International Preliminary Report on Patentability and Written Opinion dated Sep. 20, 2018", Kaarta, Inc., 7 Pages.
PCT/US2017/055938, "Application Serial No. PCTUS2017055938, Invitation to Pay Additional Fees mailed Nov. 14, 2017", 2 Pages.
PCT/US2017/055938, "International Application Serial No. PCT/US2017/055938, International Preliminary Report on Patentability dated Apr. 25, 2019", Kaarta, Inc., 14.
PCT/US2017/055938, "International Application Serial No. PCT/US2017/055938, International Search Report and Written Opinion dated Feb. 7, 2018", Kaarta, Inc., 17 pages.
PCT/US2018/015403, "International Application Serial No. PCT/US2018/015403, International Preliminary Report on Patentability dated Aug. 8, 2019", Kaarta, Inc., 5 pages.
PCT/US2018/015403, "International Application Serial No. PCT/US2018/015403, International Search Report and Written Opinion dated Mar. 22, 2018", Kaarta, Inc., 12 Pages.
PCT/US2019/019132, "International Application Serial No. PCT/US2019/019132, International Search Report and Written Opinion dated May 14, 2019", Kaarta, Inc., 15 pages.
PCT/US2019/022384, "International Application Serial No. PCT/US2019/022384,Invitation to Pay Additional Fees mailed May 20, 2019", Kaarta, Inc., 2 pages.
PCT/US2019/025360, "International Application Serial No. PCT/US2019/025360, International Search Report and Written Opinion dated Jun. 21, 2019", Kaarta, Inc., 7 pages.

PCT/US2019/038688, "International Application Serial No. PCT/US2019/038688, International Search Report and Written Opinion dated Sep. 12, 2019", Kaarta, Inc., 12 pages.
Zhang, et al., "Laser-visual-inertial odometry and mapping with high robustness and low drift", wileyonlinelibrary.com/journal/rob, Nov. 10, 2017, pp. 1242-1264.
Zhang, et al., "Laser-visual-inertial Odometry Enabling Aggressive Motion Estimation and Mapping at High Robustness and Low Drift", sagepub.co.uk/journalsPermissions.nav DOI: 10.1177/ToBeAssigned www.sagepub.com/, Nov. 2017, pp. 1-18.
Zhang, et al., "LOAM: Lidar Odometry and Mapping in Real-time", Robotics: Science and Systems Conference, Jul. 2014, 9 pages.
Zhang, "Online Lidar and Vision based Ego-motion Estimation and Mapping", Feb. 2017, 1-130.
Zhang, "Online Mapping with a Real Earth Contour II", https://www.youtube.com/watch?v=CfsM4-x6feU, Nov. 24, 2015.
Zhang, et al., "Real-time Depth Enhanced Monocular Odometry", 2014 IEEE/RSJ International Conference on Intelligent Robots and Systems (IROS 2014), Chicago, IL, USA., Sep. 14-18, 2014, pp. 4973-4980.
Zhang, et al., "Visual-Lidar Odometry and Mapping: Low-drift, Robust, and Fast", 2015 IEEE International Conference on Robotics and Automation (ICRA), Washington State Convention Center, Seattle, Washington., May 26-30, 2015, pp. 2174-2181.
Zheng, et al., "Non-local Scan Consolidation for 3D Urban Scenes", ACM SIGGRAPH 2010. Retrieved on Jan. 20, 2018., 2010, 9 Pages.
17860192.8, "European Application Serial No. 17860192.8, Extended European Search Report dated Apr. 24, 2020", Kaarta, Inc., 12 pages.
18745179.4, "European Application Serial No. 18745179.4, Extended European Search Report dated Nov. 2, 2020", Kaarta, Inc., 10 pages.
18824609.4, "European Application Serial No. 18824609.4, Extended European Search Report dated Nov. 2, 2020", Kaarta, Inc., 12 pages.
Adler, et al., "Towards Autonomous Airborne Mapping of Urban Environments", Multisensor Fusion and Integration for Intelligent Systems (MFI), 2012 IEEE Conference, 2012, pp. 77-82.
Chen, et al., "Drogue tracking using 3D flash lidar for autonomous aerial refueling", Laser Radar Technology and Applications XVI, 2011, pp. 1-11.
PCT/US18/61186, "International Application Serial No. PCT/US18/61186, International Preliminary Report on Patentability dated May 28, 2020", Kaarta, Inc., 9 pages.
PCT/US19/22384, "International Application Serial No. PCT/US19/22384, International Preliminary Report on Patentability dated Sep. 24, 2020", Kaarta, Inc., 11 pages.
PCT/US2019/019132, "International Application Serial No. PCT/US2019/019132, International Preliminary Report on Patentability dated Sep. 3, 2020", Kaarta, Inc., 13 pages.
PCT/US2019/025360, "International Application Serial No. PCT/US2019/025360, International Preliminary Report on Patentability dated Oct. 15, 2020", Kaarta, Inc., 6 pages.
Wiemann, et al., "Automatic Construction of Polygonal Maps From Point Cloud Data", Safety Security and Rescue Robotics (SSRR), 2010 IEEE International Workshop, 2010, pp. 1-6.
U.S. Appl. No. 17/061,176, filed Oct. 1, 2020, Pending, Huber et al.
U.S. Appl. No. 17/010,045, filed Sep. 2, 2020, Pending, Huber et al.
U.S. Appl. No. 16/842,130, filed Apr. 7, 2020, Pending, Zhang et al.
U.S. Appl. No. 16/733,787, filed Jan. 3, 2020, Pending, Huber et al.

* cited by examiner

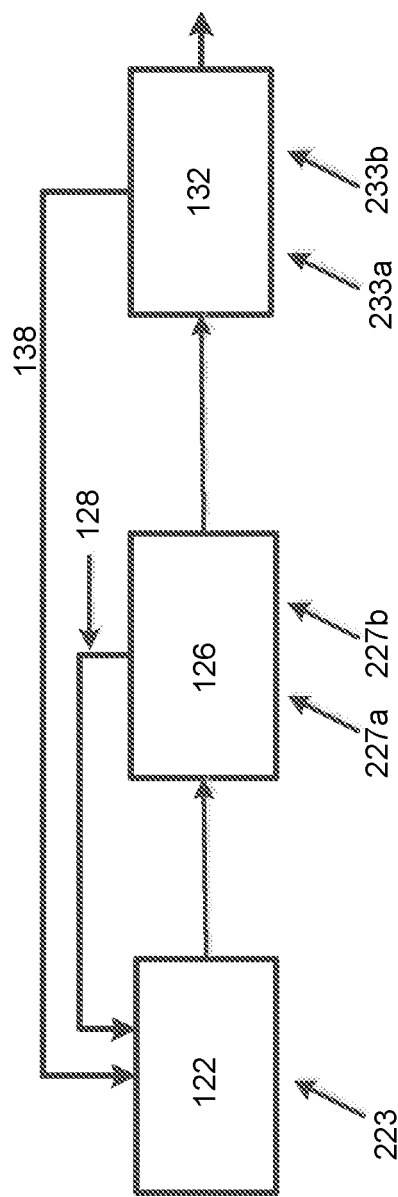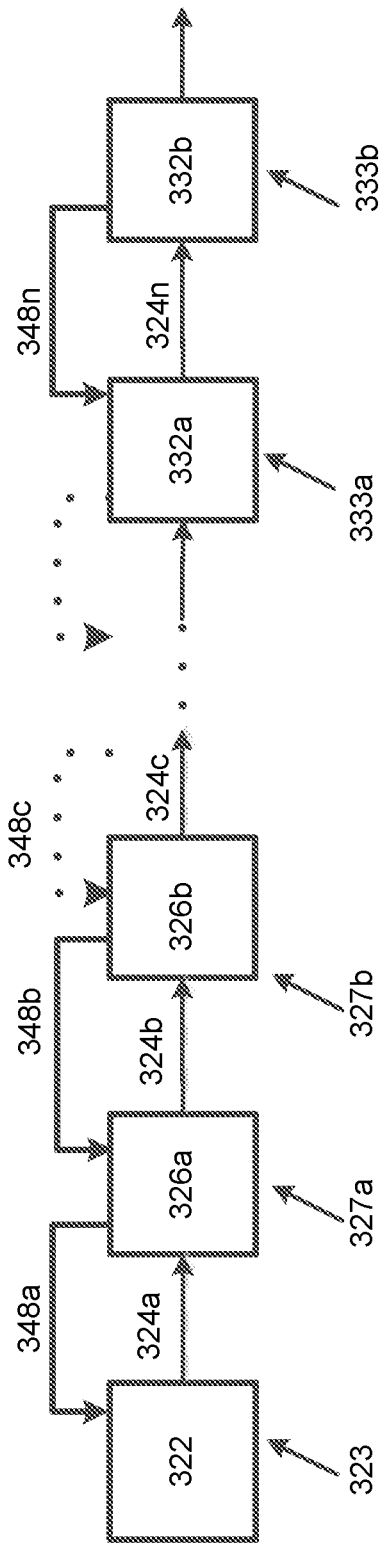

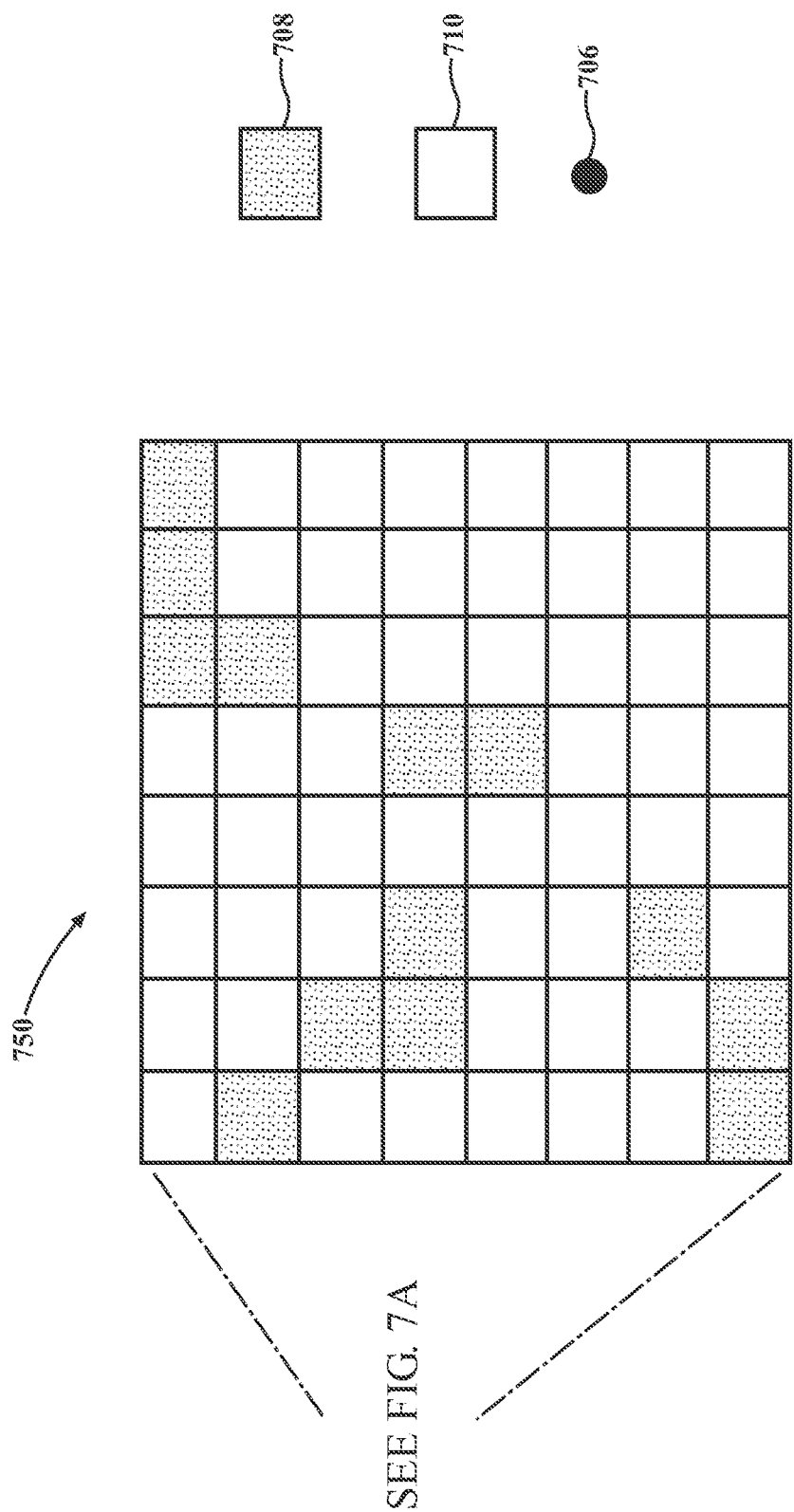

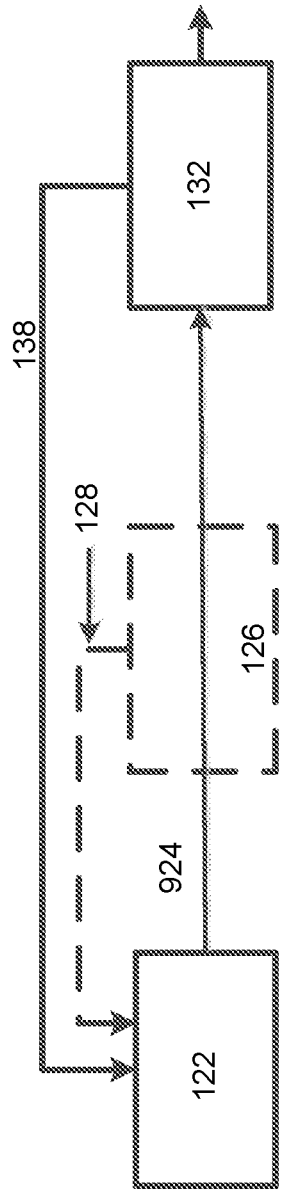
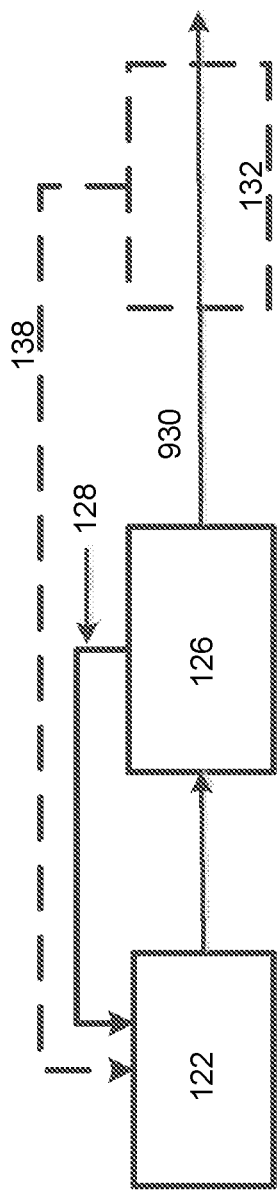
FIG. 9A
FIG. 9B

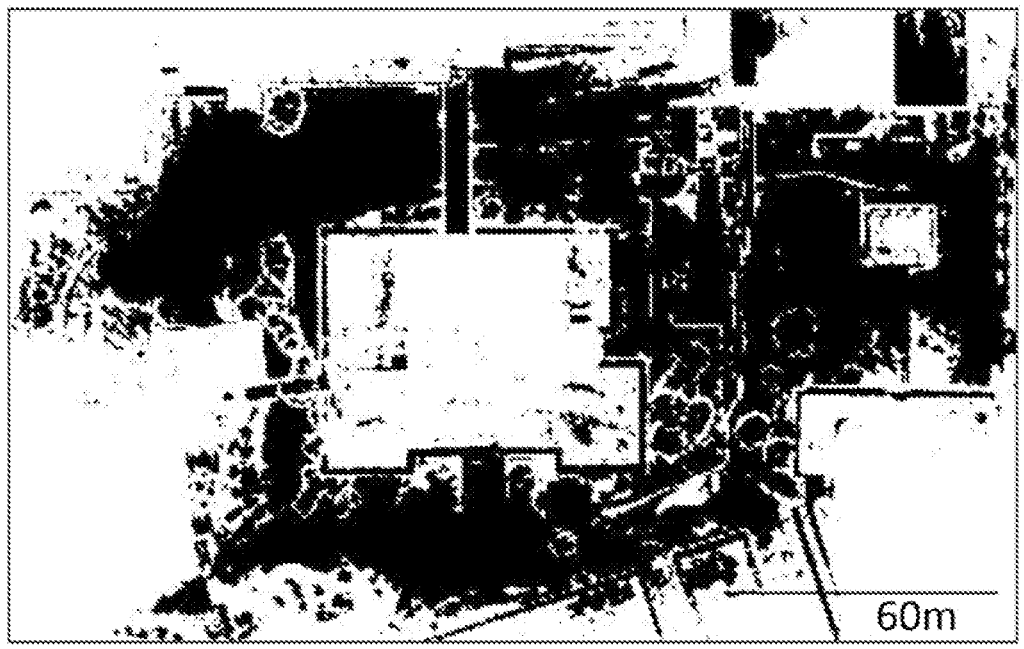
(a)
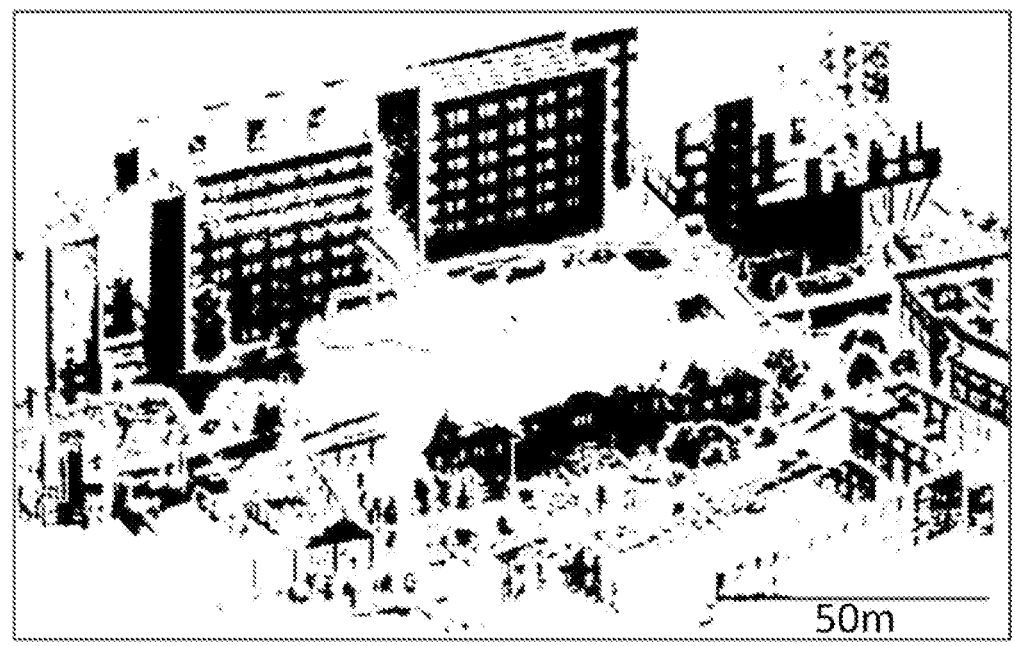
(b)
FIG. 25

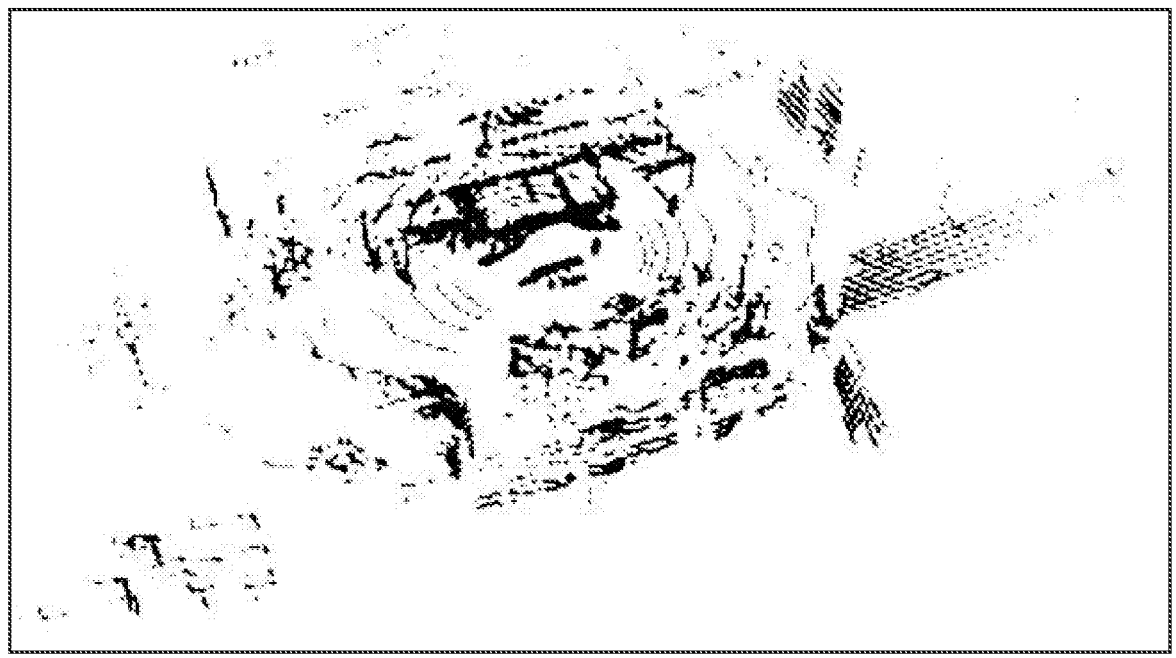
(a)
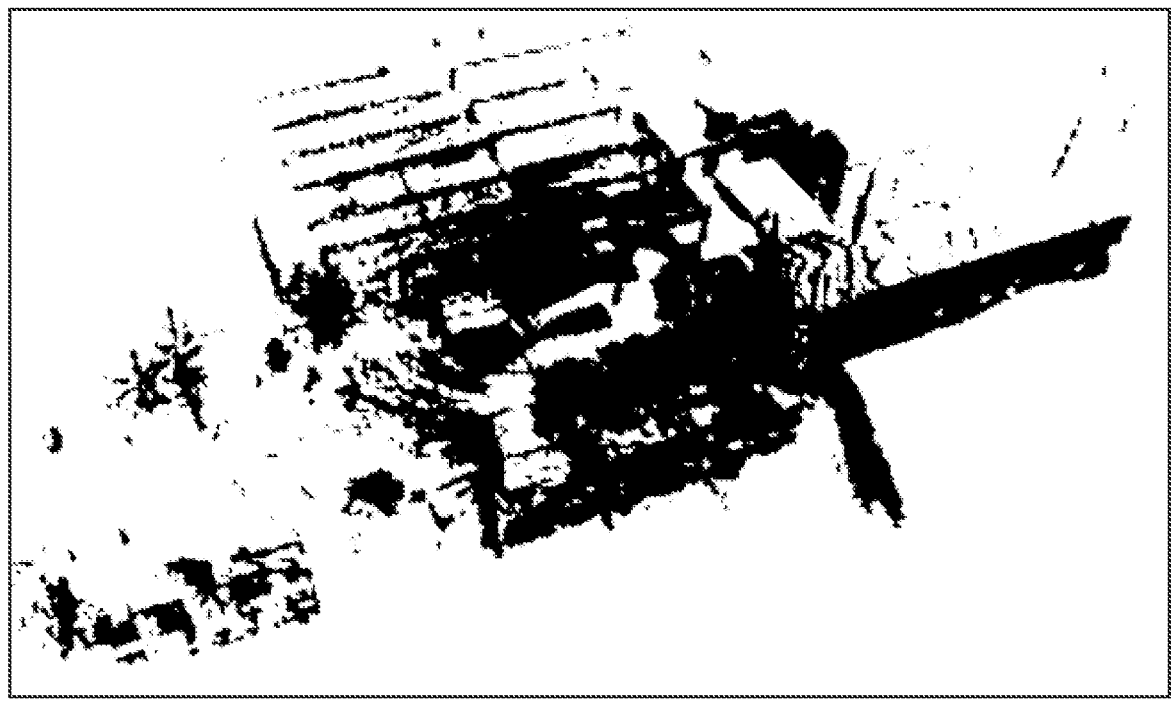
(b)
FIG. 28

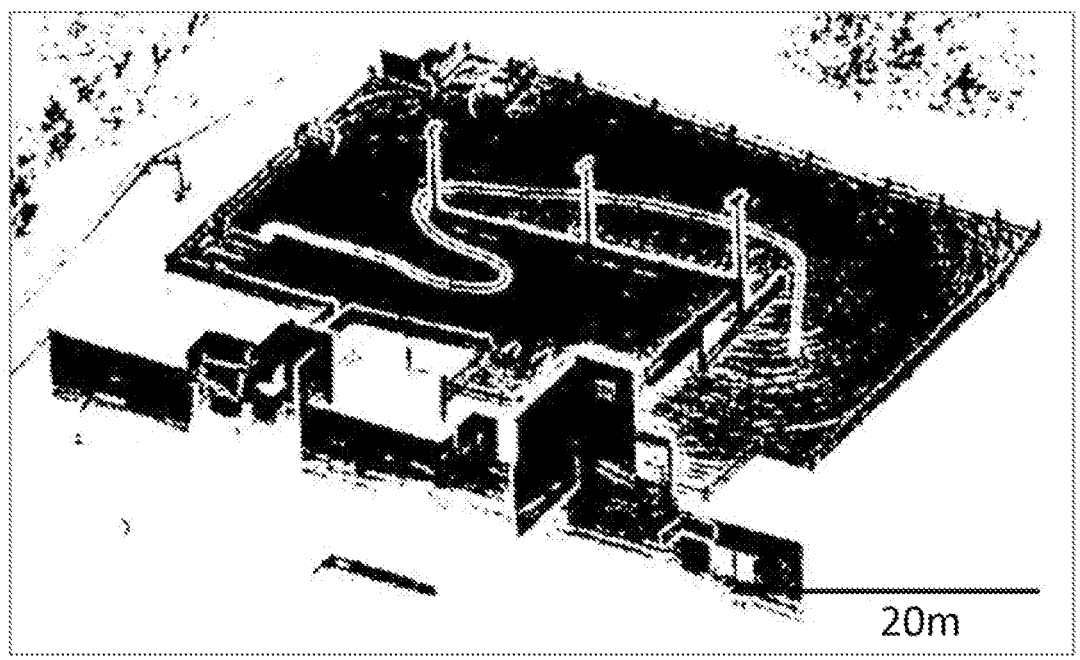
(a)
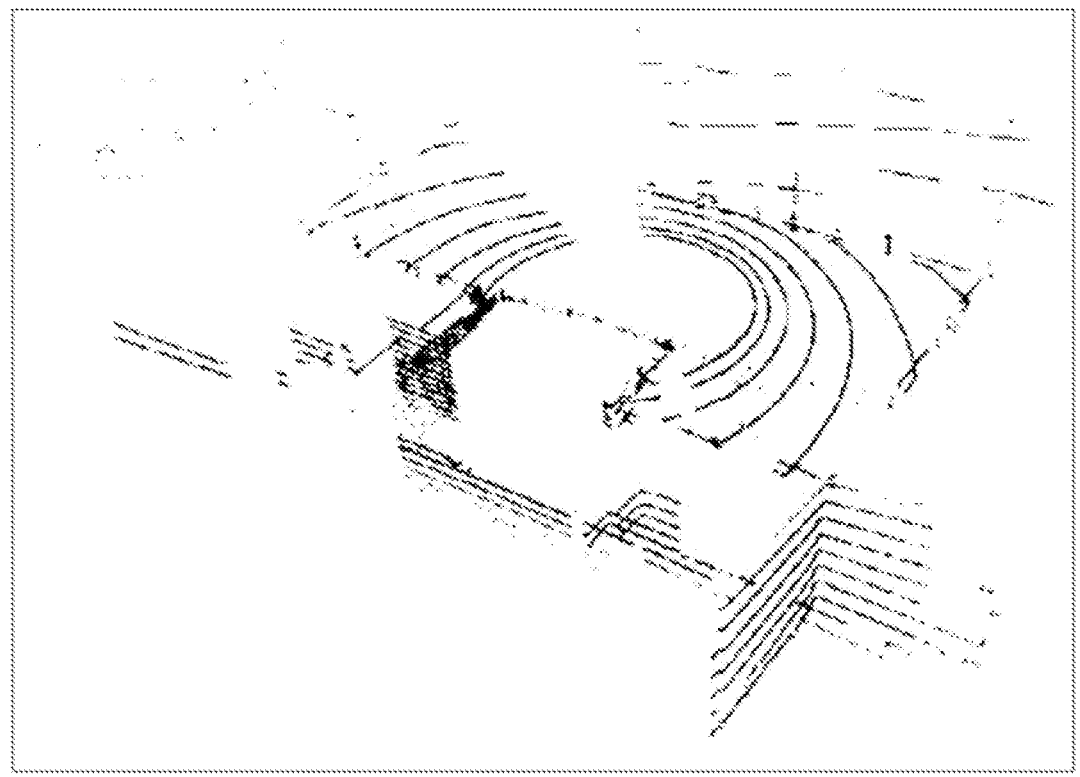
(b)
FIG. 30

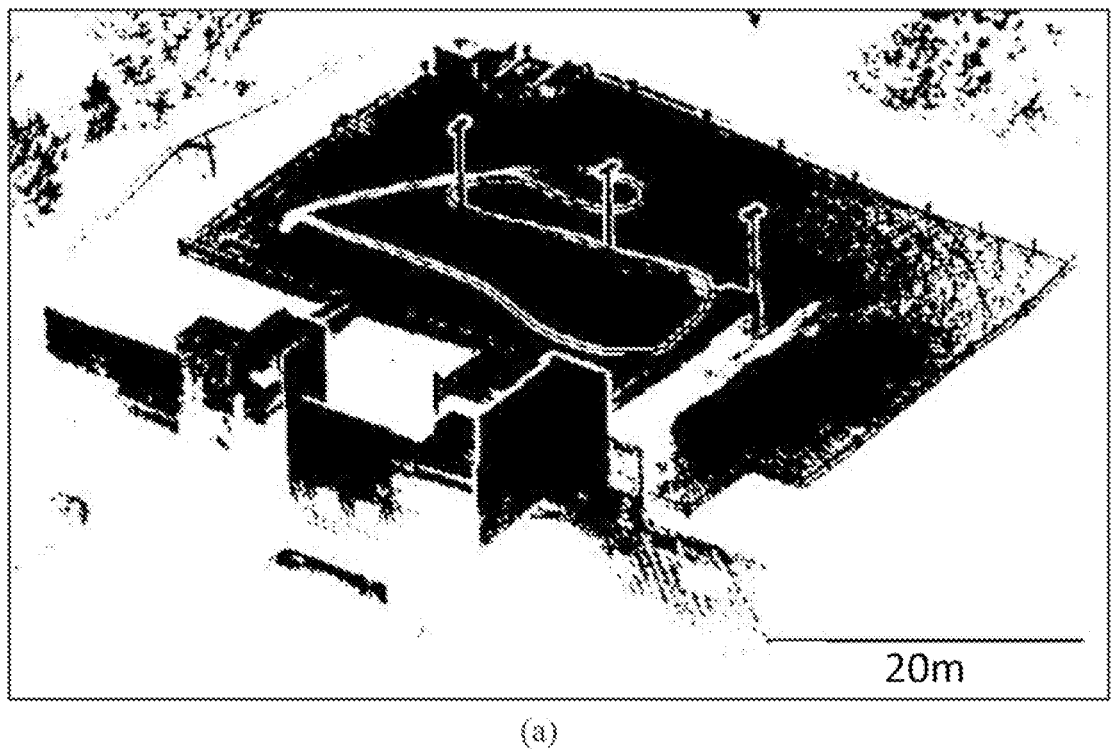
(a)
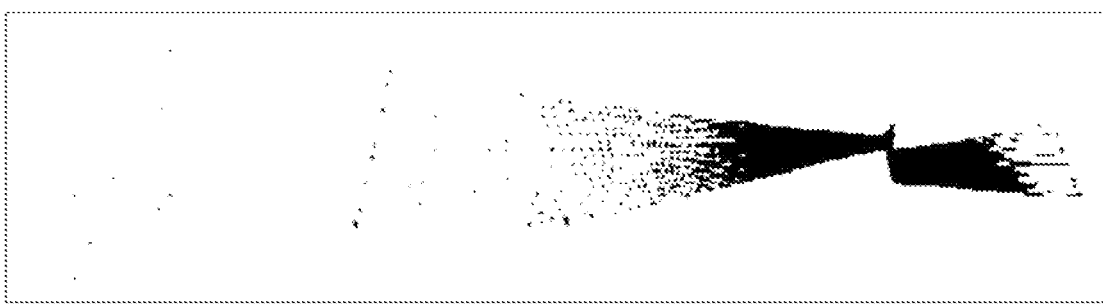
(b)
FIG. 31

(a)
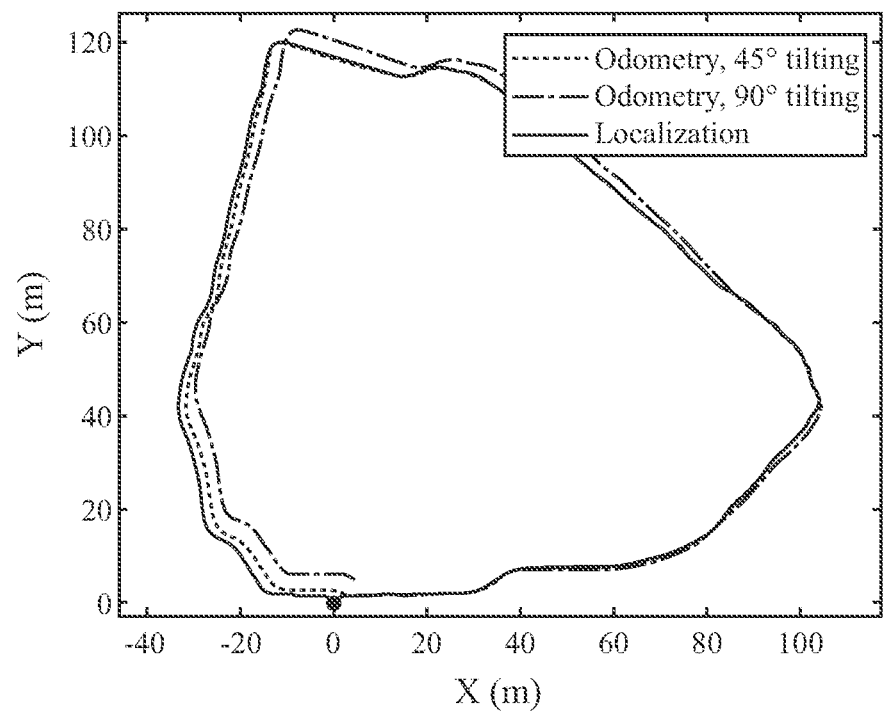
(b)
FIG. 32

ALIGNING MEASURED SIGNAL DATA WITH SLAM LOCALIZATION DATA AND USES THEREOF

STATEMENT OF PRIORITY

This application claims priority to, and is a bypass continuation of PCT Application No. PCT/US18/42346 entitled "ALIGNING MEASURED SIGNAL DATA WITH SLAM LOCALIZATION DATA AND USES THEREOF", filed Jul. 16, 2018. PCT/US18/42346 is a continuation-in-part of, and claims priority to, PCT Application No. PCT/US18/40269 entitled "SYSTEMS AND METHODS FOR IMPROVEMENTS IN SCANNING AND MAPPING," filed on Jun. 29, 2018. PCT Application No. PCT/US18/40269 claims the benefit of U.S. Provisional Patent Application Ser. No. 62/527,341, entitled "SYSTEMS AND METHODS FOR IMPROVEMENTS IN SCANNING AND MAPPING," filed on Jun. 30, 2017.

PCT Application No. PCT/US18/40269 claims priority to, and is a continuation-in-part of, PCT Application No. PCT/US2018/015403 entitled "LASER SCANNER WITH REAL-TIME, ONLINE EGO-MOTION ESTIMATION," filed on Jan. 26, 2018. PCT Application No. PCT/US18/15403 claims the benefit of U.S. Provisional Patent Application Ser. No. 62/451,294, entitled "LIDAR AND VISION-BASED EGO-MOTION ESTIMATION AND MAPPING," filed on Jan. 27, 2017.

PCT Application No. PCT/US2018/015403 claims priority to, and is a continuation-in-part of, PCT Application No. PCT/US17/55938 entitled "LASER SCANNER WITH REAL-TIME, ONLINE EGO-MOTION ESTIMATION," filed on Oct. 10, 2017.

PCT Application No. PCT/US2017/055938 claims priority to, and is a continuation-in-part of, PCT Application No. PCT/US2017/021120 entitled "LASER SCANNER WITH REAL-TIME, ONLINE EGO-MOTION ESTIMATION," filed on Mar. 7, 2017.

PCT Application No. PCT/US2018/015403 claims priority to PCT Application No. PCT/US2017/021120. PCT Application No. PCT/US2017/055938 further claims priority to U.S. Provisional No. 62/406,910, entitled "LASER SCANNER WITH REAL-TIME, ONLINE EGO-MOTION ESTIMATION," filed on Oct. 11, 2016.

PCT Application No. PCT/US2017/021120 claims the benefit of U.S. Provisional Patent Application Ser. No. 62/307,061, entitled "LASER SCANNER WITH REAL-TIME, ONLINE EGO-MOTION ESTIMATION," filed on Mar. 11, 2016.

PCT Application No. PCT/US18/42346 claims the benefit of U.S. Provisional Patent Application Ser. No. 62/533,261, entitled "ALIGNING MEASURED SIGNAL DATA WITH SLAM LOCALIZATION DATA AND USES THEREOF," filed on Jul. 17, 2017, the disclosure of which is incorporated herein by reference in its entirety and for all purposes.

PCT Application No. PCT/US18/42346 claims priority to PCT Application No. PCT/US2018/015403, filed Jan. 26, 2018.

The disclosures of all patents and applications referred to herein are incorporated herein by reference in their entireties and for all purposes.

BACKGROUND

A primary means of finding outdoor location are satellite-based radio navigation systems such as the Global Positioning System (GPS) or similar systems such as GLONASS, Galileo, Baidu Navigation Satellite System, and NAVIC. These systems are constellations of satellites that use radio-navigation to provide position on or near the surface of the Earth. However due to attenuation by walls, roofs, and structures determining position is poor or non-existent in indoor spaces. Thus, for indoor navigation other methods have been proposed and implemented using infrastructure, self-estimates such as odometry, and external sources such as passive (barcodes) or active beacons (RF, IR, etc).

Just as satellite systems such as GPS are used to find one's location and path outdoors, it would be of great practical use to be able to find indoor locations of people, objects, automated vehicles, robots, and the like. Position information can be used in many applications to find a particular location and providing a path to get to/from that location.

SUMMARY

In accordance with an exemplary and non-limiting embodiment, a method comprises retrieving a map of a 3D geometry of an environment the map comprising a plurality of non-spatial attribute values each corresponding to one of a plurality of non-spatial attributes and indicative of a plurality of non-spatial sensor readings acquired throughout the environment, receiving a plurality of sensor readings from a device within the environment wherein each of the sensor readings corresponds to at least one of the non-spatial attributes and matching the plurality of received sensor readings to at least one location in the map to produce a determined sensor location.

In accordance with an exemplary and non-limiting embodiment, a system comprises a device comprising at least one sensor the device adapted to receive a plurality of sensor readings within an environment wherein each of the sensor readings corresponds to at least one non-spatial attribute and a processor adapted to retrieve a map of a 3D geometry of an environment the map comprising a plurality of non-spatial attribute values each corresponding to one of a plurality of non-spatial attributes and indicative of a plurality of non-spatial sensor readings acquired throughout the environment and further adapted to match the plurality of received sensor readings to at least one location in the map to produce a determined sensor location.

In accordance with an exemplary and non-limiting embodiment, a method comprises accessing a map comprising a point cloud of an environment comprising a plurality of non-spatial attribute values, receiving, for each of a plurality of non-spatial attributes, a plurality of non-spatial sensor readings within the environment and referencing the received plurality of non-spatial sensor readings to the map resulting in a referenced heat map.

In accordance with an exemplary and non-limiting embodiment, a system comprises a device adapted to produce a map comprising a point cloud of an environment comprising a plurality of non-spatial attribute values and further adapted to measure, for each of a plurality of non-spatial attributes, a plurality of non-spatial sensor readings and a processor adapted to reference the measured plurality of non-spatial sensor readings to the map resulting in a referenced heat map.

In accordance with an exemplary and non-limiting embodiment, a method comprises accessing a map of a 3D geometry of an environment the map comprising a plurality of non-spatial attribute values each corresponding to a non-spatial attribute and indicative of a plurality of non-spatial sensor readings acquired throughout the environment from a plurality of signal emitters, receiving a plurality of sensor readings from a device within the environment wherein each of the sensor readings corresponds to the non-spatial attribute, creating a heat map of the sensor readings referenced to the map and generating a recommended position of at least one signal emitter based, at least in part, on the heat map.

In accordance with an exemplary and non-limiting embodiment, a system comprises a device adapted to produce a map of a 3D geometry of an environment the map comprising a plurality of non-spatial attribute values each corresponding to a non-spatial attribute and indicative of a plurality of non-spatial sensor readings acquired throughout the environment from a plurality of signal emitters and receive a plurality of sensor readings within the environment wherein each of the sensor readings corresponds to the non-spatial attribute and a processor adapted to create a heat map of the sensor readings referenced to the map and generate a recommended position of at least one signal emitter based, at least in part, on the heat map.

In accordance with an exemplary and non-limiting embodiment, a method comprises retrieving a map of a 3D geometry of an environment the map comprising a plurality of non-spatial attribute values each corresponding to one of a plurality of non-spatial attributes and indicative of a plurality of non-spatial sensor readings acquired throughout the environment, receiving a plurality of sensor readings from a device within the environment wherein each of the sensor readings corresponds to at least one of the non-spatial attributes, matching the plurality of received sensor readings to at least one location in the map to produce a determined sensor location, retrieving additional sensor data from the determined sensor location and comparing the additional sensor data to data derived from the map.

In accordance with an exemplary and non-limiting embodiment, a system comprises a device adapted to produce a map of a 3D geometry of an environment the map comprising a plurality of non-spatial attribute values each corresponding to a non-spatial attribute and indicative of a plurality of non-spatial sensor readings acquired throughout the environment from a plurality of signal emitters and receive a plurality of sensor readings within the environment wherein each of the sensor readings corresponds to the non-spatial attribute and a processor adapted to match the plurality of received sensor readings to at least one location in the map to produce a determined sensor location and retrieving additional sensor data from the determined sensor location and compare the additional sensor data to data derived from the map.

BRIEF DESCRIPTION OF THE FIGURES

FIG. 2 illustrates an embodiment a block diagram of the three computational modules and their respective feedback features of the mapping system of FIG. 1.

FIG. 3 illustrates an embodiment of a Kalmann filter model for refining positional information into a map.

FIG. 7B illustrates an embodiment of a small area map having fine detail resolution.

FIG. 9A illustrates an embodiment of a block diagram of the three computational modules in which feedback data from the visual-inertial odometry unit is suppressed due to data degradation.

FIG. 9B illustrates an embodiment of the three computational modules in which feedback data from the scan matching unit is suppressed due to data degradation.

FIG. 25 illustrates an exemplary and non-limiting embodiment of air-ground collaborative mapping.

FIG. 28 illustrates an exemplary and non-limiting embodiment of a comparison of scans involved in odometry estimation and localization.

FIG. 30 illustrates an exemplary and non-limiting embodiment of a horizontally orientated sensor test.

FIG. 31 illustrates an exemplary and non-limiting embodiment of a vertically orientated sensor test.

FIG. 32 illustrates an exemplary and non-limiting embodiment of an accuracy comparison between horizontally orientated and downward tilted sensor tests.

DETAILED DESCRIPTION

Figure 1:
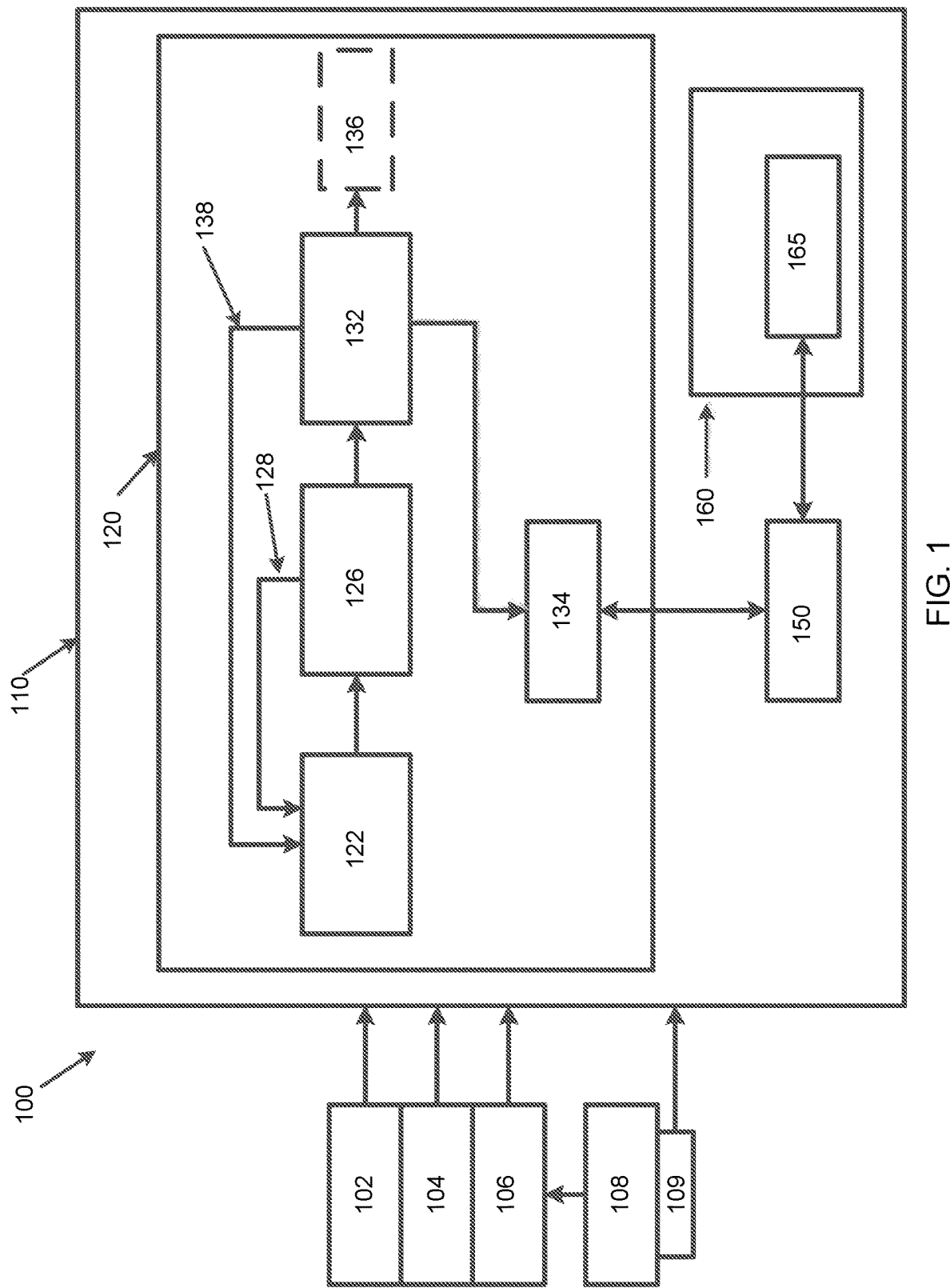
FIG. 1 illustrates a block diagram of an embodiment of a mapping system.

In one general aspect, the present invention is directed to a mobile, computer-based mapping system that estimates changes in position over time (an odometer) and/or generates a three-dimensional map representation, such as a point cloud, of a three-dimensional space. The mapping system may include, without limitation, a plurality of sensors including an inertial measurement unit (IMU), a camera, and/or a 3D laser scanner. It also may comprise a computer system, having at least one processor, in communication with the plurality of sensors, configured to process the outputs from the sensors in order to estimate the change in position of the system over time and/or generate the map representation of the surrounding environment. The mapping system may enable high-frequency, low-latency, on-line, real-time ego-motion estimation, along with dense, accurate 3D map registration. Embodiments of the present disclosure may include a simultaneous location and mapping (SLAM) system. The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In one embodiment, the resolution of the position and motion of the mobile mapping system may be sequentially refined in a series of coarse-to-fine updates. In a non-limiting example, discrete computational modules may be used to update the position and motion of the mobile mapping system from a coarse resolution having a rapid update rate, to a fine resolution having a slower update rate. For example, an IMU device may provide data to a first computational module to predict a motion or position of the mapping system at a high update rate. A visual-inertial odometry system may provide data to a second computational module to improve the motion or position resolution of the mapping system at a lower update rate. Additionally, a laser scanner may provide data to a third computational, scan matching module to further refine the motion estimates and register maps at a still lower update rate. In one non-limiting example, data from a computational module configured to process fine positional and/or motion resolution data may be fed back to computational modules configured to process more coarse positional and/or motion resolution data. In another non-limiting example, the computational modules may incorporate fault tolerance to address issues of sensor degradation by automatically bypassing computational modules associated with sensors sourcing faulty, erroneous, incomplete, or non-existent data. Thus, the mapping system may operate in the presence of highly dynamic motion as well as in dark, texture-less, and structure-less environments.

In contrast to existing map-generating techniques, which are mostly off-line batch systems, the mapping system disclosed herein can operate in real-time and generate maps while in motion. This capability offers two practical advantages. First, users are not limited to scanners that are fixed on a tripod or other nonstationary mounting. Instead, the mapping system disclosed herein may be associated with a mobile device, thereby increasing the range of the environment that may be mapped in real-time. Second, the real-time feature can give users feedback for currently mapped areas while data are collected. The online generated maps can also assist robots or other devices for autonomous navigation and obstacle avoidance. In some non-limiting embodiments, such navigation capabilities may be incorporated into the mapping system itself. In alternative non-limiting embodiments, the map data may be provided to additional robots having navigation capabilities that may require an externally sourced map.

There are several potential applications for the sensor, such as 3D modeling, scene mapping, and environment reasoning. The mapping system can provide point cloud maps for other algorithms that take point clouds as input for further processing. Further, the mapping system can work both indoors and outdoors. Such embodiments do not require external lighting and can operate in darkness. Embodiments that have a camera can handle rapid motion, and can colorize laser point clouds with images from the camera, although external lighting may be required. The SLAM system can build and maintain a point cloud in real time as a user is moving through an environment, such as when walking, biking, driving, flying, and combinations thereof. A map is constructed in real time as the mapper progresses through an environment. The SLAM system can track thousands of features as points. As the mapper moves, the points are tracked to allow estimation of motion. Thus, the SLAM system operates in real time and without dependence on external location technologies, such as GPS. In embodiments, a plurality (in most cases, a very large number) of features of an environment, such as objects, are used as points for triangulation, and the system performs and updates many location and orientation calculations in real time to maintain an accurate, current estimate of position and orientation as the SLAM system moves through an environment. In embodiments, relative motion of features within the environment can be used to differentiate fixed features (such as walls, doors, windows, furniture, fixtures and the like) from moving features (such as people, vehicles, and other moving items), so that the fixed features can be used for position and orientation calculations. Underwater SLAM systems may use blue-green lasers to reduce attenuation.

The mapping system design follows an observation: drift in egomotion estimation has a lower frequency than a module's own frequency. The three computational modules are therefore arranged in decreasing order of frequency. High-frequency modules are specialized to handle aggressive motion, while low-frequency modules cancel drift for the previous modules. The sequential processing also favors computation: modules in the front take less computation and execute at high frequencies, giving sufficient time to modules in the back for thorough processing. The mapping system is therefore able to achieve a high level of accuracy while running online in real-time.

Further, the system may be configured to handle sensor degradation. If the camera is non-functional (for example, due to darkness, dramatic lighting changes, or texture-less environments) or if the laser is non-functional (for example due to structure-less environments) the corresponding module may be bypassed and the rest of the system may be staggered to function reliably. Specifically, in some exemplary embodiments, the proposed pipeline automatically determines a degraded subspace in the problem state space, and solves the problem partially in the well-conditioned subspace. Consequently, the final solution is formed by combination of the "healthy" parts from each module. As a result, the resulting combination of modules used to produce an output is neither simply a linear or non-linear combination of module outputs. In some exemplary embodiments, the output reflect a bypass of one or more entire modules in combination with a linear or non-linear combination of the remaining functioning modules. The system was tested through a large number of experiments and results show that it can produce high accuracy over several kilometers of navigation and robustness with respect to environmental degradation and aggressive motion.

The modularized mapping system, disclosed below, is configured to process data from range, vision, and inertial sensors for motion estimation and mapping by using a multi-layer optimization structure. The modularized mapping system may achieve high accuracy, robustness, and low drift by incorporating features which may include:

an ability to dynamically reconfigure the computational modules;

an ability to fully or partially bypass failure modes in the computational modules, and combine the data from the remaining modules in a manner to handle sensor and/or sensor data degradation, thereby addressing environmentally induced data degradation and the aggressive motion of the mobile mapping system; and an ability to integrate the computational module cooperatively to provide real-time performance.

Disclosed herein is a mapping system for online ego-motion estimation with data from a 3D laser, a camera, and an IMU. The estimated motion further registers laser points to build a map of the traversed environment. In many real-world applications, ego-motion estimation and mapping must be conducted in real-time. In an autonomous navigation system, the map may be crucial for motion planning and obstacle avoidance, while the motion estimation is important for vehicle control and maneuver.

FIG. 1 depicts a simplified block diagram of a mapping system 100 according to one embodiment of the present invention. Although specific components are disclosed below, such components are presented solely as examples and are not limiting with respect to other, equivalent, or similar components. The illustrated system includes an IMU system 102 such as an Xsens® MTi-30 IMU, a camera system 104 such as an IDS® UI-1220SE monochrome camera, and a laser scanner 106 such as a Velodyne PUCK™ VLP-16 laser scanner. The IMU 102 may provide inertial motion data derived from one or more of an x-y-z accelerometer, a roll-pitch-yaw gyroscope, and a magnetometer, and provide inertial data at a first frequency. In some non-limiting examples, the first frequency may be about 200 Hz. The camera system 104 may have a resolution of about 752×480 pixels, a 76° horizontal field of view (FOV), and a frame capture rate at a second frequency. In some non-limiting examples, the frame capture rate may operate at a second frequency of about 50 Hz. The laser scanner 106 may have a 360° horizontal FOV, a 30° vertical FOV, and receive 0.3 million points/second at a third frequency representing the laser spinning rate. In some non-limiting examples, the third frequency may be about 5 Hz. As depicted in FIG. 1, the laser scanner 106 may be connected to a motor 108 incorporating an encoder 109 to measure a motor rotation angle. In one non-limiting example, the laser motor encoder 109 may operate with a resolution of about 0.25°.

The IMU 102, camera 104, laser scanner 106, and laser scanner motor encoder 109 may be in data communication with a computer system 110, which may be any computing device, having one or more processors 134 and associated memory 120, 160, having sufficient processing power and memory for performing the desired odometry and/or mapping. For example, a laptop computer with 2.6 GHz i7quad-core processor (2 threads on each core and 8 threads overall) and an integrated GPU memory could be used. In addition, the computer system may have one or more types of primary or dynamic memory 120 such as RAM, and one or more types of secondary or storage memory 160 such as a hard disk or a flash ROM. Although specific computational modules (IMU module 122, visual-inertial odometry module 126, and laser scanning module 132) are disclosed above, it should be recognized that such modules are merely exemplary modules having the functions as described above, and are not limiting. Similarly, the type of computing device 110 disclosed above is merely an example of a type of computing device that may be used with such sensors and for the purposes as disclosed herein, and is in no way limiting.

As illustrated in FIG. 1, the mapping system 100 incorporates a computational model comprising individual computational modules that sequentially recover motion in a coarse-to-fine manner (see also FIG. 2). Starting with motion prediction from an IMU 102 (IMU prediction module 122), a visual-inertial tightly coupled method (visual-inertial odometry module 126) estimates motion and registers laser points locally. Then, a scan matching method (scan matching refinement module 132) further refines the estimated motion. The scan matching refinement module 132 also registers point cloud data 165 to build a map (voxel map 134). The map also may be used by the mapping system as part of an optional navigation system 136. It may be recognized that the navigation system 136 may be included as a computational module within the onboard computer system, the primary memory, or may comprise a separate system entirely.

It may be recognized that each computational module may process data from one of each of the sensor systems. Thus, the IMU prediction module 122 produces a coarse map from data derived from the IMU system 102, the visual-inertial odometry module 126 processes the more refined data from the camera system 104, and the scan matching refinement module 132 processes the most fine-grained resolution data from the laser scanner 106 and the motor encoder 109. In addition, each of the finer-grained resolution modules further process data presented from a coarser-grained module. The visual-inertial odometry module 126 refines mapping data received from and calculated by the IMU prediction module 122. Similarly, the scan matching refinement module 132, further processes data presented by the visual inertial odometry module 126. As disclosed above, each of the sensor systems acquires data at a different rate. In one non-limiting example, the IMU 102 may update its data acquisition at a rate of about 200 Hz, the camera 104 may update its data acquisition at a rate of about 50 Hz, and the laser scanner 106 may update its data acquisition at a rate of about 5 Hz. These rates are non-limiting and may, for example, reflect the data acquisition rates of the respective sensors. It may be recognized that coarse-grained data may be acquired at a faster rate than more fine-grained data, and the coarse-grained data may also be processed at a faster rate than the fine-grained data. Although specific frequency values for the data acquisition and processing by the various computation modules are disclosed above, neither the absolute frequencies nor their relative frequencies are limiting.

The mapping and/or navigational data may also be considered to comprise coarse level data and fine level data. Thus, in the primary memory (dynamic memory 120), coarse positional data may be stored in a voxel map 134 that may be accessible by any of the computational modules 122, 126, 132. File detailed mapping data, as point cloud data 165 that may be produced by the scan matching refinement module 132, may be stored via the processor 150 in a secondary memory 160, such as a hard drive, flash drive, or other more permanent memory.

Not only are coarse-grained data used by the computational modules for more fine-grained computations, but both the visual-inertial odometry module 126 and the scan matching refinement module 132 (fine-grade positional information and mapping) can feed back their more refined mapping data to the IMU prediction module 122 via respective feedback paths 128 and 138 as a basis for updating the IMU position prediction. In this manner, coarse positional and mapping data may be sequentially refined in resolution, and the refined resolution data serve as feed-back references for the more coarse resolution computations.

FIG. 2 depicts a block diagram of the three computational modules along with their respective data paths. The IMU prediction module 122 may receive IMU positional data 223 from the IMU (102, FIG. 1). The visual-inertial odometry module 126 may receive the model data from the IMU prediction module 122 as well as visual data from one or more individually tracked visual features 227a, 227b from the camera (104, FIG. 1). The laser scanner (106, FIG. 1) may produce data related to laser determined landmarks 233a, 233b, which may be supplied to the scan matching refinement module 132 in addition to the positional data supplied by the visual-inertial odometry module 126. The positional estimation model from the visual-inertial odometry module 126 may be fed back 128 to refine the positional model calculated by the IMU prediction module 122. Similarly, the refined map data from the scan matching refinement module 132 may be fed back 138 to provide additional correction to the positional model calculated by the IMU prediction module 122.

As depicted in FIG. 2, and as disclosed above, the modularized mapping system may sequentially recover and refine motion related data in a coarse-to-fine manner. Additionally, the data processing of each module may be determined by the data acquisition and processing rate of each of the devices sourcing the data to the modules. Starting with motion prediction from an IMU, a visual-inertial tightly coupled method estimates motion and registers laser points locally. Then, a scan matching method further refines the estimated motion. The scan matching refinement module may also register point clouds to build a map. As a result, the mapping system is time optimized to process each refinement phase as data become available.

FIG. 3 illustrates a standard Kalman filter model based on data derived from the same sensor types as depicted in FIG. 1. As illustrated in FIG. 3, the Kalman filter model updates positional and/or mapping data upon receipt of any data from any of the sensors regardless of the resolution capabilities of the data. Thus, for example, the positional information may be updated using the visual-inertial odometry data at any time such data become available regardless of the state of the positional information estimate based on the IMU data. The Kalman filter model therefore does not take advantage of the relative resolution of each type of measurement. FIG. 3 depicts a block diagram of a standard Kalman filter based method for optimizing positional data. The Kalman filter updates a positional model 322a-322n sequentially as data are presented. Thus, starting with an initial positional prediction model 322a, the Kalman filter may predict 324a the subsequent positional model 322b. which may be refined based on the receive IMU mechanization data 323. The positional prediction model may be updated 322b in response to the IMU mechanization data 323. in a prediction step 324a followed by update steps seeded with individual visual features or laser landmarks.

Figure 4:
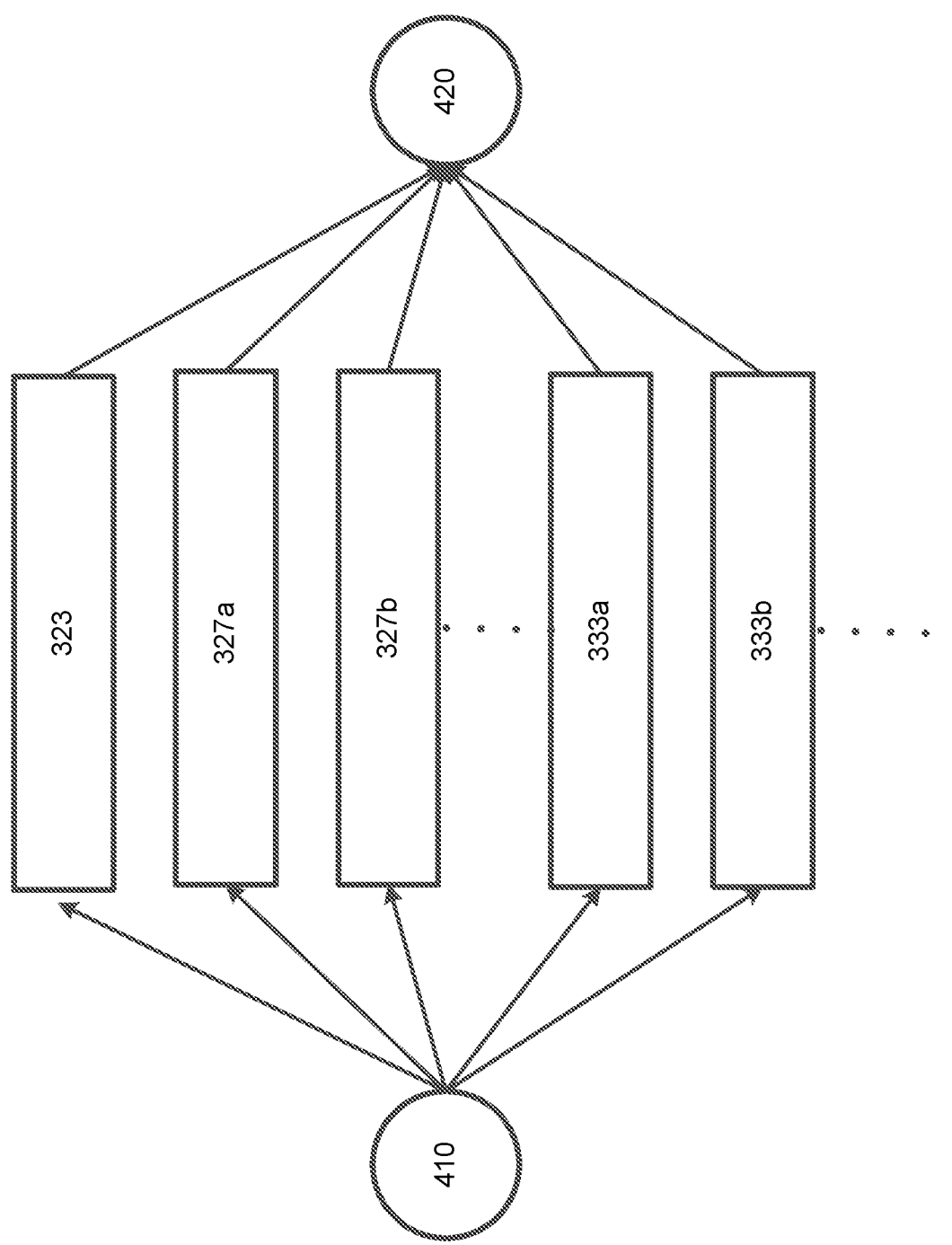
FIG. 4 illustrates an embodiment of a factor graph optimization model for refining positional information into a map.

FIG. 4 depicts positional optimization based on a factor-graph method. In this method, a pose of a mobile mapping system at a first time 410 may be updated upon receipt of data to a pose at a second time 420. A factor-graph optimization model combines constraints from all sensors during each refinement calculation. Thus, IMU data 323, feature data 327a, 327b, and similar from the camera, and laser landmark data 333a, 333b, and similar, are all used for each update step. It may be appreciated that such a method increases the computational complexity for each positional refinement step due to the large amount of data required. Further, since the sensors may provide data at independent rates that may differ by orders of magnitude, the entire refinement step is time bound to the data acquisition time for the slowest sensor. As a result, such a model may not be suitable for fast real-time mapping. The modularized system depicted in FIGS. 1 and 2 sequentially recovers motion in a coarse-to-fine manner. In this manner, the degree of motion refinement is determined by the availability of each type of data.

Assumptions, Coordinates, and Problem

Assumptions and Coordinate Systems

As depicted above in FIG. 1, a sensor system of a mobile mapping system may include a laser 106, a camera 104, and an IMU 102. The camera may be modeled as a pinhole camera model for which the intrinsic parameters are known. The extrinsic parameters among all of the three sensors may be calibrated. The relative pose between the camera and the laser and the relative pose between the laser and the IMU may be determined according to methods known in the art. A single coordinate system may be used for the camera and the laser. In one non-limiting example, the camera coordinate system may be used, and all laser points may be projected into the camera coordinate system in pre-processing. In one non-limiting example, the IMU coordinate system may be parallel to the camera coordinate system and thus the IMU measurements may be rotationally corrected upon acquisition. The coordinate systems may be defined as follows:

the camera coordinate system $\{C\}$ may originate at the camera optical center, in which the x-axis points to the left, the y-axis points upward, and the z-axis points forward coinciding with the camera principal axis;

the IMU coordinate system {I} may originate at the IMU measurement center, in which the x-, y-, and z-axes are parallel to {C} and pointing in the same directions; and the world coordinate system {W} may be the coordinate system coinciding with {C} at the starting pose.

In accordance with some exemplary embodiments the landmark positions are not necessarily optimized. As a result, there remain six unknowns in the state space thus keeping computation intensity low. The disclosed method involves laser range measurements to provide precise depth information to features, warranting motion estimation accuracy while further optimizing the features' depth in a bundle. One need only optimize some portion of these measurements as further optimization may result in diminishing returns in certain circumstances.

In accordance with exemplary and non-limiting embodiments, calibration of the described system may be based, at least in part, on the mechanical geometry of the system. Specifically, the LIDAR may be calibrated relative to the motor shaft using mechanical measurements from the CAD model of the system for geometric relationships between the lidar and the motor shaft. Such calibration as is obtained with reference to the CAD model has been shown to provide high accuracy and drift without the need to perform additional calibration.

MAP Estimation Problem

A state estimation problem can be formulated as a maximum a posterior (MAP) estimation problem. We may define $\chi = \{x_i\}$, $i \in \{1; 2; \ldots, m\}$, as the set of system states $U = \{u_i\}$, $i \in \{1; 2; \ldots, m\}$, as the set of control inputs, and $Z = \{z_k\}$, $k \in \{1; 2; \ldots, n\}$, as the set of landmark measurements. Given the proposed system, Z may be composed of both visual features and laser landmarks. The joint probability of the system is defined as follows, $$P(\chi | U, Z) \propto P(x_0) \prod_{i=1}^{m} P(x_i | x_{i-1}, u_i) \prod_{k=1}^{n} P(z_k | x_{i_k}), \quad \text{Eq. 1}$$

where $P(x_0)$ is a prior of the first system state, $P(x_i|x_{i-1},u_i)$ represents the motion model, and $P(z_k|x_{i_k})$ represents the landmark measurement model. For each problem formulated as (1), there is a corresponding Bayesian belief network representation of the problem. The MAP estimation is to maximize Eq. 1. Under the assumption of zero-mean Gaussian noise, the problem is equivalent to a least-square problem, $$\chi^* = \underset{\chi}{\operatorname{argmin}} \sum_{i=1}^{m} \|r_{x_i}\|^2 + \sum_{k=1}^{n} \|r_{z_k}\|^2. \quad \text{Eq. 2}$$

Here, $r_{xi}$ and $r_{zk}$ are residual errors associated with the motion model and the landmark measurement model, respectively.

The standard way of solving Eq. 2 is to combine all sensor data, for example visual features, laser landmarks, and IMU measurements, into a large factor-graph optimization problem. The proposed data processing pipeline, instead, formulates multiple small optimization problems and solves the problems in a coarse-to-fine manner. The optimization problem may be restated as:

Problem:

Given data from a laser, a camera, and an IMU, formulate and solve problems as (2) to determine poses of {C} with respect to {W}, then use the estimated poses to register laser points and build a map of the traversed environment in {W}.

IMU Prediction Subsystem

IMU Mechanization

This subsection describes the IMU prediction subsystem. Since the system considers {C} as the fundamental sensor coordinate system, the IMU may also be characterized with respect to {C}. As disclosed above in the sub-section entitled Assumptions and Coordinate Systems, {I} and {C} are parallel coordinate systems. ω(t) and a(t) may be two 3×1 vectors indicating the angular rates and accelerations, respectively, of {C} at time t. The corresponding biases may be denoted as $b_\omega(t)$ and $b_a(t)$ and $n_\omega(t)$ and $n_a(t)$ be the corresponding noises. The vector, bias, and noise terms are defined in {C}. Additionally, g may be denoted as the constant gravity vector in {W}. The IMU measurement terms are:

$$\hat{\omega}(t) = \omega(t) + b_\omega(t) + n_\omega(t), \quad \text{Eq. 3}$$

$$\hat{a}(t) = a(t) - {}_W^C R(t)g - {}_C^I t\|\omega(t)\|^2 + b_a(t) + n_a(t), \quad \text{Eq. 4}$$

where ${}_W^C R(t)$ is the rotation matrix from {W} to {C}, and ${}_C^I t$ is t the translation vector between {C} and {I}.

It is noted that the term ${}_C^I t\|\omega(t)\|^2$ represents the centrifugal force due to the fact that the rotation center (origin of {C}) is different from the origin of {I}. Some examples of visual-inertial navigation methods model the motion in {I} to eliminate this centrifugal force term. In the computational method disclosed herein, in which visual features both with and without depth information are used, converting features without depth from {C} to {I} is not straight forward (see below). As a result, the system disclosed herein models all of the motion in {C} instead. Practically, the camera and the IMU are mounted close to each other to maximally reduce effect of the term.

The IMU biases may be slowly changing variables. Consequently, the most recently updated biases are used for motion integration. First, Eq. 3 is integrated over time. Then, the resulting orientation is used with Eq. 4 for integration over time twice to obtain translation from the acceleration data.

Bias Correction

The IMU bias correction can be made by feedback from either the camera or the laser (see 128, 138, respectively, in FIGS. 1 and 2). Each feedback term contains the estimated incremental motion over a short amount of time. The biases may be modeled to be constant during the incremental motion. Starting with Eq. 3, $b_\omega(t)$ may be calculated by comparing the estimated orientation with IMU integration. The updated $b_\omega(t)$ is used in one more round of integration to re-compute the translation, which is compared with the estimated translation to calculate $b_a(t)$.

To reduce the effect of high-frequency noises, a sliding window is employed keeping a known number of biases. Non-limiting examples of the number of biases used in the sliding window may include 200 to 1000 biases with a recommended number of 400 biases based on a 200 Hz IMU rate. A non-limiting example of the number of biases in the sliding window with an IMU rate of 100 Hz is 100 to 500 with a typical value of 200 biases. The averaged biases from the sliding window are used. In this implementation, the length of the sliding window functions as a parameter for determining an update rate of the biases. Although alternative methods to model the biases are known in the art, the disclosed implementation is used in order to keep the IMU processing module as a separate and distinct module. The sliding window method may also allow for dynamic reconfiguration of the system. In this manner, the IMU can be coupled with either the camera, the laser, or both camera and laser as required. For example, if the camera is non-functional, the IMU biases may be corrected only by the laser instead.

To reduce the effect of high-frequency noises, a sliding window may be employed keeping a certain number of biases. In such instances, the averaged biases from the sliding window may be used. In such an implementation, the length of the sliding window functions as a parameter determining an update rate of the biases. In some instances, the biases may be modeled as random walks and the biases updated through a process of optimization. However, this non-standard implementation is preferred to keep IMU processing in a separate module. The implementation favors dynamic reconfiguration of the system, i.e. the IMU may be coupled with either the camera or the laser. If the camera is non-functional, the IMU biases may be corrected by the laser instead. As described inter-module communication in the sequential modularized system is utilized to fix the IMU biases. This communication enables IMU biases to be corrected.

In accordance with an exemplary and non-limiting embodiment, IMU bias correction may be accomplished by utilizing feedback from either the camera or the laser. Each of the camera and the laser contains the estimated incremental motion over a short amount of time. When calculating the biases, the methods and systems described herein model the biases to be constant during the incremental motion. Still starting with Eq. 3, by comparing the estimated orientation with IMU integration, the methods and systems described herein can calculate $b_\omega(t)$. The updated $b_\omega(t)$ is used in one more round of integration to recompute the translation, which is compared with the estimated translation to calculate $b_a(t)$.

In some embodiments, IMU output comprises an angular rate having relatively constant errors over time. The resulting IMU bias is related to the fact that the IMU will always have some difference from ground truth. This bias can change over time. It is relatively constant and not high frequency. The sliding window described above is a specified period of time during which the IMU data is evaluated.

Figure 5:
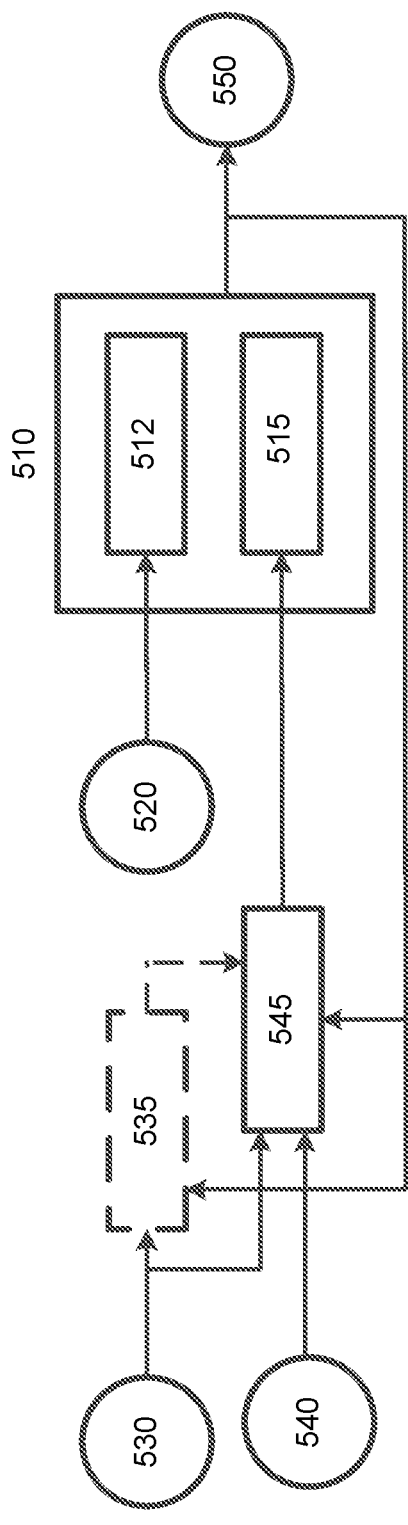
FIG. 5 illustrates an embodiment of a visual-inertial odometry subsystem.

With reference to FIG. 5, there is provided a system diagram of the visual-inertial odometry subsystem. The method couples vision with an IMU. Both vision and the IMU provide constraints to an optimization problem that estimates incremental motion. At the same time, the method associates depth information to visual features. If a feature is located in an area where laser range measurements are available, depth may be obtained from laser points. Otherwise, depth may be calculated from triangulation using the previously estimated motion sequence. As the last option, the method may also use features without any depth by formulating constraints in a different way. This is true for those features which may not necessarily have laser range coverage or cannot be triangulated due to the fact that they are not necessarily tracked long enough or located in the direction of camera motion. These three alternatives may be used alone or in combination for building the registered point cloud. In some embodiments information is discarded. Eigenvalues and eigenvectors may be computed and used to identify and specify degeneracy in a point cloud. If there is degeneracy in a specific direction in the state space then the solution in that direction in that state space can be discarded.

Visual-Inertial Odometry Subsystem

A block system diagram of the visual-inertial odometry subsystem is depicted in FIG. 5. An optimization module 510 uses pose constraints 512 from the IMU prediction module 520 along with camera constraints 515 based on optical feature data having or lacking depth information for motion estimation 550. A depthmap registration module 545 may include depthmap registration and depth association of the tracked camera features 530 with depth information obtained from the laser points 540. The depthmap registration module 545 may also incorporate motion estimation 550 obtained from a previous calculation. The method tightly couples vision with an IMU. Each provides constraints 512, 515, respectively, to an optimization module 510 that estimates incremental motion 550. At the same time, the method associates depth information to visual features as part of the depthmap registration module 545. If a feature is located in an area where laser range measurements are available, depth is obtained from laser points. Otherwise, depth is calculated from triangulation using the previously estimated motion sequence. As the last option, the method can also use features without any depth by formulating constraints in a different way. This is true for those features which do not have laser range coverage or cannot be triangulated because they are not tracked long enough or located in the direction of camera motion.

Camera Constraints

The visual-inertial odometry is a key-frame based method. A new key-frame is determined 535 if more than a certain number of features lose tracking or the image overlap is below a certain ratio. Here, right superscript l, $l \in Z^+$ may indicate the last key-frame, and c, $c \in Z^+$ and c>k, may indicate the current frame. As disclosed above, the method combines features with and without depth. A feature that is associated with depth at key-frame l, may be denoted as $X_l = [x_l, y_l, z_l]^T$ in $\{C_l\}$. Correspondingly, a feature without depth is denoted as $\bar{X}_l = [\bar{x}_l, \bar{y}_l, z_l]^T$ using normalized coordinates instead. Note that $X_l$, $\bar{X}_l$, $x_l$, and $\bar{x}_l$ are different from $\chi$ and x in Eq.1 which represent the system state. Features at key-frames may be associated with depth for two reasons: 1) depth association takes some amount of processing, and computing depth association only at key-frames may reduce computation intensity; and 2) the depthmap may not be available at frame c and thus laser points may not be registered since registration depends on an established depthmap. A normalized feature in $\{C_c\}$ may be denoted as $\bar{X}c = [\bar{x}_c, \bar{y}_c, 1]^T$.

Let $R_l^c$ and $t_l^c$ be the 3×3 rotation matrix and 3×1 translation vector between frames l and c, where $r_l^c \in SO(3)$ and $t_l^c \in \mathbb{R}^3$, $R_l^c$ and $T_l^c$ form an SE(3) transformation. The motion function between frames l and c may be written as $$X_c = R_l^c X_l + t_l^c. \qquad \text{Eq. 5}$$

$X_c$ has an unknown depth. Let $d_c$ be the depth, where $X_c = d_c \bar{X}_c$. Substituting $X_c$ with $d_c \bar{X}_c$ and combining the 1st and 2nd rows with the 3rd row in Eq. 5 to eliminate $d_c$, results in $$(R(1) - \bar{x}_c R(3))X_l + t_1 - \bar{x}_c t(3) = 0, \qquad \text{Eq. 6}$$

$$(R(2) - \bar{y}_c R(3))X_l + t_2 - \bar{y}_c t(3) = 0, \qquad \text{Eq. 7}$$

R(h) and t(h), $h \in \{1, 2, 3\}$, are the h-th rows of $R_l^c$ and $t_l^c$. In the case that depth in unavailable to a feature, let $d_l$ be the unknown depth at key-frame l. Substituting $X_l$ and $X_c$ with $d_k \bar{X}_l$ and $d_c \bar{X}_c$, respectively, and combining all three rows in Eq. 5 to eliminate $d_k$ and $d_c$, results in another constraint, $$[\bar{y}_c t(3) - t(2)], -\bar{x}_c t(3) + t(1), \bar{x}_c t(2) - \bar{y}_c t(1)] R_l^c \bar{X}_l = 0. \quad \text{Eq. 8}$$

Motion Estimation

The motion estimation process 510 is required to solve an optimization problem combining three sets of constraints: 1) from features with known depth as in Eqs. 6-7; 2) from features with unknown depth as in Eq. 8; and 3) from the IMU prediction 520. $T_a^b$, may be defined as a 4×4 transformation matrix between frames a and b, $$T_a^b = \begin{bmatrix} R_a^b & t_a^b \\ 0^T & 1 \end{bmatrix}, \quad \text{Eq. 9}$$

where $R_a^b$ and $t_a^b$ are the corresponding rotation matrix and translation vector. Further, let $\theta_a^b$ be a 3×1 vector corresponding to $R_a^b$ through an exponential map, where $\theta_a^b \in so(3)$. The normalized term $\theta/\|\theta\|$ represents direction of the rotation and $\|\theta\|$ is the rotation angle. Each $T_a^b$ corresponds to a set of $\theta_a^b$ and $t_a^b$ containing 6-DOF motion of the camera.

The solved motion transform between frames 1 and c−1, namely $T_l^{c-1}$ may be used to formulate the IMU pose constraints. A predicted transform between the last two frames c−1 and c, denoted as $\hat{T}_{c-1}^c$ may be obtained from IMU mechanization. The predicted transform at frame c is calculated as, $$\hat{T}_l^c = \hat{T}_{c-1}^c \hat{T}_l^{c-1}. \quad \text{Eq. 10}$$

Let $\hat{\theta}_l^c$ and $\hat{t}_l^c$ be the 6-DOF motion corresponding to $\hat{T}_l^c$. It may be understood that the IMU predicted translation, $\hat{t}_l^c$, is dependent on the orientation. As an example, the orientation may determine a projection of the gravity vector through rotation matrix ${}_W^C R(t)$ in Eq. 4, and hence the accelerations that are integrated. $\hat{t}_l^c$ may be formulated as a function of $\theta_l^c$, and may be rewritten as $\hat{t}_l^c(\theta_l^c)$. It may be understood that the 200 Hz pose provided by the IMU prediction module 122 (FIGS. 1 and 2) as well as the 50 Hz pose provided by the visual-inertial odometry module 126 (FIGS. 1 and 2) are both pose functions. Calculating $\hat{t}_l^c(\theta_l^c)$ may begin at frame c and the accelerations may be integrated inversely with respect to time. Let $\theta_l^c$ be the rotation vector corresponding to $R_l^c$ in Eq. 5, and $\theta_l^c$ and $t_l^c$ are the motion to be solved. The constraints may be expressed as, $$\Sigma_l^c [(\hat{\theta}_l^c - \theta_l^c)^T, (\hat{t}_l^c(\theta_l^c) - t_l^c)^T]^T = 0, \quad \text{Eq. 11}$$

in which $\Sigma_l^c$ is a relative covariance matrix scaling the pose constraints appropriately with respect to the camera constraints.

In embodiments of the visual-inertial odometry subsystem, the pose constraints fulfill the motion model and the camera constraints fulfill the landmark measurement model in Eq. 2. The optimization problem may be solved by using the Newton gradient-descent method adapted to a robust fitting framework for outlier feature removal. In this problem, the state space contains $\theta_l^c$ and $t_l^c$. Thus, a full-scale MAP estimation is not performed, but is used only to solve a marginalized problem. The landmark positions are not optimized, and thus only six unknowns in the state space are used, thereby keeping computation intensity low. The method thus involves laser range measurements to provide precise depth information to features, warranting motion estimation accuracy. As a result, further optimization of the features' depth through a bundle adjustment may not be necessary.

Depth Association

The depthmap registration module 545 registers laser points on a depthmap using previously estimated motion. Laser points 540 within the camera field of view are kept for a certain amount of time. The depthmap is down-sampled to keep a constant density and stored in a 2D KD-tree for fast indexing. In the KD-tree, all laser points are projected onto a unit sphere around the camera center. A point is represented by its two angular coordinates. When associating depth to features, features may be projected onto the sphere. The three closest laser points are found on the sphere for each feature. Then, their validity may be by calculating distances among the three points in Cartesian space. If a distance is larger than a threshold, the chance that the points are from different objects, e.g. a wall and an object in front of the wall, is high and the validity check fails. Finally, the depth is interpolated from the three points assuming a local planar patch in Cartesian space.

Those features without laser range coverage, if they are tracked over a certain distance and not located in the direction of camera motion, may be triangulated using the image sequences where the features are tracked. In such a procedure, the depth may be updated at each frame based on a Bayesian probabilistic mode.

Scan Matching Subsystem

Figure 6:
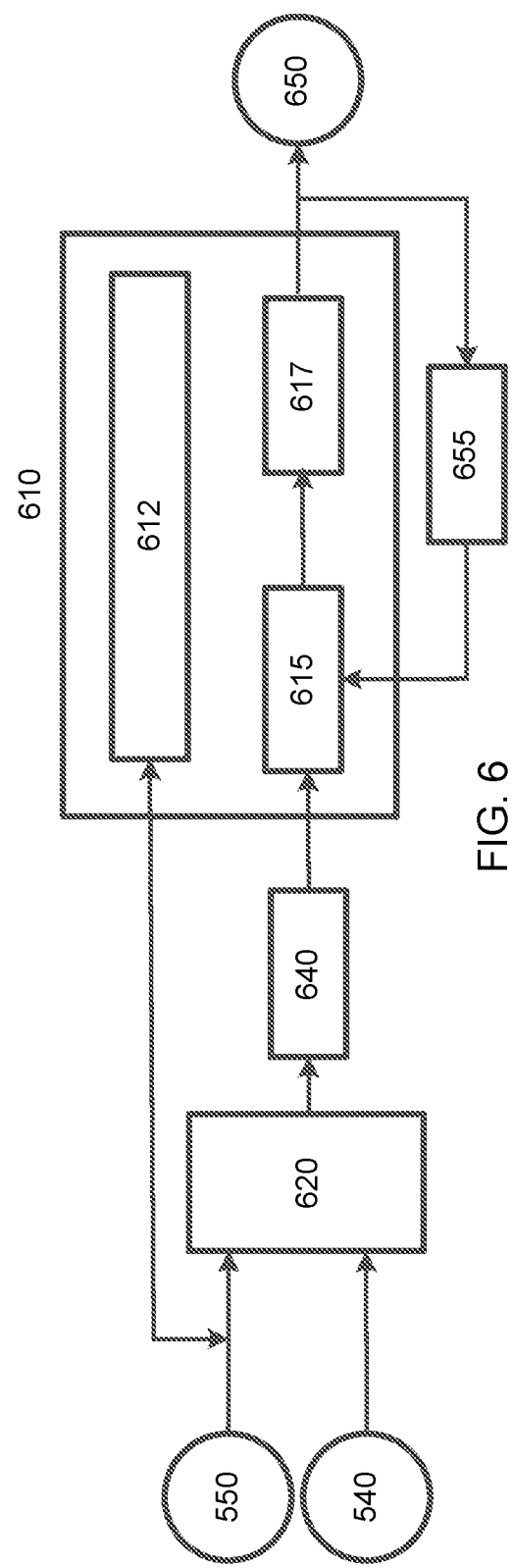
FIG. 6 illustrates an embodiment of a scan matching subsystem.

This subsystem further refines motion estimates from the previous module by laser scan matching. FIG. 6 depicts a block diagram of the scan matching subsystem. The subsystem receives laser points 540 in a local point cloud and registers them 620 using provided odometry estimation 550. Then, geometric features are detected 640 from the point cloud and matched to the map. The scan matching minimizes the feature-to-map distances, similar to many methods known in the art. However, the odometry estimation 550 also provides pose constraints 612 in the optimization 610. The optimization comprises processing pose constraints with feature correspondences 615 that are found and further processed with laser constraints 617 to produce a device pose 650. This pose 650 is processed through a map registration process 655 that facilitates finding the feature correspondences 615. The implementation uses voxel representation of the map. Further, it can dynamically configure to run on one to multiple CPU threads in parallel.

Laser Constraints

When receiving laser scans, the method first registers points from a scan 620 into a common coordinate system. m, $m \in Z^+$ may be used to indicate the scan number. It is understood that the camera coordinate system may be used for both the camera and the laser. Scan m may be associated with the camera coordinate system at the beginning of the scan, denoted as $\{C_m\}$. To locally register 620 the laser points 540, the odometry estimation 550 from the visual-inertial odometry may be taken as key-points, and the IMU measurements may be used to interpolate in between the key-points.

Let $P_m$ be the locally registered point cloud from scan m. Two sets of geometric features from $P_m$ may be extracted: one on sharp edges, namely edge points and denoted as $\varepsilon_m$, and the other on local planar surfaces, namely planar points and denoted as $\mathcal{H}_m$. This is through computation of curvature in the local scans. Points whose neighbor points are already selected are avoided such as points on boundaries of occluded regions and points whose local surfaces are close to be parallel to laser beams. These points are likely to contain large noises or change positions over time as the sensor moves.

The geometric features are then matched to the current map built. Let $Q_{m-1}$ be the map point cloud after processing the last scan, $Q_{m-1}$ is defined in $\{W\}$. The points in $Q_{m-1}$ are separated into two sets containing edge points and planar points, respectively. Voxels may be used to store the map truncated at a certain distance around the sensor. For each voxel, two 3D KD-trees may be constructed, one for edge points and the other for planar points. Using KD-trees for individual voxels accelerates point searching since given a query point, a specific KD-tree associated with a single voxel needs to be searched (see below).

When matching scans, $\varepsilon_m$ and $\mathcal{H}_m$ into $\{W\}$ are first projected using the best guess of motion available, then for each point in $\varepsilon_m$ and $\mathcal{H}_m$, a cluster of closest points are found from the corresponding set on the map. To verify geometric distributions of the point clusters, the associated eigenvalues and eigenvectors may be examined. Specifically, one large and two small eigenvalues indicate an edge line segment, and two large and one small eigenvalues indicate a local planar patch. If the matching is valid, an equation is formulated regarding the distance from a point to the corresponding point cluster, $$f(X_m, \theta_m, t_m) = d, \qquad \text{Eq. 12}$$

where $X_m$, is a point in $\varepsilon_m$ or $\mathcal{H}_m$, $\theta_m$, $\theta_m$, $\in so(3)$, and $t_m$, $t_m \in \mathbb{R}^3$, indicate the 6-DOF pose of $\{C_m\}$ in $\{W\}$.

Motion Estimation

The scan matching is formulated into an optimization problem 610 minimizing the overall distances described by Eq. 12. The optimization also involves pose constraints 612 from prior motion. Let $T_{m-1}$ be the 4×4 transformation matrix regarding the pose of $\{C_{m-1}\}$ in $\{W\}$, $T_{m-1}$ is generated by processing the last scan. Let $\hat{T}_{m-1}{}^m$ be the pose transform from $\{C_{m-1}\}$ to $\{C_m\}$, as provided by the odometry estimation. Similar to Eq. 10, the predicted pose transform of $\{C_m\}$ in $\{W\}$ is, $$\hat{T}_m = \hat{T}_{m-1}{}^m T_{m-1}. \qquad \text{Eq. 13}$$

Let $\hat{\theta}_m$ and $\hat{t}_m$ be the 6-DOF pose corresponding to $\hat{T}_m$, and let $\Sigma_m$ be a relative covariance matrix. The constraints are, $$\Sigma_m[(\hat{\theta}_m - \theta_m)^T, (\hat{t}_m - t_m)^T]^T = 0. \qquad \text{Eq. 14}$$

Eq. 14 refers to the case that the prior motion is from the visual-inertial odometry, assuming the camera is functional. Otherwise, the constraints are from the IMU prediction. $\hat{\theta}'_m$ and $\hat{t}'_m(\theta_m)$ may be used to denote the same terms by IMU mechanization. $\hat{t}'_m(\theta_m)$ is a function of $\theta_m$ because integration of accelerations is dependent on the orientation (same with $\hat{t}_i^c(\theta_i^c)$ in Eq. 11). The IMU pose constraints are, $$\Sigma'_m[(\hat{\theta}'_m - \theta_m)^T, (\hat{t}'_m(\theta_m) - t_m)^T]^T = 0, \qquad \text{Eq. 15}$$

where $\Sigma'_m$ is the corresponding relative covariance matrix. In the optimization problem, Eqs. 14 and 15 are linearly combined into one set of constraints. The linear combination is determined by working mode of the visual-inertial odometry. The optimization problem refines $\theta_m$ and $t_m$, which is solved by the Newton gradient-descent method adapted to a robust fitting framework.

Map in Voxels

Figure 7A:
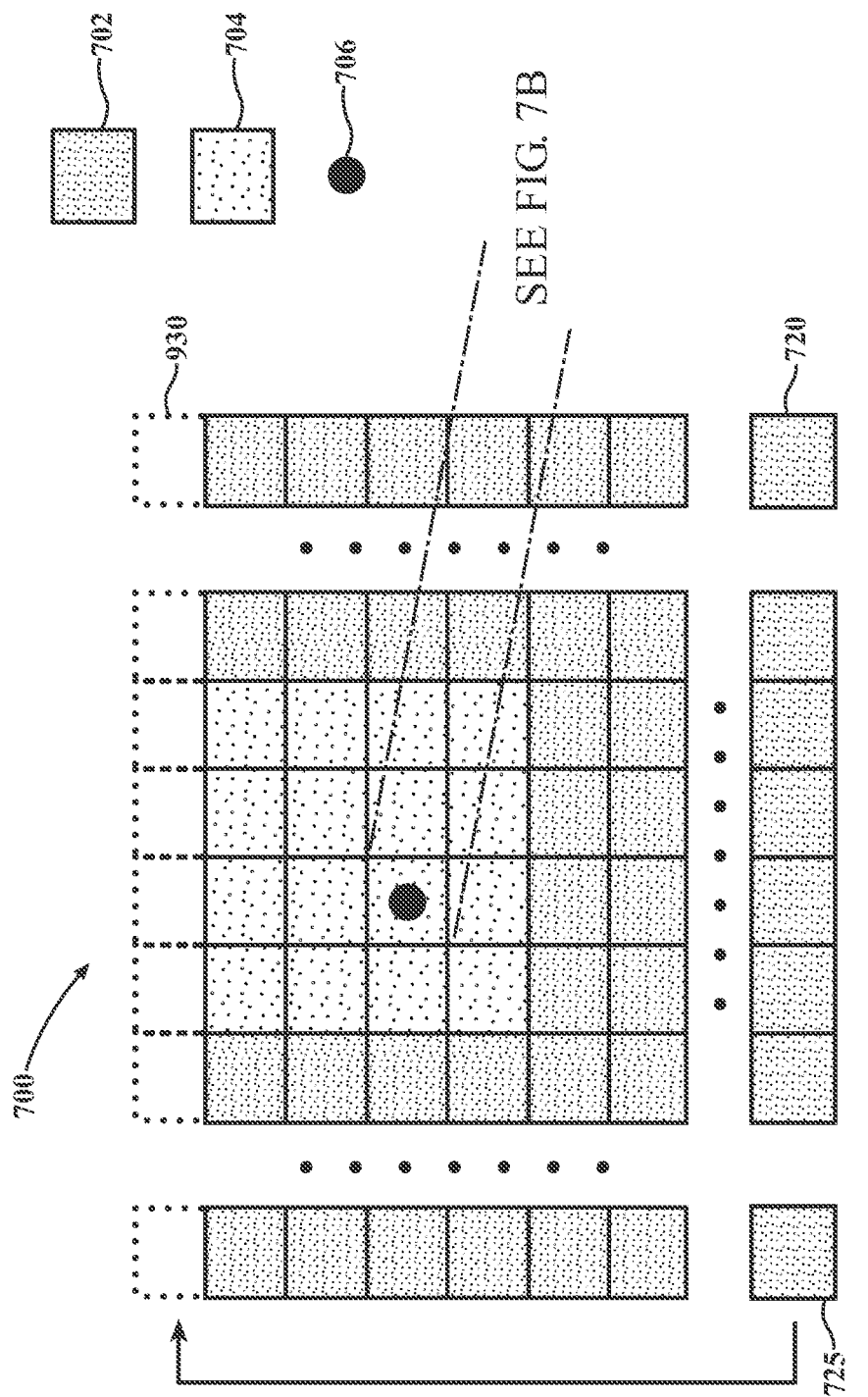
FIG. 7A illustrates an embodiment of a large area map having coarse detail resolution.

The points on the map are kept in voxels. A 2-level voxel implementation as illustrated in FIGS. 7A and 7B. $M_{m-1}$ denotes the set of voxels 702, 704 on the first level map 700 after processing the last scan. Voxels 704 surrounding the sensor 706 form a subset $M_{m-1}$, denoted as $S_{m-1}$. Given a 6-DOF sensor pose, $\hat{\theta}_m$ and $\hat{t}_m$, there is a corresponding $S_{m-1}$ which moves with the sensor on the map. When the sensor approaches the boundary of the map, voxels on the opposite side 725 of the boundary are moved over to extend the map boundary 730. Points in moved voxels are cleared resulting in truncation of the map.

As illustrated in FIG. 7B, each voxel $j, j \varepsilon S_{m-1}$ of the second level map 750 is formed by a set of voxels that are a magnitude smaller, denoted as $S_{m-1}{}^j$ than those of the first level map 700. Before matching scans, points in $\varepsilon_m$ and $\mathcal{H}_m$ are projected onto the map using the best guess of motion, and fill them into $\{S_{m-1}{}^j\}$, $j \in S_{m-1}$. Voxels 708 occupied by points from $\varepsilon_m$ and $\mathcal{H}_m$ are extracted to form $Q_{m-1}$ and stored in 3D KD-trees for scan matching. Voxels 710 are those not occupied by points from $\varepsilon_m$ or $\mathcal{H}_m$. Upon completion of scan matching, the scan is merged into the voxels 708 with the map. After that, the map points are downsized to maintain a constant density. It may be recognized that each voxel of the first level map 700 corresponds to a volume of space that is larger than a sub-voxel of the second level map 750. Thus, each voxel of the first level map 700 comprises a plurality of sub-voxels in the second level map 750 and can be mapped onto the plurality of sub-voxels in the second level map 750.

As noted above with respect to FIGS. 7A and 7B, two levels of voxels (first level map 700 and second level map 750) are used to store map information. Voxels corresponding to $M_{m-1}$ are used to maintain the first level map 700 and voxels corresponding to $\{S_{m-1}{}^j\}$, $j \in S_{m-1}$ in the second level map 750 are used to retrieve the map around the sensor for scan matching. The map is truncated only when the sensor approaches the map boundary. Thus, if the sensor navigates inside the map, no truncation is needed. Another consideration is that two KD-trees are used for each individual voxel in $S_{m-1}$—one for edge points and the other for planar points. As noted above, such a data structure may accelerate point searching. In this manner, searching among multiple KD-trees is avoided as opposed to using two KD-trees for each individual voxel in $\{S_{m-1}{}^j\}$, $j \in S_{m-1}$. The later requires more resources for KD-tree building and maintenance.

Table 1 compares CPU processing time using different voxel and KD-tree configurations. The time is averaged from multiple datasets collected from different types of environments covering confined and open, structured and vegetated areas. We see that using only one level of voxels, $M_{m-1}$, results in about twice of processing time for KD-tree building and querying. This is because the second level of voxels, $\{S_{m-1}{}^j\}$, $j \in S_{m-1}$, help retrieve the map precisely. Without these voxel, more points are contained in $Q_{m-1}$ and built into the KD-trees. Also, by using KD-trees for each voxel, processing time is reduced slightly in comparison to using KD-trees for all voxels in

TABLE 1

Comparison of average CPU processing time on KD-tree operation

| | 1-level voxels | | 2-level voxels | |
|---|---|---|---|---|
| Task | KD-trees for all voxels | KD-trees for each voxel | KD-trees for all voxels | KD-trees for each voxel |
| Build (time per KD-tree) | 54 ms | 47 ms | 24 ms | 21 ms |
| Query (time per point) | 4.2 ns | 4.1 ns | 2.4 ns | 2.3 ns |

Parallel Processing

Figure 8A:
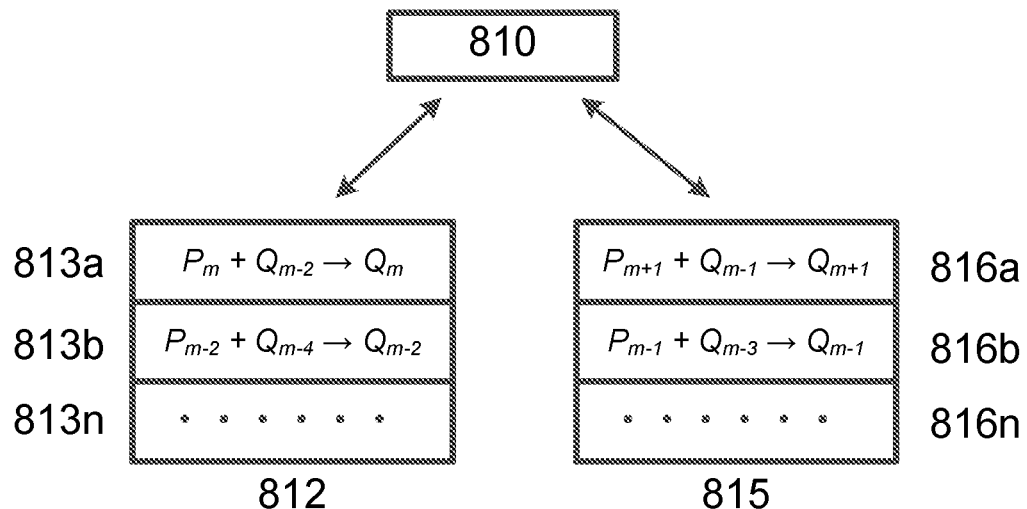
FIG. 8A illustrates an embodiment of multi-thread scan matching.
Figure 8B:
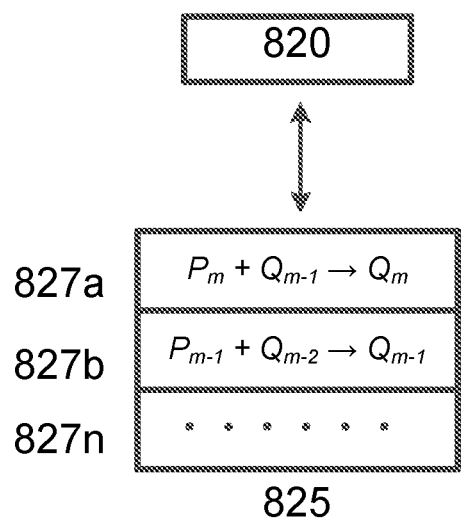
FIG. 8B illustrates an embodiment of single-thread scan matching.

The scan matching involves building KD-trees and repetitively finding feature correspondences. The process is time-consuming and takes major computation in the system. While one CPU thread cannot guarantee the desired update frequency, a multi-thread implementation may address issues of complex processing. FIG. 8A illustrates the case where two matcher programs 812, 815 run in parallel. Upon receiving of a scan, a manager program 810 arranges it to match with the latest map available. In one example, composed of a clustered environment with multiple structures and multiple visual features, matching is slow and may not complete before arrival of the next scan. The two matchers 812 and 815 are called alternatively. In one matcher 812, $P_m$, 813a $P_{m-2}$, 813b and additional $P_{m-k}$ (for k=an even integer) 813n, are matched with $Q_{m-2}$ 813a, $Q_{m-4}$. 813a, and additional $Q_{m-k}$ (for k=an even integer) 813n, respectively. Similarly, in a second matcher 815, $P_{m+1}$, 816a $P_{m-1}$, 816b and additional $P_{m-k}$ (for k=an odd integer) 816n, are matched with $Q_{m-1}$, 816a, $Q_{m-3}$ 816a, and additional $Q_{m-k}$ (for k=an odd integer) 816n, respectively, The use of this interleaving process may provide twice the amount of time for processing. In an alternative example, composed of a clean environment with few structures or visual features, computation is light. In such an example (FIG. 8B), only a single matcher 820 may be called. Because interleaving is not required $P_m$, $P_{m-1}$, ..., are sequentially matched with $Q_{m-1}$, $Q_{m-2}$, ..., respectively (see 827a, 827b, 827n). The implementation may be configured to use a maximum of four threads, although typically only two threads may be needed.

Transform Integration

The final motion estimation is integration of outputs from the three modules depicted in FIG. 2. The 5 Hz scan matching output produces the most accurate map, while the 50 Hz visual-inertial odometry output and the 200 Hz IMU prediction are integrated for high-frequency motion estimates.

On Robustness

The robustness of the system is determined by its ability to handle sensor degradation. The IMU is always assumed to be reliable functioning as the backbone in the system. The camera is sensitive to dramatic lighting changes and may also fail in a dark/texture-less environment or when significant motion blur is present (thereby causing a loss of visual features tracking). The laser cannot handle structure-less environments, for example a scene that is dominant by a single plane. Alternatively, laser data degradation can be caused by sparsity of the data due to aggressive motion. Such aggressive motion comprises highly dynamic motion. As used herein, "highly dynamic motion" refers to substantially abrupt rotational or linear displacement of the system or continuous rotational or translational motion having a substantially large magnitude. The disclosed self-motion determining system may operate in the presence of highly dynamic motion as well as in dark, texture-less, and structure-less environments. In some exemplary embodiments, the system may operate while experiencing angular rates of rotation as high as 360 deg per second. In other embodiments, the system may operate at linear velocities up to and including at 110 kph. In addition, these motions can be coupled angular and linear motions.

Both the visual-inertial odometry and the scan matching modules formulate and solve optimization problems according to EQ. 2. When a failure happens, it corresponds to a degraded optimization problem, i.e. constraints in some directions of the problem are ill-conditioned and noise dominates in determining the solution. In one non-limiting method, eigenvalues, denoted as $\lambda 1, \lambda 2, \ldots, \lambda 6$, and eigenvectors, denoted as $v_1, v_2, \ldots, v_6$, associated with the problem may be computed. Six eigenvalues/eigenvectors are present because the state space of the sensor contains 6-DOF (6 degrees of freedom). Without losing generality, $v_1, v_2, \ldots, v_6$ may be sorted in decreasing order. Each eigenvalue describes how well the solution is conditioned in the direction of its corresponding eigenvector. By comparing the eigenvalues to a threshold, well-conditioned directions may be separated from degraded directions in the state space. Let h, h=0; 1, . . . , 6, be the number of well-conditioned directions. Two matrices may be defined as:

$$\bar{V}=[v_1,\ldots,v_6]^T, \overline{V}=[v_1,\ldots,v_h,0,\ldots,0]^T. \qquad \text{Eq. 16}$$

When solving an optimization problem, the nonlinear iteration may start with an initial guess. With the sequential pipeline depicted in FIG. 2, the IMU prediction provides the initial guess for the visual-inertial odometry, whose output is taken as the initial guess for the scan matching. For the additional two modules (visual-inertial odometry and scan matching modules), let x be a solution and $\Delta x$ be an update of x in a nonlinear iteration, in which $\Delta x$ is calculated by solving the linearized system equations. During the optimization process, instead of updating x in all directions, x may be updated only in well-conditioned directions, keeping the initial guess in degraded directions instead, $$x \leftarrow x + V^{-1}\overline{V}\Delta x. \qquad \text{Eq. 17}$$

In Eq. 17, the system solves for motion in a coarse-to-fine order, starting with the IMU prediction, the additional two modules further solving/refining the motion as much as possible. If the problem is well-conditioned, the refinement may include all 6-DOF. Otherwise, if the problem is only partially well-conditioned, the refinement may include 0 to 5-DOF. If the problem is completely degraded, $\overline{V}$ becomes a zero matrix and the previous module's output is kept.

Returning to the pose constraints described in Eqs. 14 and 15, it may be understood that the two equations are linearly combined in the scan matching problem. As defined in Eq. 16, $V_V$ and $\overline{V}_V$ denote the matrices containing eigenvectors from the visual-inertial odometry module, $\overline{V}_V$ represents well-conditioned directions in the subsystem, and $V_V - \overline{V}_V$ represents degraded directions. The combined constraints are, $$\Sigma_m V_V^{-1}\overline{V}_V[(\hat{\theta}_m-\theta_m)^T,(\hat{t}_m-t_m)^T]^T+\Sigma'_m V_V^{-1}$$

$$(V_V-\overline{V}_V)[(\hat{\theta}'_m-\theta_m)^T,(\hat{t}'_m(\theta_m)-t_m)^T]^T=0. \qquad \text{Eq. 18}$$

In a normal case where the camera is functional, $\overline{V}_V = V_V$ and Eq.18 is composed of pose constraints from the visual-inertial odometry as in Eq. 14. However, if the camera data are completely degraded, $\overline{V}_V$ is a zero matrix and Eq. 18 is composed of pose constraints from the IMU prediction according to Eq. 15.

Case Study of Camera Degradation

As depicted in FIG. 9A, if visual features are insufficiently available for the visual-inertial odometry, the IMU prediction 122 bypasses the visual-inertial odometry module 126 fully or partially 924—denoted by the dotted line—depending on the number of well-conditioned directions in the visual-inertial odometry problem. The scan matching module 132 may then locally register laser points for the scan matching. The bypassing IMU prediction is subject to drift. The laser feedback 138 compensates for the camera feedback 128 correcting velocity drift and biases of the IMU, only in directions where the camera feedback 128 is unavailable. Thus, the camera feedback has a higher priority, due to the higher frequency making it more suitable when the camera data are not degraded. When sufficient visual features are found, the laser feedback is not used.

Case Study of Laser Degradation

As shown in FIG. 9B, if environmental structures are insufficient for the scan matching 132 to refine motion estimates, the visual-inertial odometry module 126 output fully or partially bypasses the scan matching module to register laser points on the map 930 as noted by the dotted line. If well-conditioned directions exist in the scan matching problem, the laser feedback contains refined motion estimates in those directions. Otherwise, the laser feedback becomes empty 138.

Case Study of Camera and Laser Degradation

Figure 10:
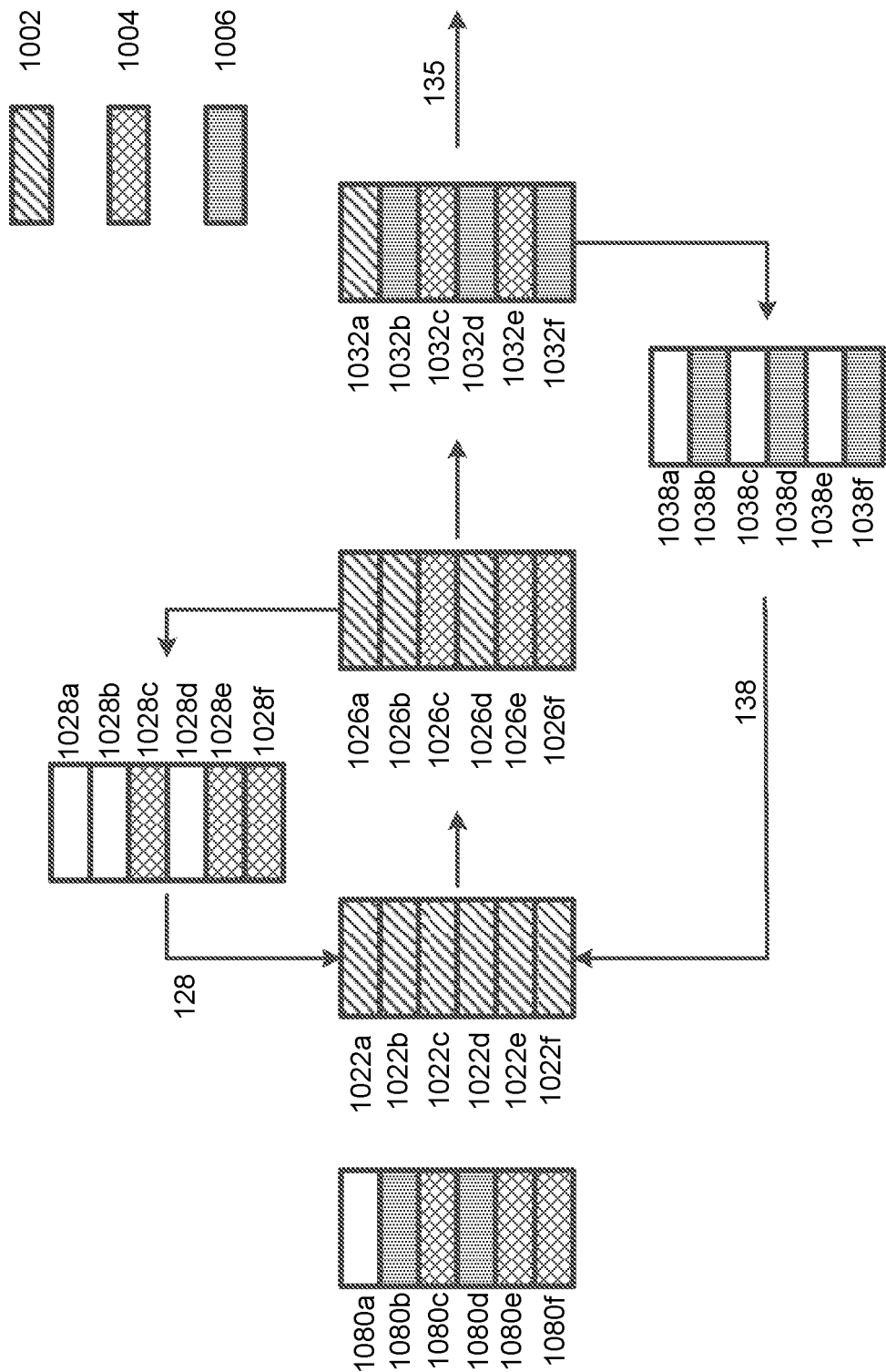
FIG. 10 illustrates an embodiment of the three computational modules in which feedback data from the visual-inertial odometry unit and the scan matching unit are partially suppressed due to data degradation.

In a more complex example, both the camera and the laser are degraded at least to some extent. FIG. 10 depicts such an example. A vertical bar with six rows represents a 6-DOF pose where each row is a DOF (degree of freedom), corresponding to an eigenvector in EQ. 16. In this example, the visual-inertial odometry and the scan matching each updates a 3-DOF of motion, leaving the motion unchanged in the other 3-DOF. The IMU prediction 1022a-f may include initial IMU predicted values 1002. The visual-inertial odometry updates 1004 some 3-DOF (1026c, 1026e, 1026f) resulting in a refined prediction 1026a-1026f. The scan matching updates 1006 some 3-DOF (1032b, 1032d, 1032f) resulting in a further refined prediction 1032a-1032f. The camera feedback 128 contains camera updates 1028a-1028f and the laser feedback 138 contains laser updates 1038a-1038f, respectively. In reference to FIG. 10, cells having no shading (1028a, 1028b, 1028d, 1038a, 1038c, 1038e) do not contain any updating information from the respective modules. The total update 1080a-1080f to the IMU prediction modules is a combination of the updates 1028a-1028f from the camera feedback 128 and the updates 1038a-1038f from the laser feedback 138. In one or more of the degrees of freedom in which feedback is available from both the camera (for example 1028f) and the laser (for example 1038f), the camera updates (for example 1028f) may have priority over the laser updates (for example 1038f).

In practice, however, the visual-inertial odometry module and the scan matching module may execute at different frequencies and each may have its own degraded directions. IMU messages may be used to interpolate between the poses from the scan matching output. In this manner, an incremental motion that is time aligned with the visual-inertial odometry output may be created. Let $\theta_{c-1}^{c}$ and $t_{c-1}^{c}$ be the 6-DOF motion estimated by the visual-inertial odometry between frames c−1 and c, where $\theta_{c-1}^{c} \in so(3)$ and $t_{c-1}^{c} \in \mathbb{R}^3$. Let $\theta'_{c-1}^{c}$ and $t'_{c-1}^{c}$ be the corresponding terms estimated by the scan matching after time interpolation. $V_V$ and $\overline{V}_V$ may be the matrices defined in Eq. 16 containing eigenvectors from the visual-inertial odometry module, in which $V_V$ represents well-conditioned directions, and $V_V - \overline{V}_V$ represents degraded directions. Let $V_S$ and $\overline{V}_S$ be the same matrices from the scan matching module. The following equation calculates the combined feedback, $f_C$, $$f_c = f_V + V_1^{-1}(V_V - \overline{V}_V) f_s, \qquad \text{Eq. 19}$$

where $f_V$ and $f_s$ represent the camera and the laser feedback, $$f_V = V_V^{-1}(\overline{V}_V)[(\theta_{c-1}^c)^T, (t_{c-1}^c)^T]^T, \qquad \text{Eq. 20}$$

$$f_s = V_S^{-1}(\overline{V}_S)[(\theta_{c-1}^c)^T, (t_{c-1}^c)^T]^T. \qquad \text{Eq. 21}$$

note that $f_C$ only contains solved motion in a subspace of the state space. The motion from the IMU prediction, namely $\hat{\theta}_{c-1}^c$ and $\hat{t}_{c-1}^c$, may be projected to the null space of $f_C$, $$f_1 = V_V^{-1}(V_V - \overline{V}_V) V_S^{-1}(V_S - \overline{V}_S)[(\hat{\theta}_{c-1}^c)^T, (\hat{t}_{c-1}^c)^T]^T \qquad \text{Eq. 22}$$

$\tilde{\theta}_{c-1}^c(b_\omega(t))$ and $\tilde{t}_{c-1}^c(b_\omega(t), b_a(t))$ may be used to denote the IMU predicted motion formulated as functions of $b_\omega(t)$ and $b_a(t)$ through integration of Eqs. 3 and 4. The orientation $\tilde{\theta}_{c-1}^c(b_\omega(t))$ is only relevant to $b_\omega(t)$, but the translation $\tilde{t}_{c-1}^c(b_\omega(t), b_a(t))$ is dependent on both $b_\omega(t)$ and $b_a(t)$. The biases can be calculated by solving the following equation, $$[(\tilde{\theta}_{c-1}^c(b_\omega(t)))^T, (\tilde{t}_{c-1}^c(b_\omega(t), b_a(t)))^T]^T = f_C + f_1 \qquad \text{Eq. 23}$$

When the system functions normally, $f_C$ spans the state space, and $V_V - \overline{V}_V$ and $V_S - \overline{V}_S$ in Eq. 22 are zero matrices. Correspondingly, $b_\omega(t)$ and $b_a(t)$ are calculated from $f_C$. In a degraded case, the IMU predicted motion, $\hat{\theta}_{c-1}^c$ and $\hat{t}_{c-1}^c$, is used in directions where the motion is unsolvable (e.g. white row 1080a of the combined feedback in FIG. 10). The result is that the previously calculated biases are kept in these directions.

Experiments

Tests with Scanners

The odometry and mapping software system was validated on two sensor suites. In a first sensor suite, a Velodyne LIDAR™ HDL-32E laser scanner is attached to a UI-1220SE monochrome camera and an Xsens® MTi-30 IMU. The laser scanner has 360° horizontal FOV, 40° vertical FOV, and receives 0.7 million points/second at 5 Hz spinning rate. The camera is configured at the resolution of 752×480 pixels, 76° horizontal FOV, and 50 Hz frame rate. The IMU frequency is set at 200 Hz. In a second sensor suite, a Velodyne LIDAR™ VLP-16 laser scanner is attached to the same camera and IMU. This laser scanner has 360° horizontal FOV, 30° vertical FOV, and receives 0.3 million points/second at 5 Hz spinning rate. Each sensor suite is attached to a vehicle for data collection, which are driven on streets and in off-road terrains, respectively.

For both sensor suites, a maximum of 300 Harris corners were tracked. To evenly distribute the visual features, an image is separated into 5×6 identical sub-regions, each sub-region providing up to 10 features. When a feature loses tracking, a new feature is generated to maintain the feature number in each sub region.

The software runs on a laptop computer with a 2.6 GHz i7 quad-core processor (2 threads on each core and 8 threads overall) and an integrated GPU, in a Linux® system running Robot Operating System (ROS). Two versions of the software were implemented with visual feature tracking running on GPU and CPU, respectively. The processing time is shown in Table 2. The time used by the visual-inertial odometry (126 in FIG. 2) does not vary much with respect to the environment or sensor configuration. For the GPU version, it consumes about 25% of a CPU thread executing at 50 Hz. For the CPU version, it takes about 75% of a thread. The sensor first suite results in slightly more processing time than the second sensor suite. This is because the scanner receives more points and the program needs more time to maintain the depthmap and associate depth to the visual features.

The scan matching (132 in FIG. 2) consumes more processing time which also varies with respect to the environment and sensor configuration. With the first sensor suite, the scan matching takes about 75% of a thread executing at 5 Hz if operated in structured environments. In vegetated environments, however, more points are registered on the map and the program typically consumes about 135% of a thread. With the second sensor suite, the scanner receives fewer points. The scan matching module 132 uses about 50-95% of a thread depending on the environment. The time used by the IMU prediction (132 in FIG. 2) is negligible compared to the other two modules.

Accuracy Tests

Tests were conducted to evaluate accuracy of the proposed system. In these tests, the first sensor suite was used. The sensors were mounted on an off-road vehicle driving around a university campus. After 2.7 km of driving within 16 minutes, a campus map was built. The average speed over the test was 2.8 m/s.

TABLE 2

Average CPU processing time using the first and second sensor suites

| Environment | Senor suite | Visual-inertial odometry (time per image frame) | | Scan Matching (time per laser scan) |
| --- | --- | --- | --- | --- |
| | | GPU Tracking | CPU Tracking | |
| Structured | First suite | 4.8 ms | 14.3 ms | 148 ms |
| | Second suite | 4.2 ms | 12.9 ms | 103 ms |
| Vegetated | First suite | 5.5 ms | 15.2 ms | 267 ms |
| | Second suite | 5.1 ms | 14.7 ms | 191 ms |

To evaluate motion estimation drift over the test, the estimated trajectory and registered laser points were aligned on a satellite image. Here, laser points on the ground are manually removed. It was determined, by matching the trajectory with streets on the satellite image, that an upper bound of the horizontal error was <1:0 m. It was also determined, by comparing buildings on the same floor, that the vertical error was <2:0 m. This gives an overall relative position drift at the end to be <0:09% of the distance traveled. It may be understood that precision cannot be guaranteed for the measurements, hence only an upper bound of the positional drift was calculated.

Further, a more comprehensive test was conducted having the same sensors mounted on a passenger vehicle. The passenger vehicle was driven on structured roads for 9.3 km of travel. The path traverses vegetated environments, bridges, hilly terrains, and streets with heavy traffic, and finally returns to the starting position. The elevation changes over 70 m along the path. Except waiting for traffic lights, the vehicle speed is between 9-18 m/s during the test. It was determined that a building found at both the start and the end of the path was registered into two. The two registrations occur because of motion estimation drift over the length of the path. Thus, the first registration corresponds to the vehicle at the start of the test and the second registration corresponds to the vehicle at the end of the test. The gap was measured to be <20 m, resulting in a relative position error at the end of <0:22% of the distance traveled.

Figure 11:
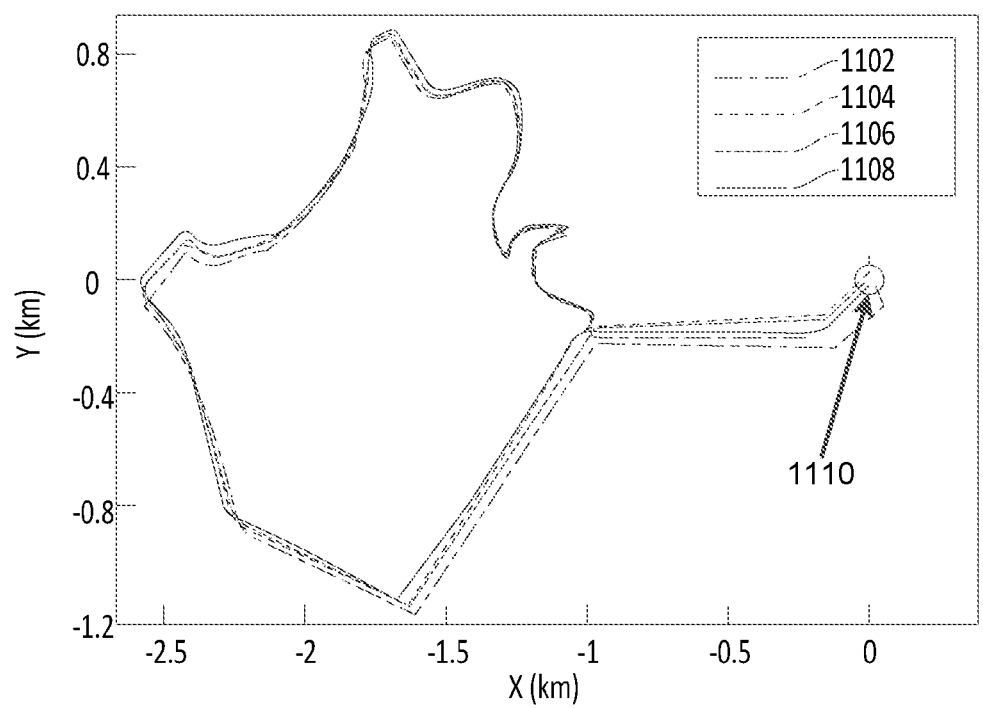
FIG. 11 illustrates an embodiment of estimated trajectories of a mobile mapping device.

Each module in the system contributes to the overall accuracy. FIG. 11 depicts estimated trajectories in an accuracy test. A first trajectory plot 1102 of the trajectory of a mobile sensor generated by the visual-inertial odometry system uses the IMU module 122 and the visual-inertial odometry module 126 (see FIG. 2).The configuration used in the first trajectory plot 1102 is similar to that depicted in FIG. 9B. A second trajectory plot 1104 is based on directly forwarding the IMU prediction from the IMU module 122 to the scan matching module, 132 (see FIG. 2) bypassing the visual-inertial odometry. This configuration is similar to that depicted in FIG. 9A. A third trajectory plot 1108 of the complete pipeline is based on the combination of the IMU module 122, the visual inertial odometry module 126, and the scan matching module 132 (see FIG. 2) has the least amount of drift. The position errors of the first two configurations, trajectory plot 1102 and 1104, are about four and two times larger, respectively.

The first trajectory plot 1102 and the second trajectory plot 1104 can be viewed as the expected system performance when encountering individual sensor degradation. If scan matching is degraded (see FIG. 9B), the system reduces to a mode indicated by the first trajectory plot 1102. If vision is degraded, (see FIG. 9A), the system reduces to a mode indicated by the second trajectory plot 1104. If none of the sensors is degraded, (see FIG. 2) the system incorporates all of the optimization functions resulting in the trajectory plot 1108. In another example, the system may take the IMU prediction as the initial guess and but run at the laser frequency (5 Hz). The system produces a fourth trajectory plot 1106. The resulting accuracy is only little better in comparison to the second trajectory plot 1104 which uses the IMU directly coupled with the laser, passing the visual-inertial odometry. The result indicates that functionality of the camera is not sufficiently explored if solving the problem with all constraints stacked together.

Another accuracy test of the system included running mobile sensor at the original 1× speed and an accelerated 2× speed. When running at 2× speed, every other data frame for all three sensors is omitted, resulting in much more aggressive motion through the test. The results are listed in Table 3. At each speed, the three configurations were evaluated. At 2× speed, the accuracy of the visual-inertial odometry and the IMU+scan matching configurations reduce significantly, by 0.54% and 0.38% of the distance traveled in comparison to the accuracy at 1× speed. However, the complete pipeline reduces accuracy very little, only by 0.04%. The results indicate that the camera and the laser compensate for each other keeping the overall accuracy. This is especially true when the motion is aggressive.

TABLE 3

Relative position errors as percentages of the distance traveled (Errors at 1x speed correspond to the trajectories in FIG. 11)

| Configuration | 1x speed | 2x speed |
| --- | --- | --- |
| Visual-inertial odometry | 0.93% | 1.47% |
| IMU + scan matching | 0.51% | 0.89% |
| Complete pipeline | 0.22% | 0.26% |

Figure 12:
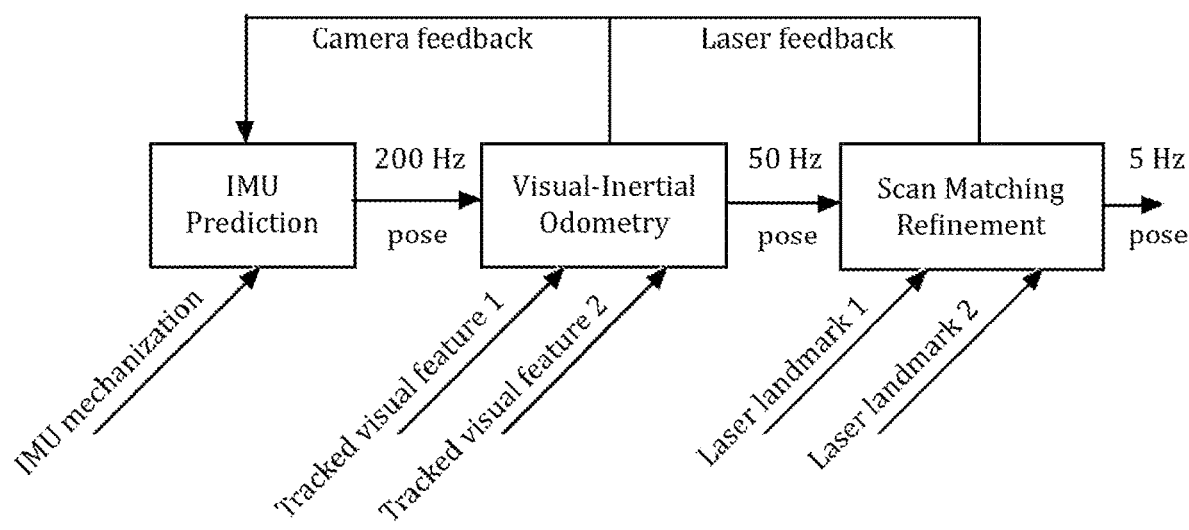
FIG. 12 illustrates bidirectional information flow according to an exemplary and non-limiting embodiment.

With reference to FIG. 12, there is illustrated an exemplary and non-limiting embodiment of bidirectional information flow. As illustrated, three modules comprising an IMU prediction module, a visual-inertial odometry module and a scan-matching refinement module solve the problem step by step from coarse to fine. Data processing flow is from left to right passing the three modules respectively, while feedback flow is from right to left to correct the biases of the IMU.

Figure 13A:
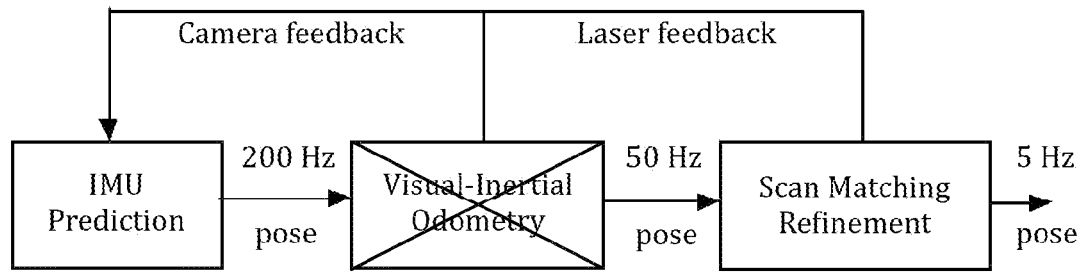
FIGS. 13a and 13b illustrate a dynamically reconfigurable system according to an exemplary and non-limiting embodiment.
Figure 13B:
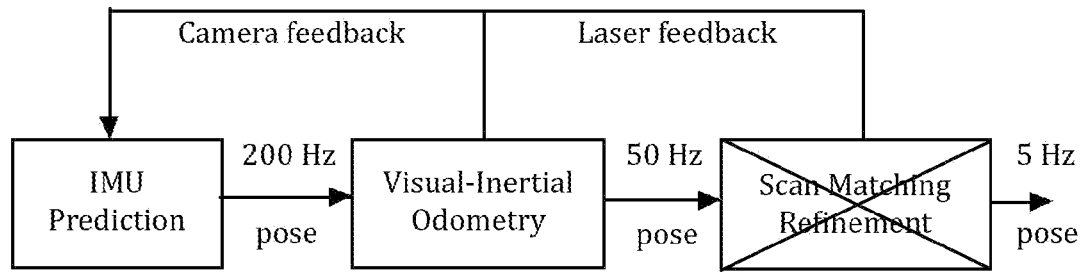

With reference to FIGS. 13a and 13b, there is illustrated an exemplary and non-limiting embodiment of a dynamically reconfigurable system. As illustrated in FIG. 13a, if visual features are insufficient for the visual-inertial odometry, the IMU prediction (partially) bypasses the visual-inertial odometry module to register laser points locally. On the other hand, if, as illustrated in FIG. 13b, environmental structures are insufficient for the scan matching, the visual-inertial odometry output (partially) bypasses the scan matching refinement module to register laser points on the map.

Figure 14:
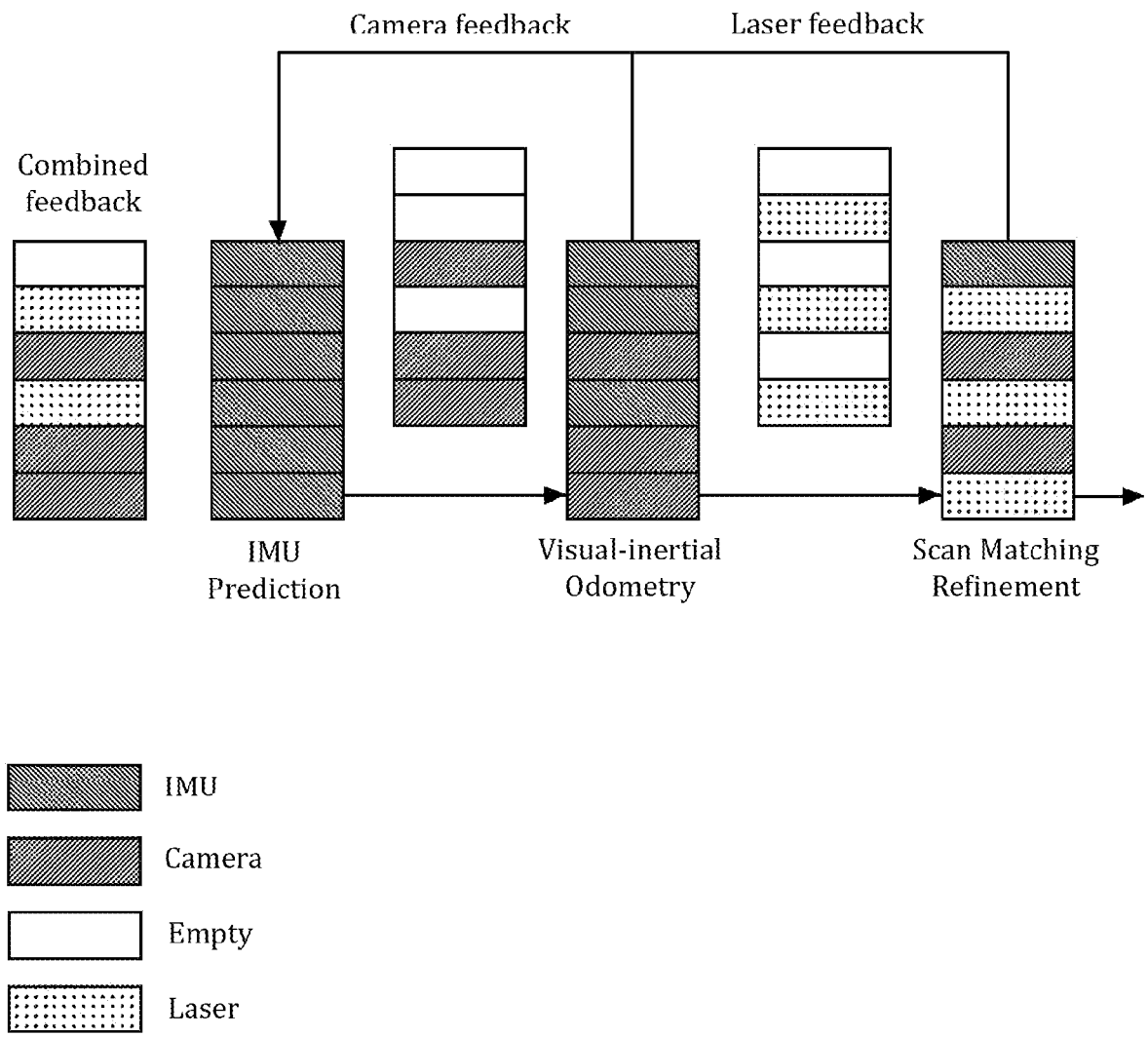
FIG. 14 illustrates priority feedback for IMU bias correction according to an exemplary and non-limiting embodiment.

With reference to FIG. 14, there is illustrated an exemplary and non-limiting embodiment of priority feedback for IMU bias correction. As illustrated, a vertical bar represents a 6-DOF pose and each row is a DOF. In a degraded case, starting with the IMU prediction on the left where all six rows designated are "IMU", the visual-inertial odometry updates in 3-DOF where the rows become designated "camera", then the scan matching updates in another 3-DOF where the rows turn designated "laser". The camera and the laser feedback is combined as the vertical bar on the left. The camera feedback has a higher priority—"laser" rows from the laser feedback are only filled in if "camera" rows from the camera feedback are not present.

Figure 15A:
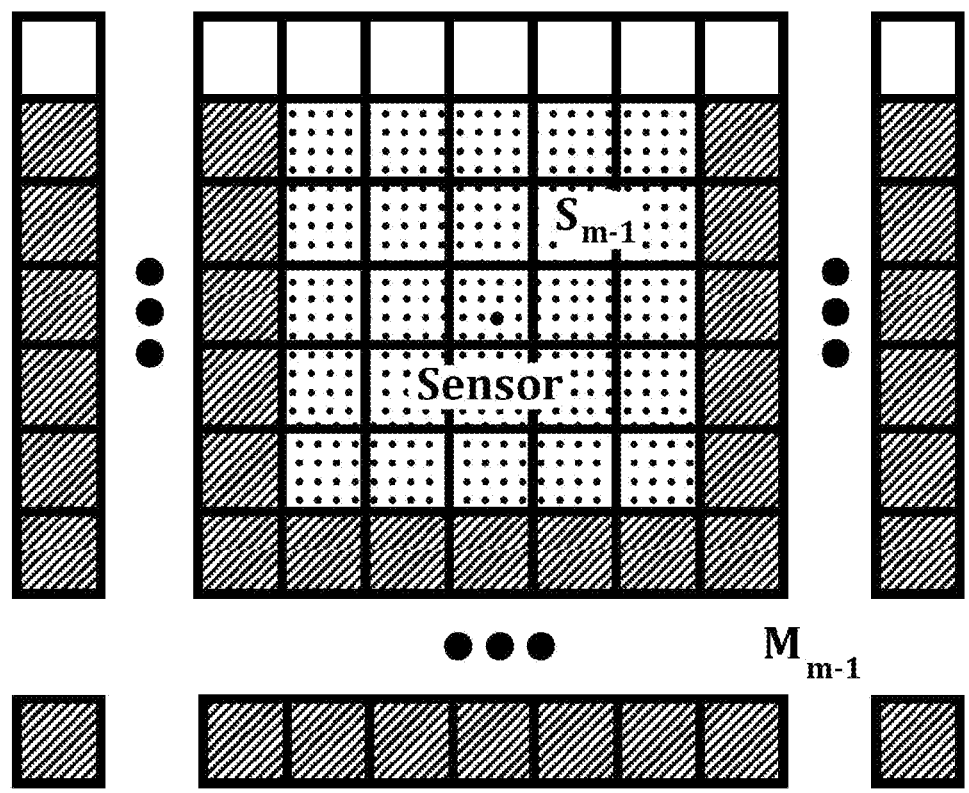
FIGS. 15a and 15b illustrate a two-layer voxel representation of a map according to an exemplary and non-limiting embodiment.
Figure 15B:
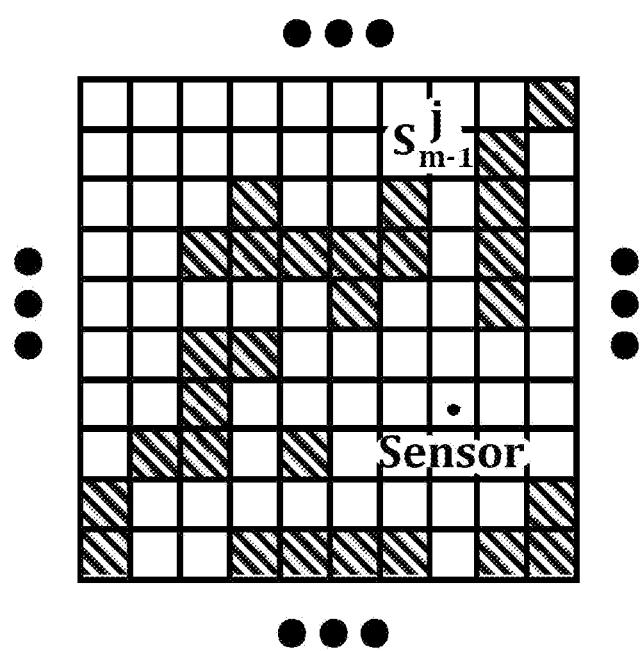

With reference to FIGS. 15a and 15b, there is illustrated an exemplary and non-limiting embodiment of two-layer voxel representation of a map. There is illustrated voxels on the map $M_{m-1}$ (all voxels in FIG. 15a), and voxels surrounding the sensor $S_{m-1}$ (dot filled voxels). $S_{m-1}$ is a subset of $M_{m-1}$. If the sensor approaches the boundary of the map, voxels on the opposite side of the boundary (bottom row) are moved over to extend the map boundary. Points in moved voxels are cleared and the map is truncated. As illustrated in FIG. 15b each voxel j, $j \in S_{m-1}$ (a dot filled voxel in FIG. 15a) is formed by a set of voxels $S_{m-1}^j$ that are a magnitude smaller (all voxels in (FIG. 15b)$\in S_{m-1}^j$). Before scan matching, the laser scan may be projected onto the map using the best guess of motion. Voxels in $\{S_{m-1}^j\}$, $j \in S_{m-1}$ occupied by points from the scan are labeled in cross-hatch. Then, map points in cross-hatched voxels are extracted and stored in 3D KD-trees for scan matching.

Figure 16A:
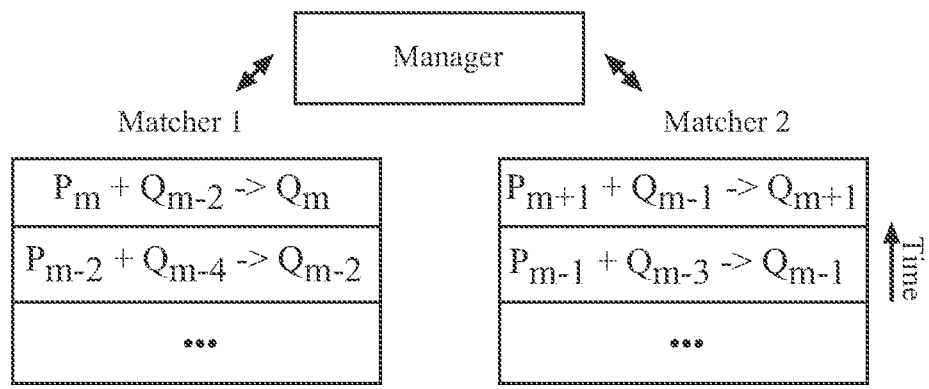
FIGS. 16a and 16b illustrate multi-thread processing of scan matching according to an exemplary and non-limiting embodiment.
Figure 16B:
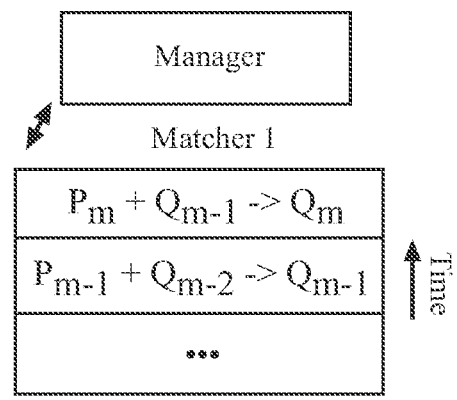

With reference to FIG. 16, there is illustrated an exemplary and non-limiting embodiment of multi-thread processing of scan matching. As illustrated, a manager program calls multiple matcher programs running on separate CPU threads and matches scans to the latest map available. FIG. 16a shows a two-thread case. Scans $P_m$, $P_{m-1}$, ..., are matched with map $Q_m$, $Q_{m-1}$, ..., on each matcher, giving twice amount of time for processing. In comparison, FIG. 16b shows a one-thread case, where $P_m$, $P_{m-1}$, ..., are matched with $Q_m$, $Q_{m-1}$, .... The implementation is dynamically configurable using up to four threads.

In embodiments, a real time SLAM system may be used in combination with a real time navigation system. In embodiments, the SLAM system may be used in combination with an obstacle detection system, such as a LIDAR- or RADAR-based obstacle detection system, a vision-based obstacle detection system, a thermal-based system, or the like. This may include detecting live obstacles, such as people, pets, or the like, such as by motion detection, thermal detection, electrical or magnetic field detection, or other mechanisms.

In embodiments, the point cloud that is established by scanning the features of an environment may be displayed, such as on a screen forming a part of the SLAM, to show a mapping of a space, which may include mapping of near field features, such as objects providing nearby reflections to the SLAM system, as well as far field features, such as items that can be scanned through spaces between or apertures in the near field features. For example, items in an adjacent hallway may be scanned through a window or door as the mapper moves through the interior of a room, because at different points in the interior of the room different outside elements can be scanned through such spaces or apertures. The resulting point cloud may then comprise comprehensive mapping data of the immediate near field environment and partial mapping of far field elements that are outside the environment. Thus, the SLAM system may include mapping of a space through a "picket fence" effect by identification of far-field pieces through spaces or apertures (i.e., gaps in the fence) in the near field. The far field data may be used to help the system orient the SLAM as the mapper moves from space to space, such as maintaining consistent estimation of location as the mapper moves from a comprehensively mapped space (where orientation and position are well known due to the density of the point cloud) to a sparsely mapped space (such as a new room). As the user moves from the near field to a far field location, the relative density or sparseness of the point cloud can be used by the SLAM system to guide the mapper via, for example, a user interface forming a part of the SLAM, such as directing the mapper to the parts of the far field that could not be seen through the apertures from another space.

In embodiments, the point cloud map from a SLAM system can be combined with mapping from other inputs such as cameras, sensors, and the like. For example, in a flight or spacecraft example, an airplane, drone, or other airborne mobile platform may already be equipped with other distance measuring and geo-location equipment that can be used as reference data for the SLAM system (such as linking the point cloud resulting from a scan to a GPS-referenced location) or that can take reference data from a scan, such as for displaying additional scan data as an overlay on the output from the other system. For example, conventional camera output can be shown with point cloud data as an overlay, or vice versa.

In embodiments, the SLAM system can provide a point cloud that includes data indicating the reflective intensity of the return signal from each feature. This reflective intensity can be used to help determine the efficacy of the signal for the system, to determine how features relate to each other, to determine surface IR reflectivity, and the like. In embodiments, the reflective intensity can be used as a basis for manipulating the display of the point cloud in a map. For example, the SLAM system can introduce (automatically, of under user control) some degree of color contrast to highlight the reflectivity of the signal for a given feature, material, structure, or the like. In addition, the system can be married with other systems for augmenting color and reflectance information. In embodiments, one or more of the points in the point cloud may be displayed with a color corresponding to a parameter of the acquired data, such as an intensity parameter, a density parameter, a time parameter and a geospatial location parameter. Colorization of the point cloud may help users understand and analyze elements or features of the environment in which the SLAM system is operating and/or elements of features of the process of acquisition of the point cloud itself. For example, a density parameter, indicating the number of points acquired in a geospatial area, may be used to determine a color that represents areas where many points of data are acquired and another color where data is sparse, perhaps suggesting the presence of artifacts, rather than "real" data. Color may also indicate time, such as progressing through a series of colors as the scan is undertaken, resulting in clear indication of the path by which the SLAM scan was performed. Colorization may also be undertaken for display purposes, such as to provide differentiation among different features (such as items of furniture in a space, as compared to walls), to provide aesthetic effects, to highlight areas of interest (such as highlighting a relevant piece of equipment for attention of a viewer of a scan), and many others.

In embodiments, the SLAM system can identify "shadows" (areas where the point cloud has relatively few data points from the scan) and can (such as through a user interface) highlight areas that need additional scanning. For example, such areas may blink or be rendered in a particular color in a visual interface of a SLAM system that displays the point cloud until the shadowed area is sufficiently "painted," or covered, by laser scanning. Such an interface may include any indicator (visual, text-based, voice-based, or the like) to the user that highlights areas in the field that have not yet been scanned, and any such indicator may be used to get the attention of the user either directly or through an external device (such as a mobile phone of the user). In accordance with other exemplary and non-limiting embodiments, the system may make reference to external data of data stored on the SLAM, such as previously constructed point clouds, maps, and the like, for comparison with current scan to identify unscanned regions.

In embodiments, the methods and systems disclosed herein include a SLAM system that provides real-time positioning output at the point of work, without requiring processing or calculation by external systems in order to determine accurate position and orientation information or to generate a map that consists of point cloud data showing features of an environment based on the reflected signals from a laser scan. In embodiments, the methods and systems disclosed herein may also include a SLAM system that provides real time positioning information without requiring post-processing of the data collected from a laser scan.

In embodiments, a SLAM system may be integrated with various external systems, such as vehicle navigation systems (such as for unmanned aerial vehicles, drones, mobile robots, unmanned underwater vehicles, self-driving vehicles, semi-automatic vehicles, and many others). In embodiments, the SLAM system may be used to allow a vehicle to navigate within its environments, without reliance on external systems like GPS.

In embodiments, a SLAM system may determine a level of confidence as to its current estimation of position, orientation, or the like. A level of confidence may be based on the density of points that are available in a scan, the orthogonality of points available in a scan, environmental geometries or other factors, or a combination thereof. The level of confidence may be ascribed to position and orientation estimates at each point along the route of a scan, so that segments of the scan can be referenced as low-confidence segments, high-confidence segments, or the like. Low-confidence segments can be highlighted for additional scanning, for use of other techniques (such as making adjustments based on external data), or the like. For example, where a scan is undertaken in a closed loop (where the end point of the scan is the same as the starting point, at a known origin location), any discrepancy between the calculated end location and the starting location may be resolved by preferentially adjusting location estimates for certain segments of the scan to restore consistency of the start- and end-locations. Location and position information in low-confidence segments may be preferentially adjusted as compared to high-confidence segments. Thus, the SLAM system may use confidence-based error correction for closed loop scans.

In an exemplary and non-limiting embodiment of this confidence-based adjustment, a derivation of the incremental smoothing and mapping (iSAM) algorithm originally developed by Michael Kaess and Frank Dellaert at Georgia Tech ("iSAM: Incremental Smoothing and Mapping" by M. Kaess, A. Ranganathan, and F. Dellaert, IEEE Trans. on Robotics, TRO, vol. 24, no. 6, December 2008, pp. 1365-1378, PDF) may be used. This algorithm processes map data in "segments" and iteratively refines the relative position of those segments to optimize the residual errors of matches between the segments. This enables closing loops by adjusting all data within the closed loop. More segmentation points allows the algorithm to move the data more significantly while fewer segmentation points generates more rigidity.

If one selects the points for segmentation based on a matching confidence metric, one may utilize this fact to make the map flexible in regions with low confidence and rigid in areas with high confidence so that the loop closure processing does not distribute local errors through sections of the map that are accurate. This can be further enhanced by weighting the segmentation points to assign "flexibility" to each point and distribute error based on this factor.

In embodiments, confidence measures with respect to areas or segments of a point cloud may be used to guide a user to undertake additional scanning, such as to provide an improved SLAM scan. In embodiments, a confidence measure can be based on a combination of density of points, orthogonality of points and the like, which can be used to guide the user to enable a better scan. It is noted that scan attributes, such as density of points and orthogonality of points, may be determined in real time as the scan progresses. Likewise, the system may sense geometries of the scanning environment that are likely to result in low confidence measures. For example, long hallways with smooth walls may not present any irregularities to differentiate one scan segment from the next. In such instances, the system may assign a lower confidence measure to scan data acquired in such environments. The system can use various inputs such as LIDAR, camera, and perhaps other sensors to determine diminishing confidence and guide the user through a scan with instructions (such as "slow down," "turn left" or the like). In other embodiments, the system may display areas of lower than desired confidence to a user, such as via a user interface, while providing assistance in allowing the user to further scan the area, volume or region of low confidence.

In embodiments, a SLAM output may be fused with other content, such as outputs from cameras, outputs from other mapping technologies, and the like. In embodiments, a SLAM scan may be conducted along with capture of an audio track, such as via a companion application (optionally a mobile application) that captures time-coded audio notes that correspond to a scan. In embodiments, the SLAM system provides time-coding of data collection during scanning, so that the mapping system can pinpoint when and where the scan took place, including when and where the mapper took audio and/or notes. In embodiments, the time coding can be used to locate the notes in the area of the map where they are relevant, such as by inserting data into a map or scan that can be accessed by a user, such as by clicking on an indicator on the map that audio is available. In embodiments, other media formats may be captured and synchronized with a scan, such as photography, HD video, or the like. These can be accessed separately based on time information, or can be inserted at appropriate places in a map itself based on the time synchronization of the scan output with time information for the other media. In embodiments, a user may use time data to go back in time and see what has changed over time, such as based on multiple scans with different time-encoded data. Scans may be further enhanced with other information, such as date- or time-stamped service record data. Thus, a scan may be part of a multi-dimensional database of a scene or space, where point cloud data is associated with other data or media related to that scene, including time-based data or media. In embodiments, calculations are maintained through a sequence of steps or segments in a manner that allows a scan to be backed up, such as to return to a given point in the scan and re-initiate at that point, rather than having to re-initiate a new scan starting at the origin. This allows use of partial scan information as a starting point for continuing a scan, such as when a problem occurs at a later point in a scan that was initially producing good output. Thus, a user can "unzip" or "rewind" a scan back to a point, and then recommence scanning from that point. The system can maintain accurate position and location information based on the point cloud features and can maintain time information to allow sequencing with other time-based data. Time-based data can also allow editing of a scan or other media to synchronize them, such as where a scan was completed over time intervals and needs to be synchronized with other media that was captured over different time intervals. Data in a point cloud may be tagged with timestamps, so that data with timestamps occurring after a point in time to which a rewind is undertaken can be erased, such that the scan can re-commence from a designated point. In embodiments, a rewind may be undertaken to a point in time and/or to a physical location, such as rewinding to a geospatial coordinate.

In embodiments, the output from a SLAM-based map can be fused with other content, such as HD video, including by colorizing the point cloud and using it as an overlay. This may include time-synchronization between the SLAM system and other media capture system. Content may be fused with video, still images of a space, a CAD model of a space, audio content captured during a scan, metadata associated with a location, or other data or media.

In embodiments, a SLAM system may be integrated with other technologies and platforms, such as tools that may be used to manipulate point clouds (e.g., CAD). This may include combining scans with features that are modeled in CAD modeling tools, rapid prototyping systems, 3D printing systems, and other systems that can use point cloud or solid model data. Scans can be provided as inputs to post-processing tools, such as colorization tools. Scans can be provided to mapping tools, such as for adding points of interest, metadata, media content, annotations, navigation information, semantic analysis to distinguish particular shapes and/or identify objects, and the like.

Outputs can be combined with outputs from other scanning and image-capture systems, such as ground penetrating radar, X-ray imaging, magnetic resonance imaging, computed tomography imaging, thermal imaging, photography, video, SONAR, RADAR, LIDAR and the like. This may include integrating outputs of scans with displays for navigation and mapping systems, such as in-vehicle navigation systems, handheld mapping systems, mobile phone navigation systems, and others. Data from scans can be used to provide position and orientation data to other systems, including X, Y and Z position information, as well as pitch, roll and yaw information.

The data obtained from a real time SLAM system can be used for many different purposes, including for 3D motion capture systems, for acoustics engineering applications, for biomass measurements, for aircraft construction, for archeology, for architecture, engineering and construction, for augmented reality (AR), for autonomous cars, for autonomous mobile robot applications, for cleaning and treatment, for CAD/CAM applications, for construction site management (e.g., for validation of progress), for entertainment, for exploration (space, mining, underwater and the like), for forestry (including for logging and other forestry products like maple sugar management), for franchise management and compliance (e.g., for stores and restaurants), for imaging applications for validation and compliance, for indoor location, for interior design, for inventory checking, for landscape architecture, for mapping industrial spaces for maintenance, for mapping trucking routes, for military/intelligence applications, for mobile mapping, for monitoring oil pipelines and drilling, for property evaluation and other real estate applications, for retail indoor location (such as marrying real time maps to inventory maps, and the like), for security applications, for stockpile monitoring (ore, logs, goods, etc.), for surveying (including doing pre-scans to do better quoting), for UAVs/drones, for mobile robots, for underground mapping, for 3D modeling applications, for virtual reality (including colorizing spaces), for warehouse management, for zoning/planning applications, for autonomous missions, for inspection applications, for docking applications (including spacecraft and watercraft), for cave exploration, and for video games/augmented reality applications, among many others. In all use scenarios, the SLAM system may operate as described herein in the noted areas of use.

In accordance with an exemplary and non-limiting embodiment, the unit comprises hardware synchronization of the IMU, camera (vision) and the LiDAR sensor. The unit may be operated in darkness or structureless environments for a duration of time. The processing pipeline may be comprised of modules. In darkness, the vision module may be bypassed. In structureless environments, the LiDAR module may be bypassed or partially bypassed. In exemplary and non-limiting embodiments, the IMU, Lidar and camera data are all time stamped and capable of being temporally matched and synchronized. As a result, the system can act in an automated fashion to synchronize image data and point cloud data. In some instances, color data from synchronized camera images may be used to color clod data pixels for display to the user.

The unit may comprise four CPU threads for scan matching and may run at, for example, 5 Hz with Velodyne data. The motion of the unit when operating may be relatively fast. For example, the unit may operate at angular speeds of approximately 360 degree/second and linear speeds of approximately 30 m/s.

The unit may localize to a prior generated map. For example, instead of building a map from scratch, the unit's software may refer to a previously built map and produce sensor poses and a new map within the framework (e.g., geospatial or other coordinates) of the old map. The unit can further extend a map using localization. By developing a new map in the old map frame, the new map can go further on and out of the old map. This enables different modes of use including branching and chaining, in which an initial "backbone" scan is generated first and potentially post-processed to reduce drift and/or other errors before resuming from the map to add local details, such as side rooms in building or increased point density in a region of interest. By taking this approach, the backbone model may be generated with extra care to limit the global drift and the follow-on scans may be generated with the focus on capturing local detail. It is also possible for multiple devices to perform the detailed scanning off of the same base map for faster capture of a large region.

It is also possible to resume off of a model generated by a different type of device or even generated from a CAD drawing. For example, a higher global accuracy stationary device could build a base map and a mobile scanner could resume from that map and fill in details. In an alternate embodiment, a longer range device may scan the outside and large inside areas of a building and a shorter range device may resume from that scan to add in smaller corridors and rooms and required finer details. Resuming from CAD drawings could have significant advantages for detecting differences between CAD and as-built rapidly.

Resuming may also provide location registered temporal data. For example, multiple scans may be taken of a construction site over time to see the progress visually. In other embodiments multiple scans of a factory may help with tracking for asset management.

Resuming may alternately be used to purely provide localization data within the prior map. This may be useful for guiding a robotic vehicle or localizing new sensor data, such as images, thermal maps, acoustics, etc within an existing map.

In some embodiments, the unit employs relatively high CPU usage in a mapping mode and relatively low CPU usage in a localization mode, suitable for long-time localization/navigation. In some embodiments, the unit supports long-time operations by executing an internal reset every once in a while. This is advantageous as some of the values generated during internal processing increase over time. Over a long period of operation (e.g., a few days), the values may reach a limit, such as a logical or physical limit of storage for the value in a computer, causing the processing, absent a reset, to potentially fail. In some instances, the system may automatically flush RAM memory to improve performance. In other embodiments, the system may selectively down sample older scanned data as might be necessary when performing a real time comparison of newly acquired data with older and/or archived data.

In other exemplary embodiments, the unit may support a flying application and aerial-ground map merging. In other embodiments, the unit may compute a pose output at the IMU frequency, e.g., 100 Hz. In such instances, the software may produce maps as well as sensor poses. The sensor poses tell the sensor position and pointing with respect to the map being developed. High frequency and accurate pose output helps in mobile autonomy because vehicle motion control requires such data. The unit further employs covariance and estimation confidence and may lock a pose when the sensor is static.

Figure 17A:
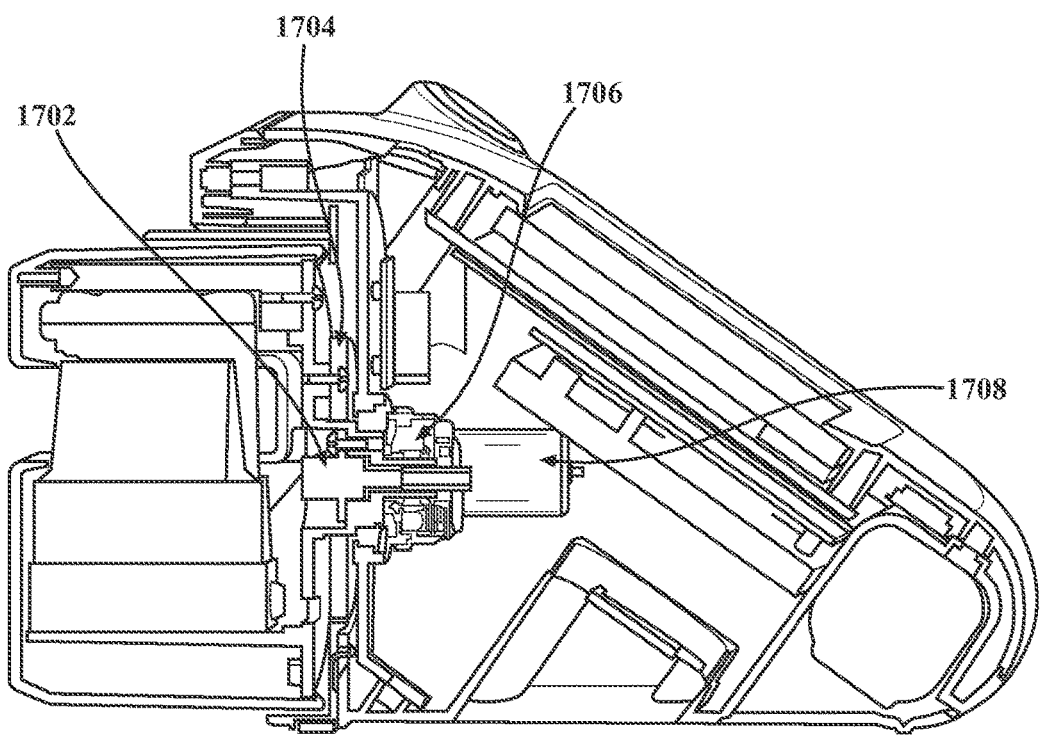
FIGS. 17a and 17b illustrate exemplary and non-limiting embodiments of a SLAM system.
Figure 17B:
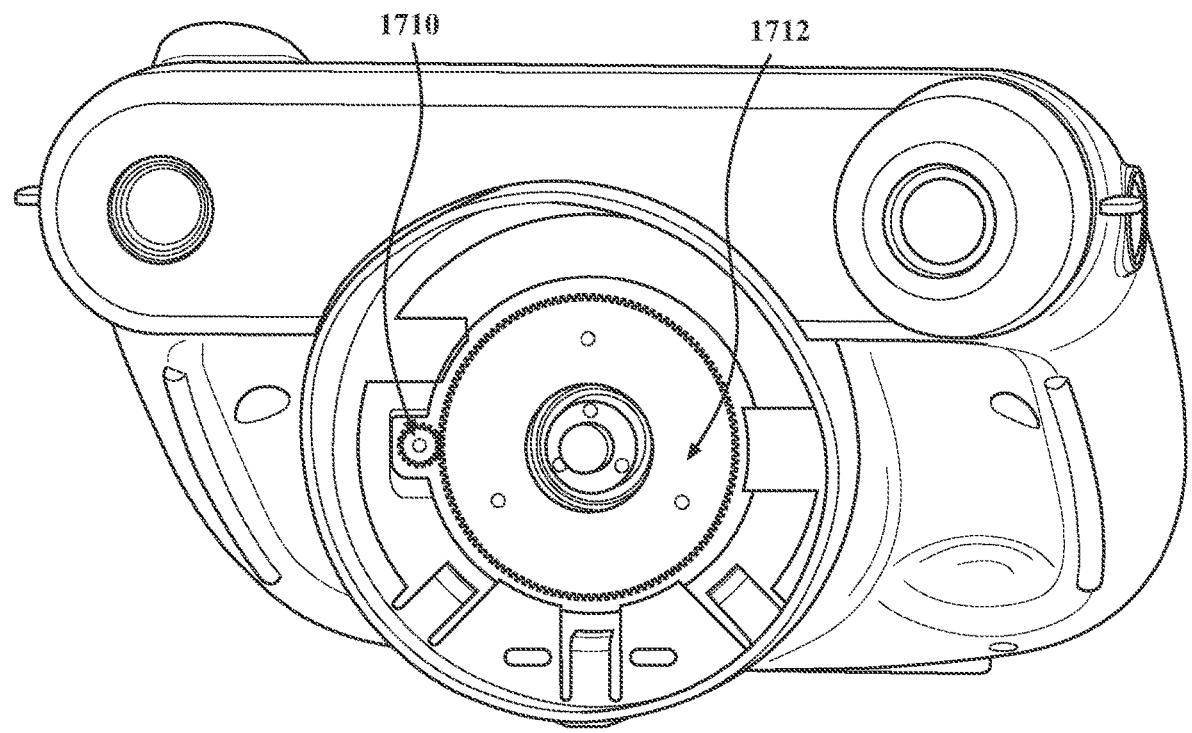

With reference to FIGS. 17(a)-17(b) there is illustrated exemplary and non-limiting embodiments of a SLAM. LIDAR is rotated to create a substantially hemispherical scan. This is performed by a mechanism with a DC motor driving a spur gear reduction to LIDAR mount via a spur gear assembly 1704. The spur gear reduction assembly 1704 enables the LIDAR to be offset from the motor 1708. There is a slip ring in line with the rotation of the LIDAR to provide power and receive data from the spinning LIDAR. An encoder 1706 is also in line with the rotation of the LIDAR to record the orientation of the mechanism during scanning. A thin section contact bearing supports the LIDAR rotation shaft. Counterweights on the LIDAR rotation plate balance the weight about the axis of rotation making the rotation smooth and constant. As depicted in the LIDAR drive mechanism and attachment figures below, the mechanism is designed with minimal slop and backlash to enable maintenance of a constant speed for interpolation of scan point locations. Note that a motor shaft 1710 is in physical communication with a LIDAR connector 1712.

Figure 18:
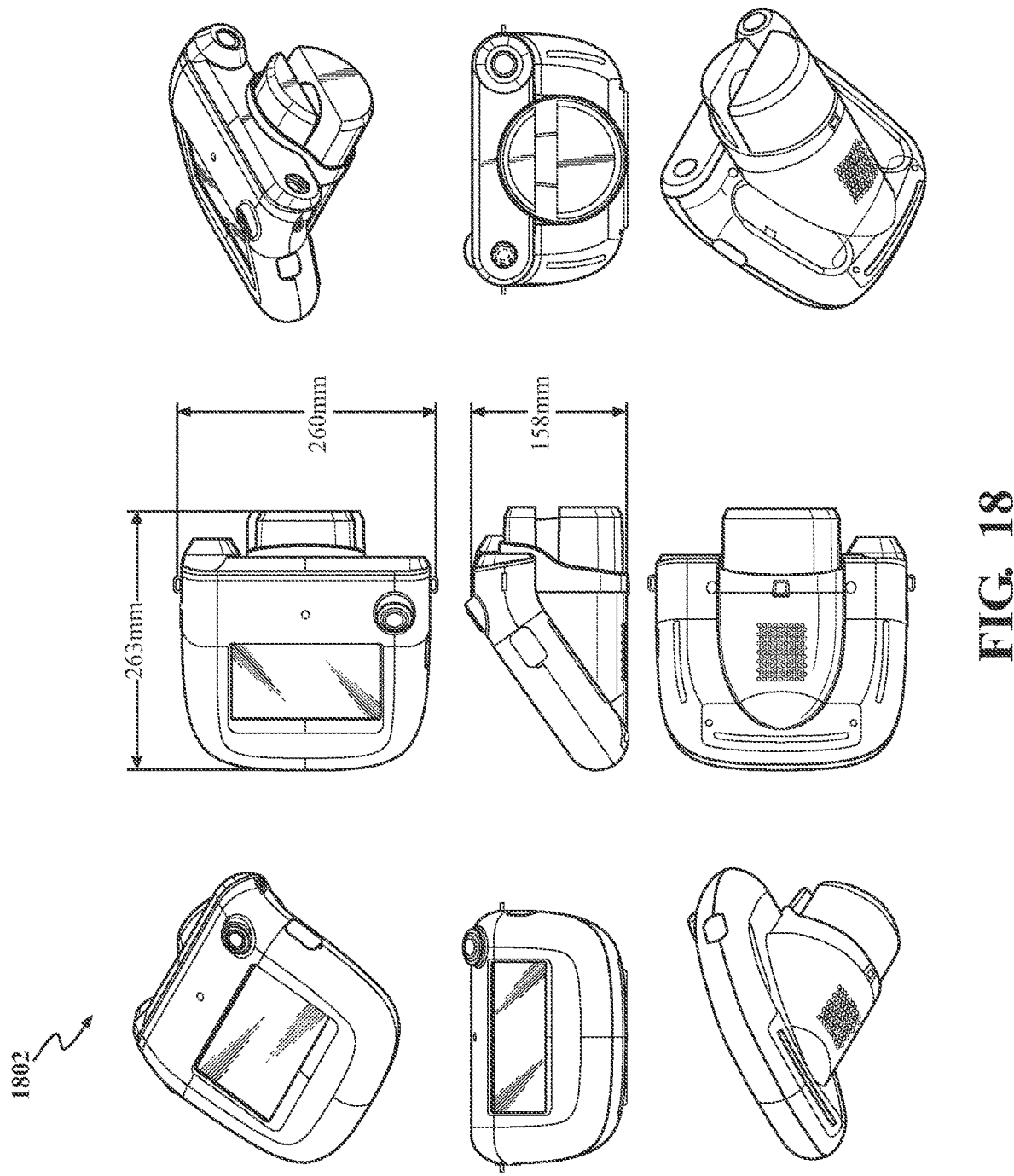
FIG. 18 illustrates an exemplary and non-limiting embodiment of a SLAM enclosure.

With reference to FIG. 18, there is illustrated an exemplary and non-limiting embodiment of a SLAM enclosure 1802. The SLAM enclosure 1802 is depicted in a variety of views and perspectives. Dimensions are representative of an embodiment and non-limiting as the size may be similar or different, while maintaining the general character and orientation of the major components, such as the LIDAR, odometry camera, colorization camera, user interface screen, and the like.

In some embodiments, the unit may employ a neck brace, shoulder brace, carrier, or other wearable element or device (not shown), such as to help an individual hold the unit while walking around. The unit or a supporting element or device may include one or more stabilizing elements to reduce shaking or vibration during the scan. In other embodiments, the unit may employ a remote battery that is carried in a shoulder bag or the like to reduce the weight of the handheld unit, whereby the scanning device has an external power source.

In other embodiments, the cameras and LIDAR are arranged to maximize a field of view. The camera-laser arrangement poses a tradeoff. On one side, the camera blocks the laser FOV and on the other side, the laser blocks the camera. In such an arrangement, both are blocked slightly but the blocking does not significantly sacrifice the mapping quality. In some embodiments, the camera points in the same direction as the laser because the vision processing is assisted by laser data. Laser range measurements provide depth information to the image features in the processing.

Figure 19A:
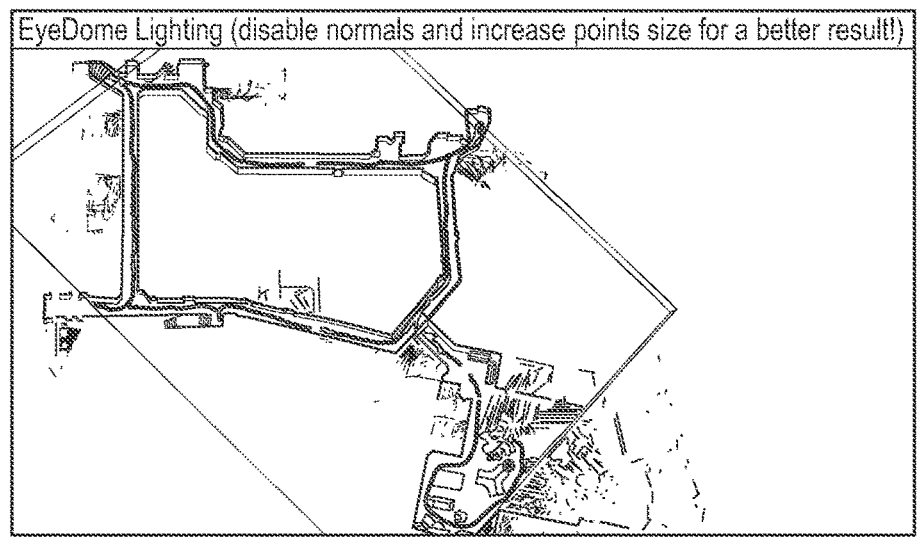
FIGS. 19a, 19b and 19c illustrate exemplary and non-limiting embodiments of a point cloud showing confidence levels.
Figure 19B:
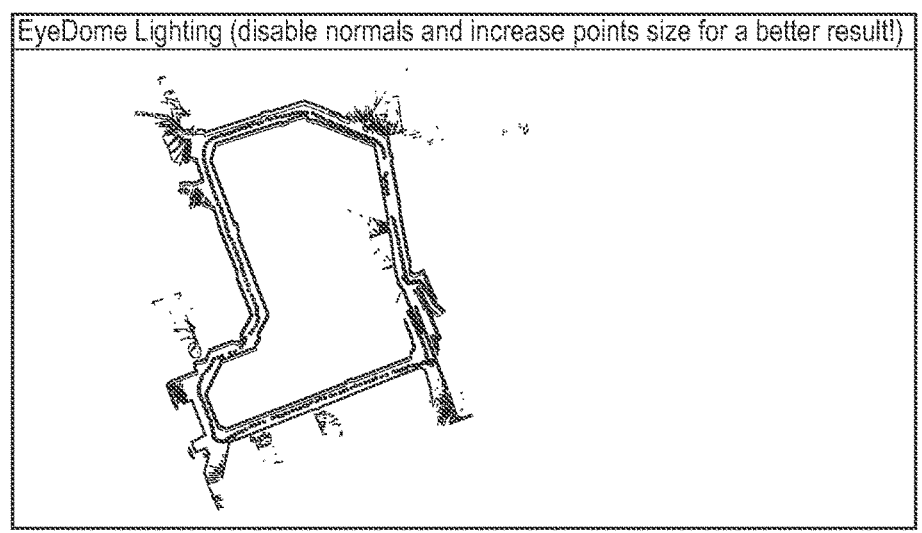
Figure 19C:
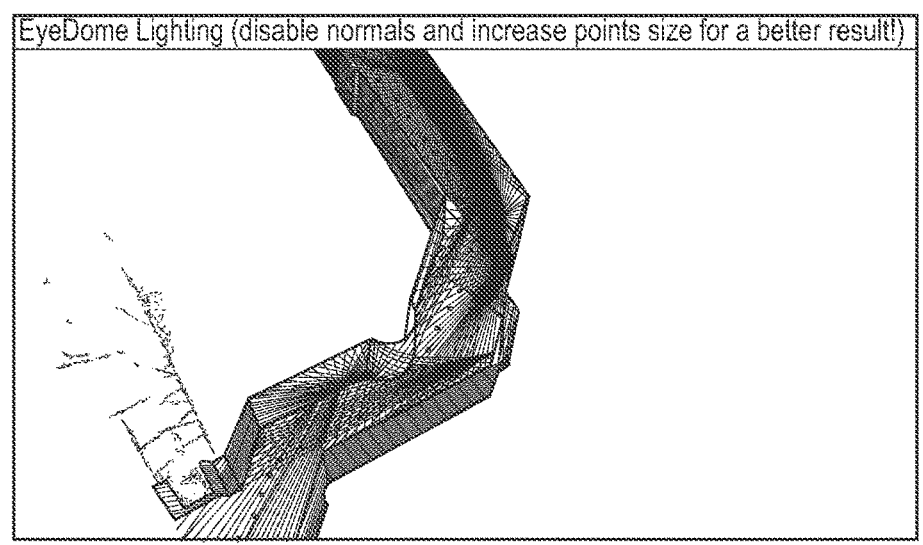

In some embodiments, there may be employed a confidence metric representing a confidence of spatial data. Such a confidence metric measurement may include, but is not limited to, number of points, distribution of points, orthogonality of points, environmental geometry, and the like. One or more confidence metrics may be computed for laser data processing (e.g., scan matching) and for image processing. With reference to FIGS. 19(a)-19(c), there are illustrated exemplary and non-limiting example images showing point clouds differentiated by laser match estimation confidence. While in practice, such images may be color coded, as illustrated, both the trajectory and the points are rendered as solid or dotted in the cloud based on a last confidence value at the time of recording. In the examples, dark gray is bad and light gray is good. The values are thresholded such that everything with a value >10 is solid. Through experimentation it has been found that with a Velodyne <1 is unreliable, <10 is less reliable, >10 is very good.

Using these metrics enables automated testing to resolve model issues and offline model correction such as when utilizing a loop-closure tool as discussed elsewhere herein. Use of these metrics further enables alerting the user when matches are bad and possibly auto-pausing, throwing out low confidence data, and alerting the user when scanning. FIG. 19(a) illustrates a scan of a building floor performed at a relatively slow pace. FIG. 19(b) illustrates a scan of the same building floor performed at a relatively quicker pace. Note the prevalence of light fray when compared to the scan acquired from a slower scan pace arising, in part, from the speed at which the scan is conducted. FIG. 19(c) illustrates a display zoomed in on a potential trouble spot of relatively low confidence.

Figure 20:
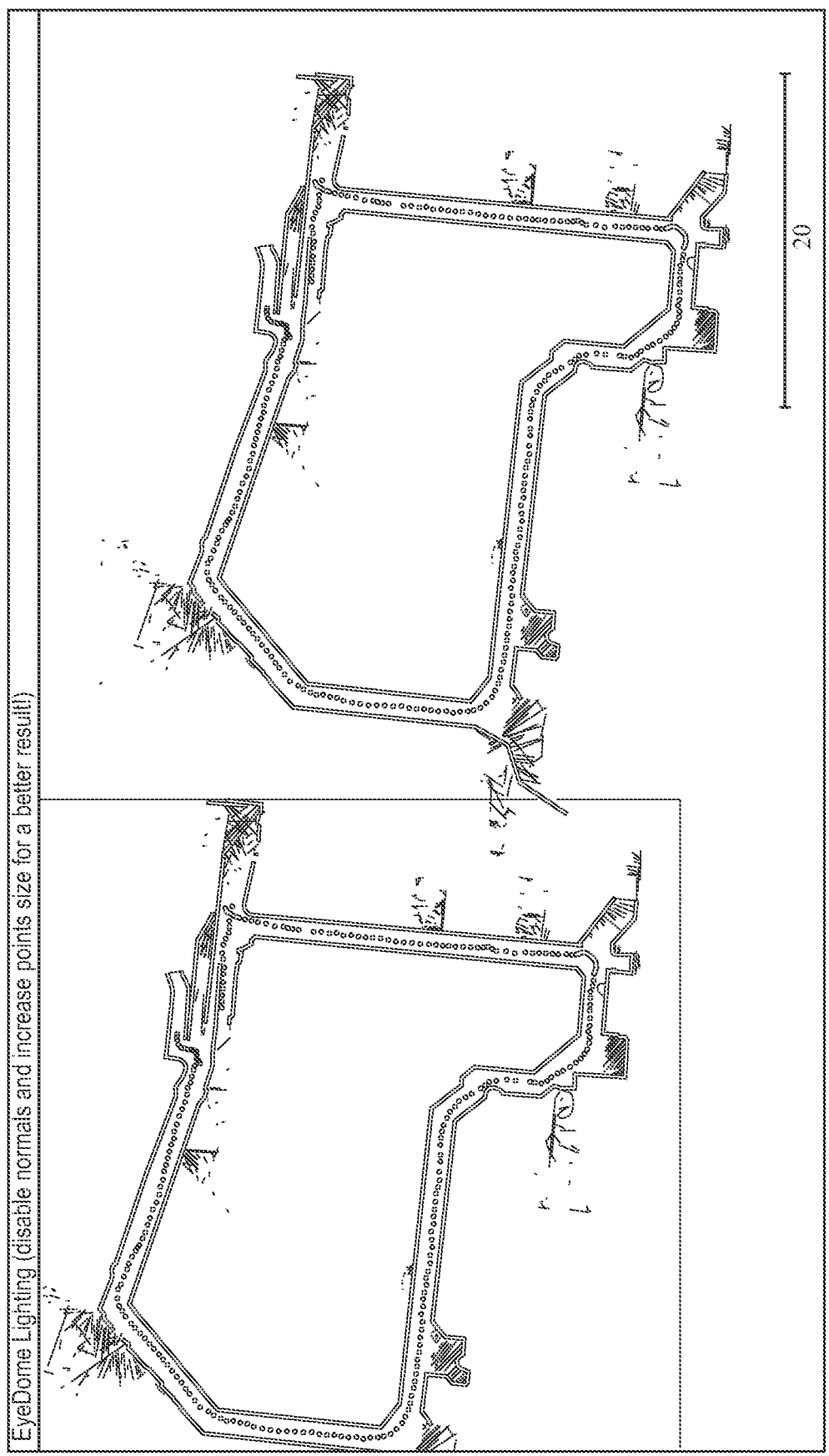
FIG. 20 illustrates an exemplary and non-limiting embodiment of differing confidence level metrics.

With reference to FIG. 20, there is illustrated an exemplary and non-limiting embodiment of scan-to-scan match confidence metric processing and an average number of visual features that track between a full laser scan and a map being built from the prior full laser scans may be computed and presented visually. This metric may present useful, but different confidence measures. In FIG. 20, a laser scan confidence metric view is presented in the left frame while an average number of visual features metric is presented in the right frame for the same data. Again, dark gray line indicates lower confidence and/or fewer average number of visual features.

In some embodiments, there may be employed loop closure. For example, the unit may be operated as one walks around a room, cubicle, in and out of offices, and then back to a starting point. Ideally the mesh of data from the start and end point should mesh exactly. In the reality, there may be some drift. The algorithms described herein greatly minimize such drift. Typical reduction is on the order of 10× versus conventional methods (0.2% v 2%). This ratio reflects the error in distance between the start point and end point divided by the total distance traversed during the loop. In some embodiments, the software recognizes that it is back to a starting point and it can relock to the origin. Once done, one may take the variation and spread it over all of the collected data. In other embodiments, one may lock in certain point cloud data where a confidence metric indicates that the data confidence was poor and one may apply the adjustments to the areas with low confidence.

In general, the system may employ both explicit and implicit loop closure. In some instances, a user may indicate, such as via a user interface forming a part of the SLAM, that a loop is to be closed. This explicit loop closure may result in the SLAM executing software that operates to match recently scanned data to data acquired at the beginning of the loop in order to snap the beginning and end acquired data together and close the loop. In other embodiments, the system may perform implicit loop closure. In such instances, the system may operate in an automated fashion to recognize that the system is actively rescanning a location that that comprises a point or region of origin for the scan loop.

In some embodiments, there may be employed confidence-based loop closure. First, one may determine a start and end point of a loop scan of an area that includes multiple segments. Then, one may determine a confidence of a plurality of the multiple segments. One may then make an adjustment to the lower quality segments rather than the higher quality segments in order for the beginning and end of the loop to be coincident.

In other exemplary embodiments, there may be performed multi-loop confidence-based loop closure. In yet other embodiments, there may be employed semantically adjusted confidence-based loop closure. For example, structural information may be derived from the attribution of a scanned element, i.e., floors are flat, corridors are straight, etc.

In some instances, there may be employed colorization of LIDAR point cloud data. In some embodiments, coarse colorization may be employed in real time to collected points to help identify what has been captured. In other embodiments, off-line photorealistic colorization may be employed. In other embodiments, each pixel in the camera can be mapped to a unique LIDAR pixel. For example, one may take color data from a pixel in the colorization camera corresponding to LIDAR data in the point cloud, and add the color data to the LIDAR data.

In accordance with exemplary and non-limiting embodiments, the unit may employ a sequential, multi-layer processing pipeline, solving for motion from coarse to fine. In each layer of the optimization, the prior coarser result is used as an initial guess to the optimization problem. The steps in the pipeline are:

1. Start with IMU mechanization for motion prediction, which provides high frequency updates (on order of 200 Hz), but is subject to high levels of drift.
2. Then this estimate is refined by a visual-inertial odometry optimization at the frame rate of the cameras (30-40 Hz), the optimization problem uses the IMU motion estimate as an initial guess of pose change and adjusts that pose change in an attempt to minimize residual squared errors in motion between several features tracked from the current camera frame to a key frame.
3. Then this estimate is further refined by a laser odometry optimization at a lower rate determined by the "scan frame" rate. Scan data comes in continuously, and software segments that data into frames, similar to image frames, at a regular rate, currently that rate is the time it takes for one rotation of the LIDAR rotary mechanism to make each scan frame a full hemisphere of data. That data is stitched together using visual-inertial estimates of position change as the points within the same scan frame are gathered. In the LIDAR odometry pose optimization step the visual odometry estimate is taken as an initial guess and the optimization attempts to reduce residual error in tracked features in the current scan frame matched to the prior scan frame.
4. In the final step, the current scan frame is matched to the entire map so far. The laser odometry estimate is taken as the initial guess and the optimization minimizes residual squared errors between features in the current scan frame and features in the map so far.

The resulting system enables high-frequency, low-latency ego-motion estimation, along with dense, accurate 3D map registration. Further, the system is capable of handling sensor degradation by automatic reconfiguration bypassing failure modules since each step can correct errors in the prior step. Therefore, it can operate in the presence of highly dynamic motion as well as in dark, texture-less, and structure-less environments. During experiments, the system demonstrates 0.22% of relative position drift over 9.3 km of navigation and robustness with respect to running, jumping and even highway speed driving (up to 33 m/s).

Other key features of such a system may include:

Visual Feature Optimization w/ and w/o Depth:

The software may attempt to determine a depth of tracked visual features, first by attempting to associate them with the laser data and secondly by attempting to triangulate depth between camera frames. The feature optimization software may then utilize all features with two different error calculations, one for features with depth and one for features without depth.

Laser Feature Determination:

The software may extract laser scan features as the scan line data comes in rather than in the entire scan frame. This is much easier and is done by looking at the smoothness at each point, which is defined by the relative distance between that point and the K nearest points on either side of that point then labeling the smoothest points as planar features and the sharpest as edge features. It also allows for the deletion of some points that may be bad features.

Map Matching and Voxelization:

A Part of how the Laser Matching Works in Real-time is how the map and feature data is stored. Tracking the processor load of this stored data is critical to long term scanning and selectively voxelizing, or down-sampling into three-dimensional basic units in order to minimize the data stored while keeping what is needed for accurate matching. Adjusting the voxel sizes, or basic units, of this down-sampling on the fly based on processor load may improve the ability to maintaining real-time performance in large maps.

Parallel Processing:

The software may be setup in such a way that it can utilize parallel processing to maintain real-time performance if data comes in faster than the processor can handle it. This is more relevant with faster point/second LIDARS like the velodyne.

Robustness:

The way the system uses separate optimization steps without including the prior steps estimates as part of the next estimate (aside from being the initial guess) creates some inherent robustness.

Confidence Metrics:

Each optimization step in this process may provide information on the confidence in its own results. In particular, in each step, the following can be evaluated to provide a measure of confidence in results: the remaining residual squared error after the optimization, the number of features tracked between frames, and the like.

The user may be presented a down scaled, (e.g., sub sampled) version of the multi-spectral model being prepared with data being acquired by the device. In an example, each measured 3 cm×3 cm×3 cm cube of model data may be represented in the scaled down version presented on the user interface as a single pixel. The pixel selected for display may be the pixel that is closest to the center of the cube. A representative down-scaled display being generated during operation of the SLAM is shown below. As described, the decision to display a single pixel in a volume represents a binary result indicative of either the presence of one or more points in a point cloud occupying a spatial cube of defined dimensions or the absence of any such points. In other exemplary embodiments, the selected pixel may be attributed, such as with a value indicating the number of pixels inside the defined cube represented by the selected pixel. This attribute may be utilized when displaying the sub sampled point cloud such as by displaying each selected pixel utilizing color and/or intensity to reflect the value of the attribute.

A visual frame comprises a single 2D color image from the colorization camera. A LIDAR segment comprises s full 360 degree revolution of the LIDAR scanner. The visual frame and LIDAR segment are synchronized so that they can be combined and aligned with the existing model data based on the unit positional data captured from the IMU and related sensors, such as the odometry (e.g., a high speed black/white) camera.

Problems giving rise to lower confidence metrics include, but are not limited to, reflections off of glossy walls, glass, transparent glass and narrow hallways. In some embodiments, a user of the unit may pause and resume a scan such as by, for example, hitting a pause button and/or requesting a rewind to a point that is a predetermined or requested number of seconds in the past.

In accordance with an exemplary and non-limiting embodiment, rewinding during a scan may proceed as follows. First, the user of the system indicates a desire to rewind. This may be achieved through the manipulation of user interface forming a part of the SLAM. As a result of indicating a desire to rewind, the system deletes or otherwise removes a portion of scanned data points corresponding to a duration of time. As all scanned data points are time stamped, the system can effectively remove data points after a predetermined time, thus, "rewinding" back to a previous point in a scan. As discussed herein, images from the camera are gathered and time stamped during each scan, As a result, after removing data points after a predetermined point in time, the system may provide the user with a display of an image recorded at the predetermined point in time while displaying the scanned point cloud rewound to the predetermined point in time. The image acts as a guide to help the user of the system reorient the SLAM into a position closely matching the orientation and pose of the SLAM at the previous predetermined point in time. Once the user is oriented close to the previous orientation of the SLAM at the predetermined point in time, the user may indicate a desire to resume scanning such as by engaging a "Go" button on a user interface of the SLAM. In response to the command to resume scanning, the SLAM may proceed execute a processing pipeline utilizing newly scanned data to form an initial estimation of the SLAMs position and orientation. During this process, the SLAM may not add new data to the scan but, rather, may use the newly scanned data to determine and display an instantaneous confidence level of the user's position as well as a visual representation of the extent to which newly acquired data corresponds to the previous scan data. Lastly, once it is established that the SLAM's location and orientation are sufficiently determined with respect to the previously scanned data, scanning may continue.

As described above, this ability to rewind is enabled, in part, by the data being stored. One may estimate how many points are brought in per second and then estimate how much to "rewind". The unit may inform the user where he was x seconds a go and allow the user to move to that location and take a few scans to confirm that the user is at the appropriate place. For example, the user may be told an approximate place to go to (or the user indicate where they want to restart). If the user is close enough, the unit may figure it out where the user is and tell the user if they are close enough.

In other exemplary embodiments, the unit may operate in transitions between spaces. For example, If a user walks very quickly through a narrow doorway there may not be enough data and time to determine the user's place in the new space. Specifically, in this example, the boundaries of a door frame may, prior to proceeding through it, block the LIDAR from imaging a portion of the environment beyond the door sufficient to establish a user's location. One option is to detect this lowering of confidence metric and signal to the operator to modify his behavior upon approaching a narrow passage to slow down, such as by a flashing a visual indicator or a changing the color of the screen, and the like.

Figure 21:
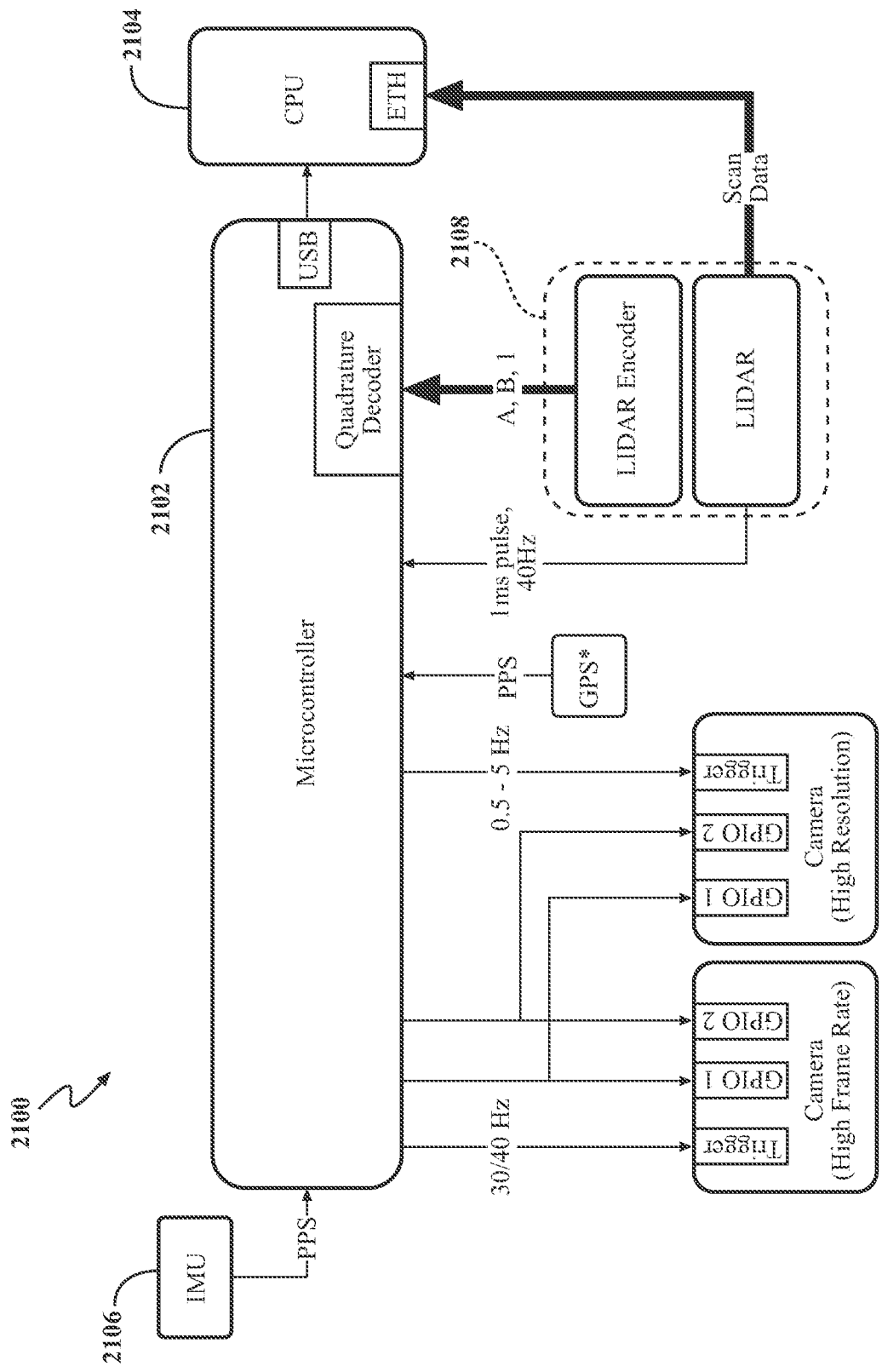
FIG. 21 illustrates an exemplary and non-limiting embodiment of a SLAM system.

With reference to FIG. 21, there is illustrated an exemplary and non-limiting embodiment of a schematic of the SLAM unit 2100. The SLAM unit 2100 may include a timing server to generate multiple signals derived from the IMU's 2106 pulse-per-second (PPS) signal. The generated signals may be used to synchronize the data collected from the different sensors in the unit. A microcontroller 2102 may be used to generate the signals and communicate with the CPU 2104. The quadrature decoder 2108 may either be built into the microcontroller or on an external IC.

Figure 22:
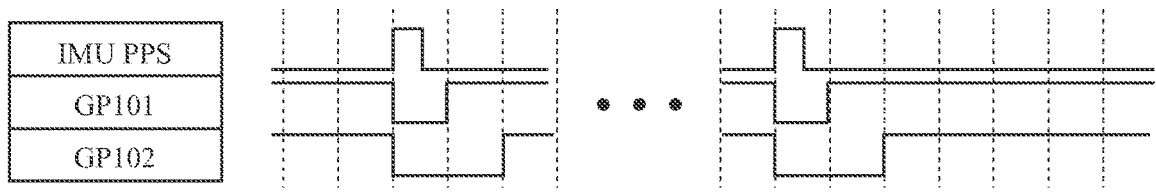
FIG. 22 illustrates an exemplary and non-limiting embodiment of timing signals for the SLAM system.

In some exemplary embodiments, the IMU 2206 supplies a rising edge PPS signal that is used to generate the timing pulses for other parts of the system. The camera may receive three signals generated from the IMU PPS signal including one rising edge signal as described above and two falling edge signals, GPIO1 (lasting one frame) and GPIO2 (lasting two frames as illustrated with reference to FIG. 22.

As illustrated, each camera receives a trigger signal synchronized with the IMU PPS having a high frame rate of approximately 30 Hz or 40 Hz and a high resolution of approximately 0.5 Hz-5 Hz.

Each IMS PPS pulse may zero a counter internal to the microcontroller 2202. The LIDAR's synchronous output may trigger the following events:

read the current encoder value through the quadrature decoder, and read the current counter value.

Figure 23:
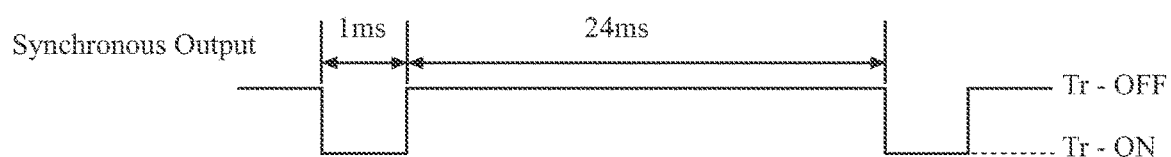
FIG. 23 illustrates an exemplary and non-limiting embodiment of timing signals for the SLAM system.

The encoder and the counter values may be saved together and sent to the CPU. This may happen every 40 Hz, dictated by the LIDAR synchronous output as illustrated with reference to FIG. 23.

Figure 24:
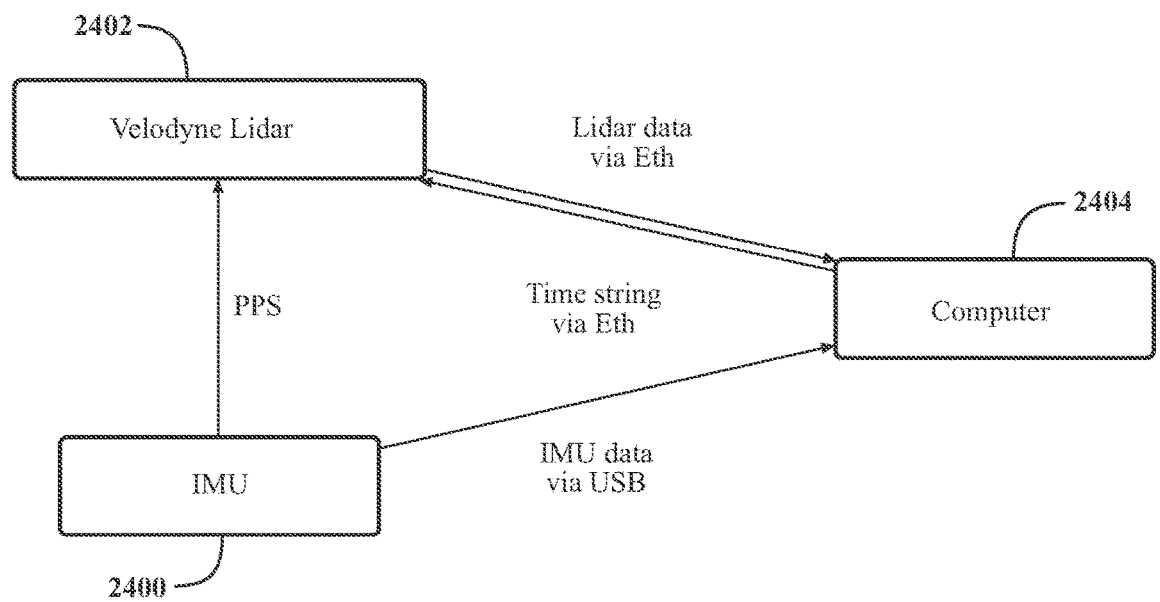
FIG. 24 illustrates an exemplary and non-limiting embodiment of SLAM system signal synchronization.

An alternate time synchronization technique may include IMU based pulse-per-second synchronization that facilitates synchronizing the sensors and the computer processor. An exemplary and non-limiting embodiment of this type of synchronization is depicted with reference to FIG. 24.

The IMU 2400 may be configured to send a Pulse Per Second (PPS) signal 2406 to a LIDAR 2402. Every time a PPS is sent, the computer 2404 is notified by recognizing a flag in the IMU data stream. Then, the computer 2404 follows up and sends a time string to the LIDAR 2402. The LIDAR 2402 synchronizes to the PPS 2406 and encodes time stamps in the LIDAR data stream based on the received time strings.

Upon receiving the first PPS 2406, the computer 2404 records its system time. Starting from the second PPS, the computer 2404 increases the recorded time by one second, sends the resulting time string to the LIDAR 2402, and then corrects its own system time to track the PPS 2506.

In this time synchronization scheme, the IMU 2400 functions as the time server, while the initial time is obtained from the computer system time. The IMU 2400 data stream is associated with time stamps based on its own clock, and initialized with the computer system time when the first PPS 2406 is sent. Therefore, the IMU 2400, LIDAR 2402, and computer 2404 are all time synchronized. In embodiments, the LIDAR 2402 may be a Velodyne LIDAR.

In accordance with exemplary and non-limiting embodiments, the unit includes a COM express board and a single button interface for scanning.

In accordance with exemplary and non-limiting embodiments, the process IMU, vision and laser data sensors may be coupled. The unit may work in darkness or structureless environments for long periods of time. In some embodiments, four CPU threads may be employed for scan matching, each running at 5 Hz with Velodyne data. As noted above, motion of the unit may be fast and the unit may localize to a prior map and can extend a map using localization. The unit exhibits relatively high CPU usage in mapping mode and relatively low CPU usage in localization mode thus rendering it suitable for long-time.

In accordance with exemplary and non-limiting embodiments, methods and systems described herein enable collaboration between mapping from the ground and mapping from the air according to the characteristics of each. Ground-based mapping is not necessarily prone to limitations of space or time. Typically, a mapping device carried by a ground vehicle is suitable for mapping in large scale and can move at a high speed. On the other hand, a tight area can be mapped in a hand-held deployment. However, ground-based mapping is limited by the sensor's altitude making it difficult to realize a top-down looking configuration. As illustrated in FIG. 25, the ground-based experiment produces a detailed map of the surroundings of a building, while the roof has to be mapped from the air. If a small aerial vehicle is used, aerial mapping is limited by time due to the short lifespan of batteries. Space also needs to be open enough for aerial vehicles to operate safely.

The collaborative mapping as described herein may utilize a laser scanner, a camera, and a low-grade IMU to process data through multi-layer optimization. The resulting motion estimates may be at a high rate (~200 Hz) with a low drift (typically <0.1% of the distance traveled).

The high-accuracy processing pipeline described herein may be utilized to merge maps generated from the ground with maps generated from the air in real-time or near real-time. This is achieved, in part, by localization of one output from a ground derived map with respect to an output from an air derived map.

While the method disclosed herein fulfills collaborative mapping, it further reduces the complexity of aerial deployments. With a ground-based map, flight paths are defined and an aerial vehicle conducts mapping in autonomous missions. In some embodiments, the aerial vehicle is able to accomplish challenging flight tasks autonomously.

Figure 26:
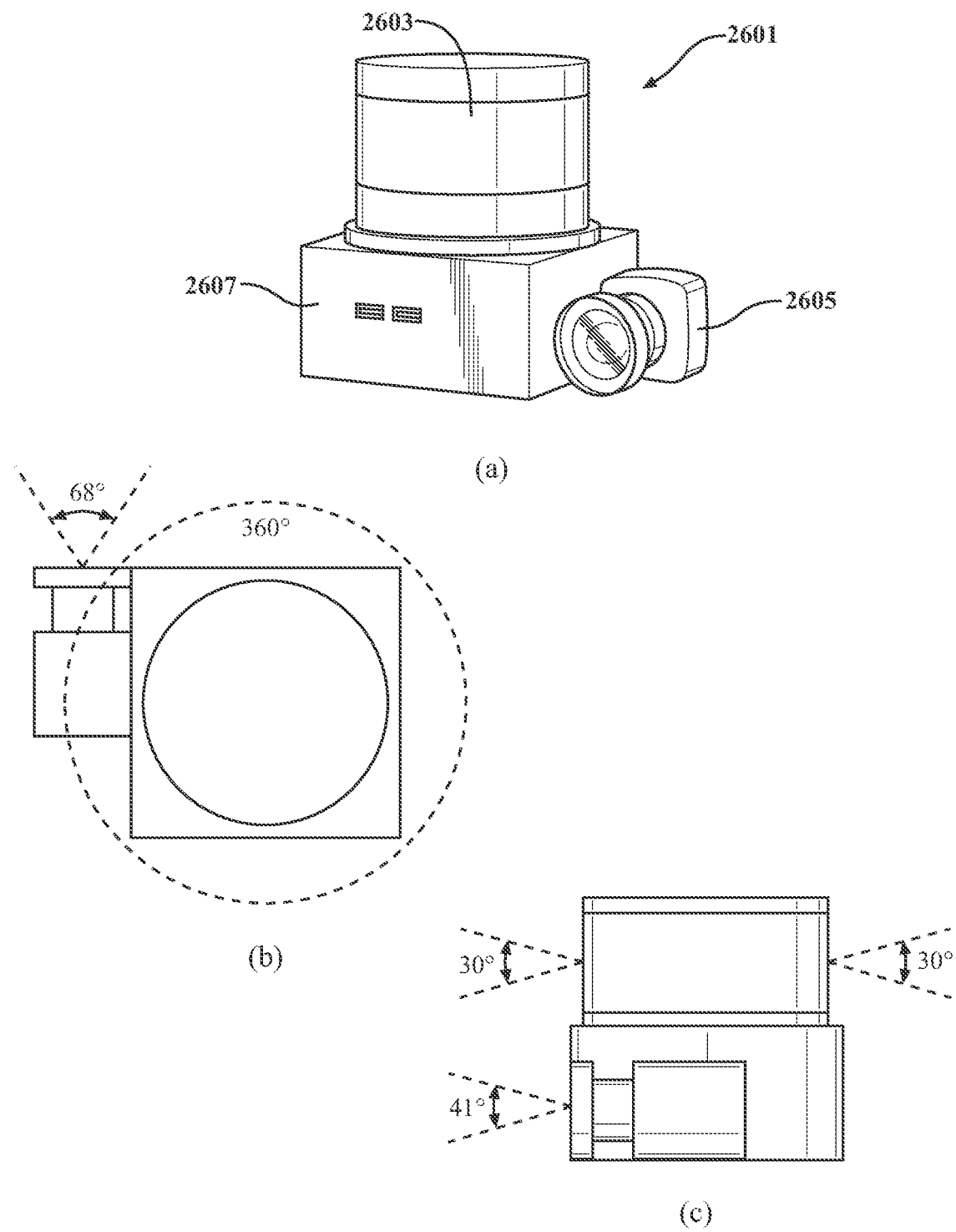
FIG. 26 illustrates an exemplary and non-limiting embodiment of a sensor pack.

With reference to FIG. 26, there is illustrated an exemplary and non-limiting embodiment of a sensor/computer pack that may be utilized to enable collaborative mapping. The processing software is not necessarily limited to a particular sensor configuration. With reference to FIG. 26(*a*), the sensor pack 2601 is comprised of a laser scanner 2603 generating 0.3 million points/second, a camera 2605 at 640×360 pixels resolution and 50 Hz frame rate, and a low-grade IMU 2607 at 200 Hz. An onboard computer processes data from the sensors in real-time for ego-motion estimation and mapping. FIG. 26(*b*) and FIG. 26(*c*) illustrate the sensor field of view. An overlap is shared by the laser and camera, with which, the processing software associates depth information from the laser to image features as described more fully below.

Figure 27:
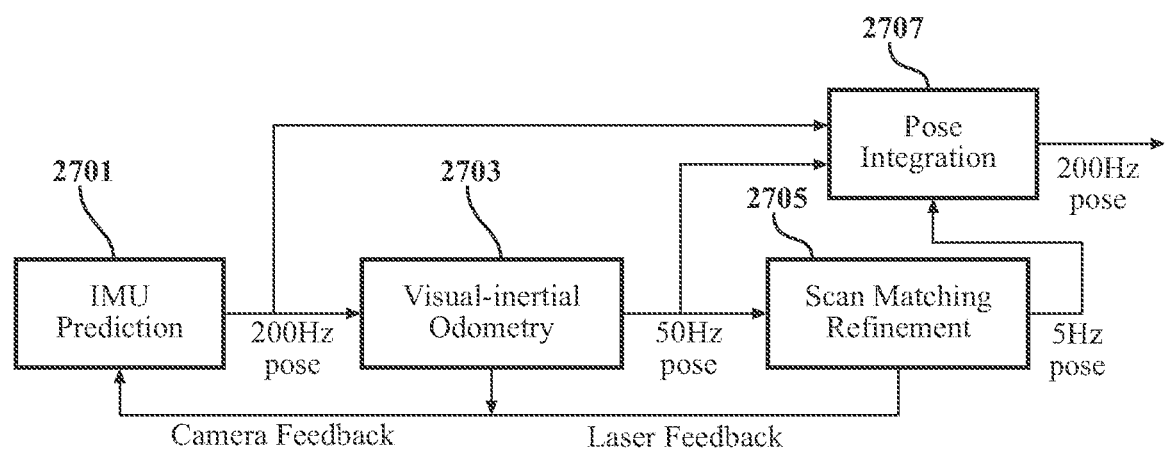
FIG. 27 illustrates an exemplary and non-limiting embodiment of a block diagram of the laser-visual-inertial odometry and mapping software system.

In accordance with exemplary and non-limiting embodiments, the software processes data from a range sensor such as a laser scanner, a camera, and an inertial sensor. Instead of combining data from all sensors in a large, full-blown problem, the methods and systems described herein parse the problem as multiple small problems, solve them sequentially in a coarse-to-fine manner. FIG. 27 illustrates a block diagram of the software system. In such a system, modules in the front conduct light processing, ensuring high-frequency motion estimation robust to aggressive motion. Modules in the back take sufficient processing, run at low frequencies to warrant accuracy of the resulting motion estimates and maps.

The software starts with IMU data processing 2701. This module runs at the IMU frequency to predict the motion based on IMU mechanization. The result is further processed by a visual-inertial coupled module 2703. The module 2703 tracks distinctive image features through the image sequence and solves for the motion in an optimization problem. Here, laser range measurements are registered on a depthmap, with which, depth information is associated to the tracked image features. Since the sensor pack contains a single camera, depth from the laser helps solve scale ambiguity during motion estimation. The estimated motion is used to register laser scans locally. In the third module 2705, these scans are matched to further refine the motion estimates. The matched scans are registered on a map while scans are matched to the map. To accelerate the processing, scan matching utilizes multiple CPU threads in parallel. The map is stored in voxels to accelerate point query during scan matching. Because the motion is estimated at different frequencies, a fourth module 2707 in the system takes these motion estimates for integration. The output holds both high accuracy and low latency beneficial for vehicle control.

The modularized system also ensures robustness with respect to sensor degradation, by selecting "healthy" modes of the sensors when forming the final solution. For example, when a camera is in a low-light or texture-less environment such as pointing to a clean and white wall, or a laser is in a symmetric or extruded environment such as a long and straight corridor, processing typically fails to generate valid motion estimates. The system may automatically determine a degraded subspace in the problem state space. When degradation happens, the system only solves the problem partially in the well-conditioned subspace of each module. The result is that the "healthy" parts are combined to produce the final, valid motion estimates.

When a map is available, the method described above can be extended to utilize the map for localization. This is accomplished using a scan matching method. The method extracts two types of geometric features, specifically, points on edges and planar surfaces, based on the curvature in local scans. Feature points are matched to the map. An edge point is matched to an edge line segment, and a planar point is matched to a local planar patch. On the map, the edge line segments and local planar patches are determined by examining the eigenvalues and eigenvectors associated with local point clusters. The map is stored in voxels to accelerate processing. The localization solves an optimization problem minimizing the overall distances between the feature points and their correspondences. Due to the fact that the high accuracy odometry estimation is used to provide initial guess to the localization, the optimization usually converges in 2-3 iterations.

The localization does not necessarily process individual scans but, rather, stacks a number of scans for batch processing. Thanks to the high-accuracy odometry estimation, scans are registered precisely in a local coordinate frame where drift is negligible over a short period of time (e.g., a few seconds). A comparison is illustrated with reference to FIG. 28 (8.4) where FIG. 28(a) is a single scan that is matched in the previous section (scan matching executes at 5 Hz), and FIG. 28(b) shows stacked scans over two seconds, which are matched during localization (scan matching runs at 0.5 Hz). One can see the stacked scans contain significantly more structural details, contributing to the localization accuracy and robustness with respect to environmental changes. Additionally, low-frequency execution keeps the CPU usage to be minimal for onboard processing (localization consumes about 10% of a CPU thread). Stacked scans contain significantly more structural details, contributing to the localization accuracy and robustness with respect to environmental changes. Roughly, about 25% of the environment can change or be dynamic and the system will continue to operate well.

Figure 29:
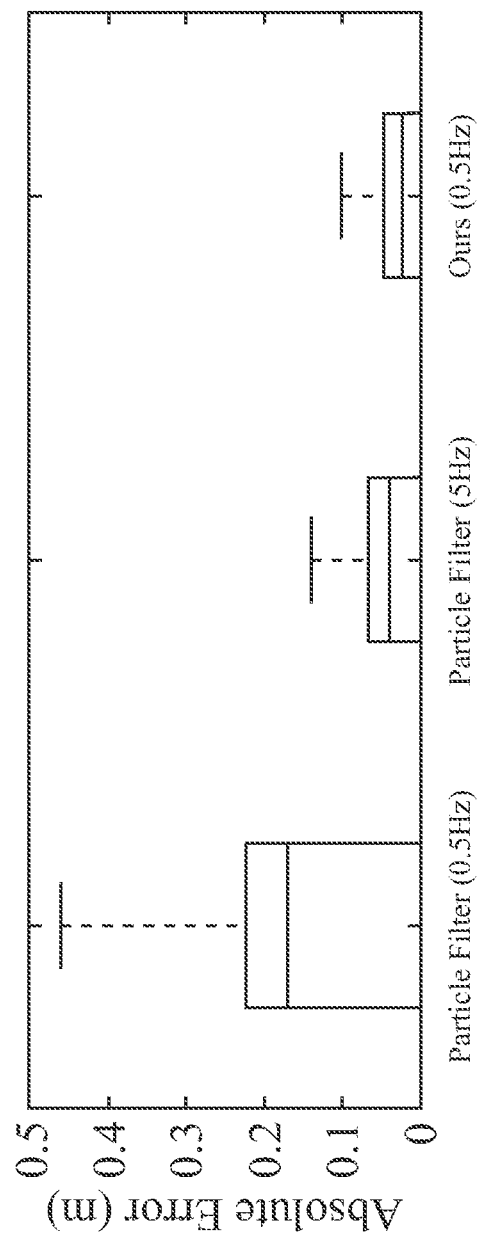
FIG. 29 illustrates an exemplary and non-limiting embodiment of a comparison of scan matching accuracy in localization.

The localization is compared to a particle filter based implementation. The odometry estimation provides the motion model to the particle filter. It uses a number of 50 particles. At each update step, the particles are resampled based on low-variance resampling. Comparison results are shown in FIG. 29 and Table 8.1. Here, errors are defined as the absolute distances from localized scans to the map. During the evaluation, the methods and systems described herein choose a number of planar surfaces and use the distances between points in localized scans to the corresponding planar patches on the map. FIG. 29 illustrates an exemplary and non-limiting embodiment of an error distribution. When running the particle filter at the same frequency as the described method (0.5 Hz), the resulting error is five times as large. While in Table 8.1, the CPU processing time is more than double. In another test, running the particle filter at 5 Hz helps reduce the error to be slightly larger than the disclosed method. However, the corresponding CPU processing time increases to over 22 times greater. These results imply a particle filter based method does not necessarily take full advantage of the high-accuracy odometry estimation.

TABLE 8.1

Comparison of CPU processing time in localization. When running the particle filter at 5 Hz, denser data is processed at 25% of real-time speed due to high CPU demand.

| | Method | | |
|---|---|---|---|
| | Particle fiber | | Ours |
| Frequency | 0.5 Hz | 5 Hz | 0.5 Hz |
| Time per execution | 493 ms | 478 ms | 214 ms |
| Time per second | 247 ms | 2390 ms | 107 ms |

With reference to FIG. 30, there is illustrated an exemplary an non-limiting embodiment of a sensor study wherein the sensor pack is carried horizontally in a garage building. FIG. 30(a) shows the map built and sensor trajectory. FIG. 30(b) is a single scan. In this scenario, the scan contains sufficient structural information. When bypassing the camera processing module, the system produces the same trajectory as the full pipeline. On the other hand, the methods and systems described herein run another test with the sensor pack tilted vertically down toward the ground. The results are shown in FIG. 31. In this scenario, structural information in a scan is much sparser as shown in FIG. 31(b)). The processing fails without usage of the camera and succeeds with the full pipeline. The results indicate the camera is critical for high-altitude flights where tilting of the sensor pack is required.

With reference to FIG. 32, there is illustrated an exemplary and non-limiting embodiment wherein the sensor pack is held by an operator walking through a circle at 1-2 m/s speed with an overall traveling distance of 410 m. FIG. 32(a) shows the resulting map and sensor trajectory with a horizontally orientated sensor configuration. The sensor is started and stopped at the same position. The test produces 0.18 m of drift through the path, resulting in 0.04% of relative position error in comparison to the distance traveled. Then, the operator repeats the path with two sensor packs held at 45° and 90° angles, respectively. The resulting sensor trajectories are shown in FIG. 32(b). Clearly, tilting introduces more drift, where the relative position errors are 0.6% at 45° (blue dash curve) and 1.4% at 90° (red dash-dot curve). Finally, by localizing on the map in FIG. 32(a), the drift is canceled and both configurations result in the black solid curve.

Figure 33:
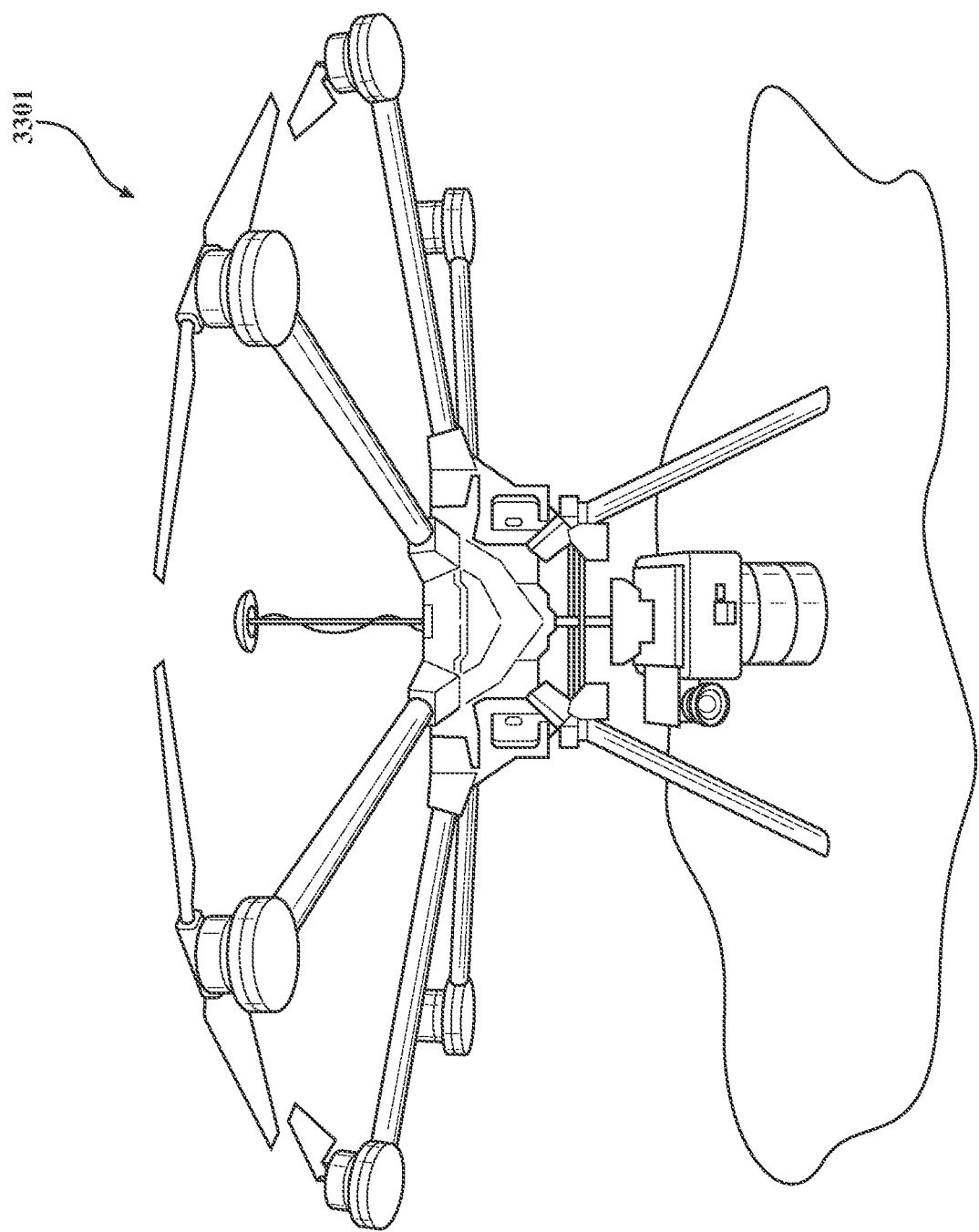
FIG. 33 illustrates an exemplary and non-limiting embodiment of an aircraft with a sensor pack.

An exemplary and non-limiting embodiment of a drone platform 3301 is illustrated at FIG. 33. The aircraft weighs approximately 6.8 kg (including batteries) and may carry a maximum of 4.2 kg payload. The sensor/computer pack is mounted to the bottom of the aircraft, weighting 1.7 kg. The bottom right of the figure shows the remote controller. During autonomous missions, the remote controller is operated by a safety pilot to override the autonomy if necessary. Note that the aircraft is built with a GPS receiver (on top of the aircraft). GPS data is not necessarily used in mapping or autonomous.

Figure 34:
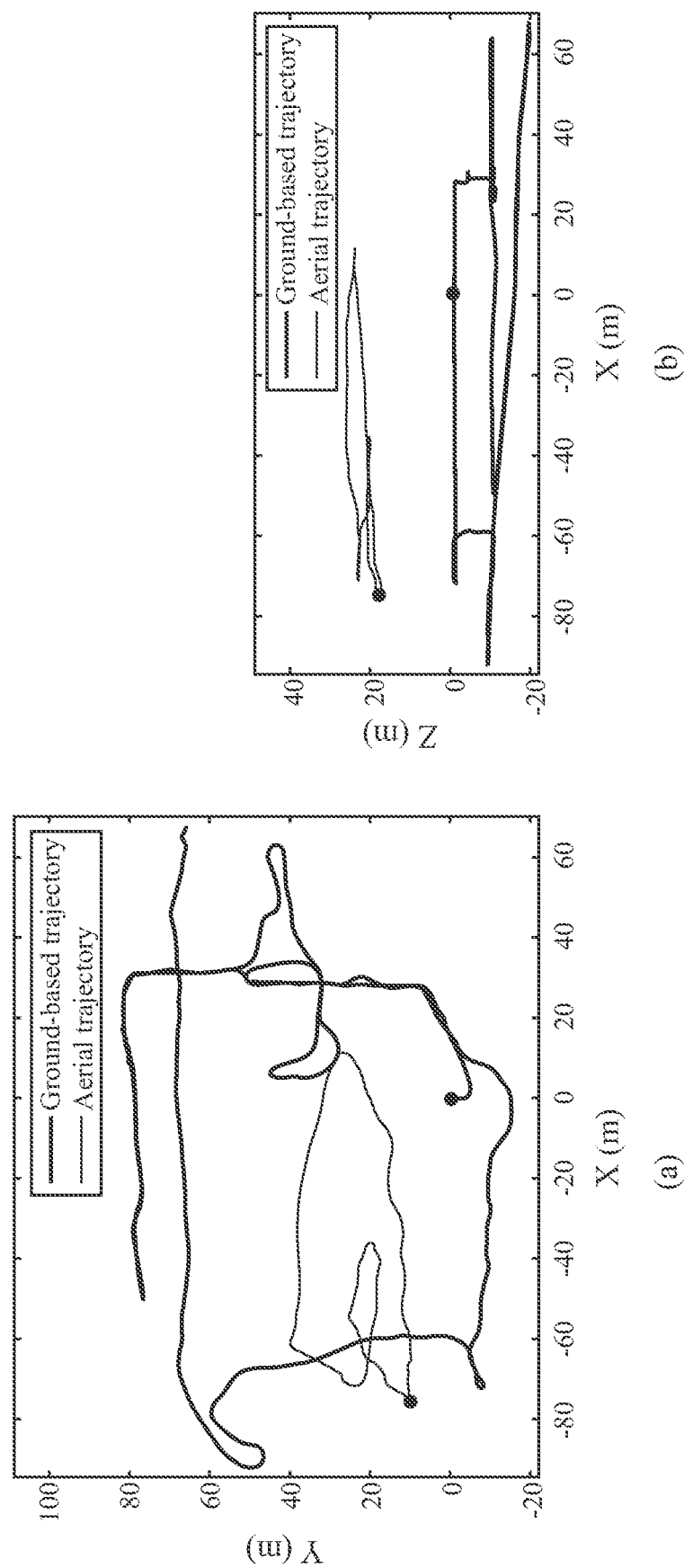
FIG. 34 illustrates an exemplary and non-limiting embodiment of sensor trajectories.

In the first collaborative mapping experiment, an operator holds the sensor pack and walks around a building. Results are shown in FIG. 25. In FIG. 25(a), the ground-based mapping covers surroundings of the building in detail, conducted at 1-2 m/s over 914 m of travel. As expected, the roof of the building is empty on the map. Second, the drone is teleoperated to fly over the building. In FIG. 25(b), the flight is conducted at 2-3 m/s with a traveling distance of 269 m. The processing uses localization w.r.t. the map in FIG. 25(a). That way, the aerial map is merged with the ground-based map (white points). After the ground-based map is built, the take-off position of the drone is determined on the map. The sensor starting pose for the aerial mapping is known, and from which, the localization starts. FIG. 34 presents the aerial and ground-based sensor trajectories, in top-down and side views.

Figure 35A:
FIGS. 35A-35E illustrate an exemplary and non-limiting embodiment of autonomous flight results.
Figure 35B:
Figure 35C:
Figure 35D:
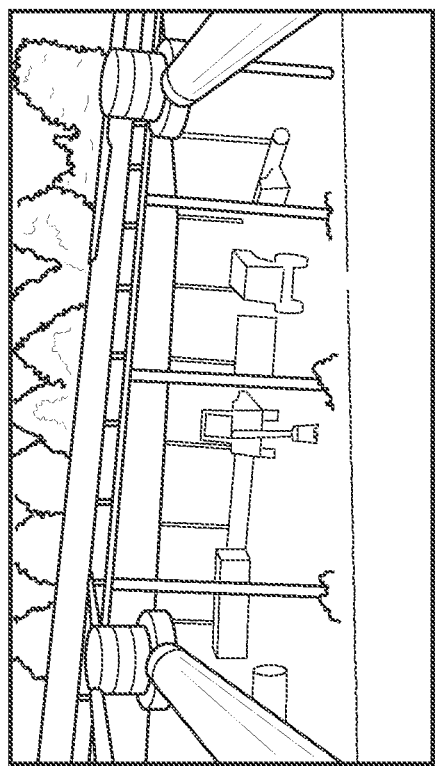
Figure 35E:
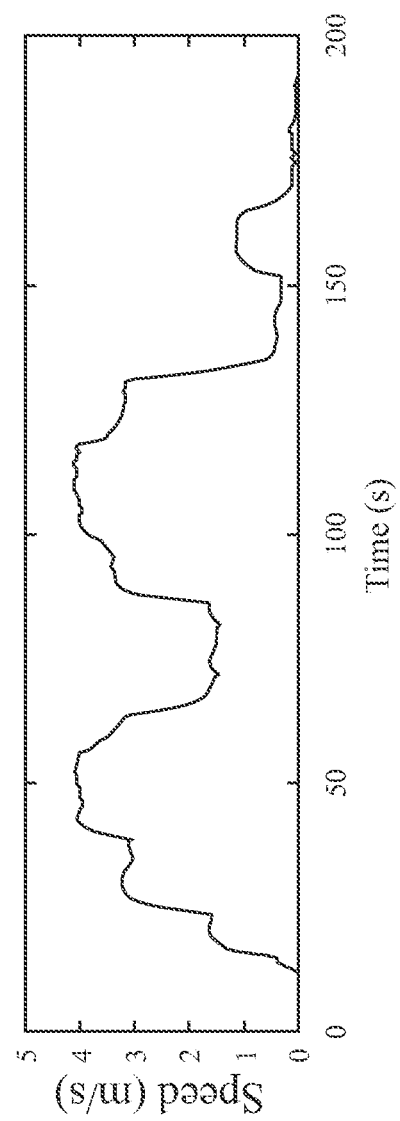
Figure 36A:
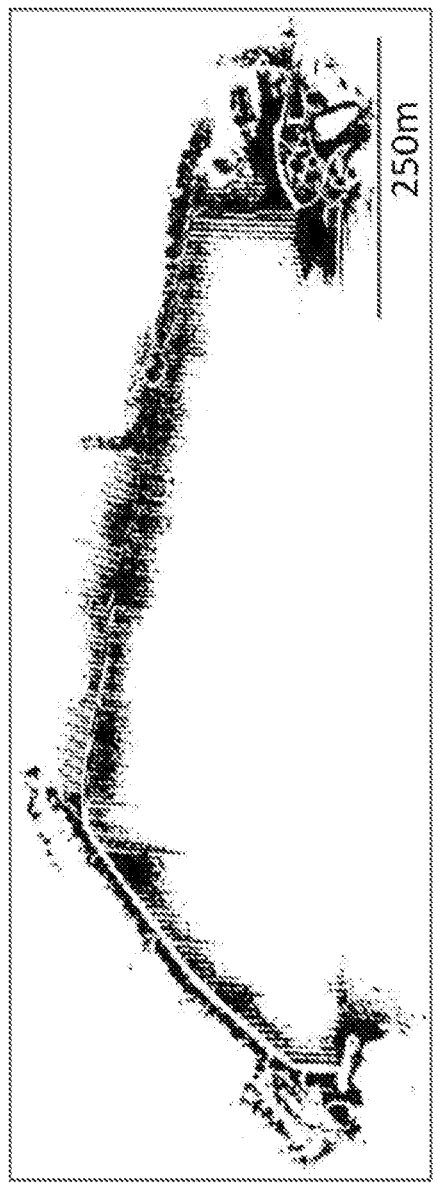
FIGS. 36A-36E illustrate an exemplary and non-limiting embodiment of an autonomous flight result over a long-run.
Figure 36B:
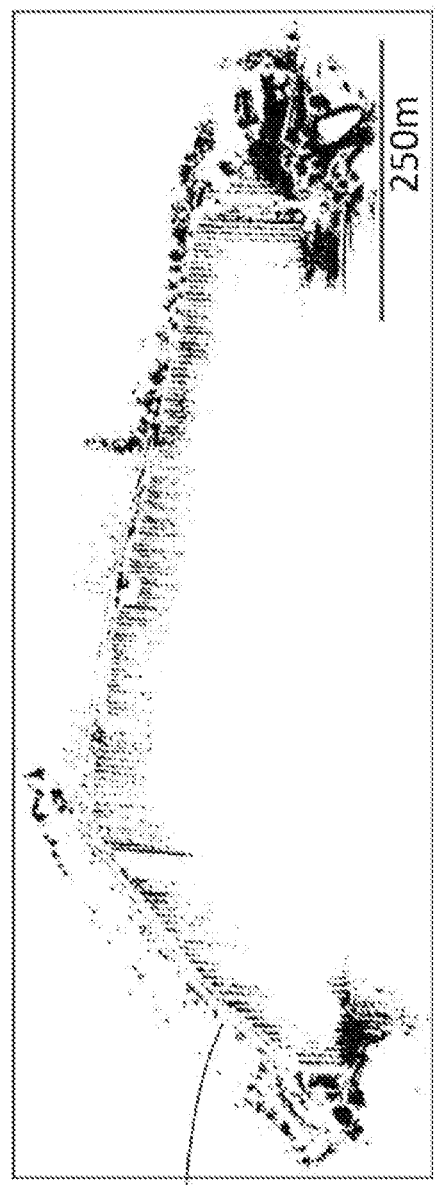
Figure 36C:
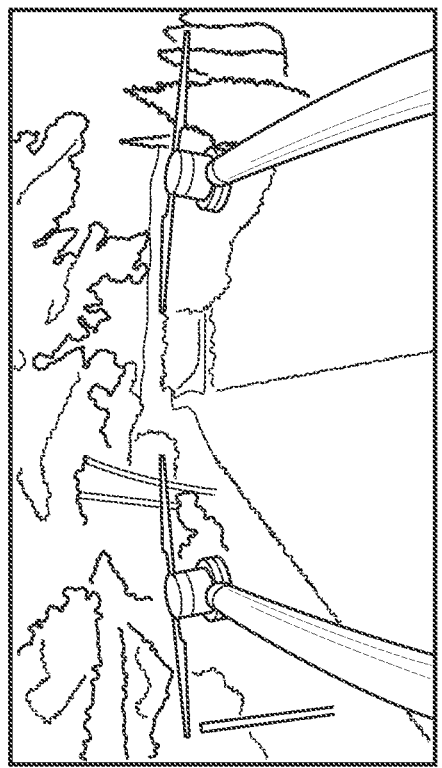
Figure 36D:
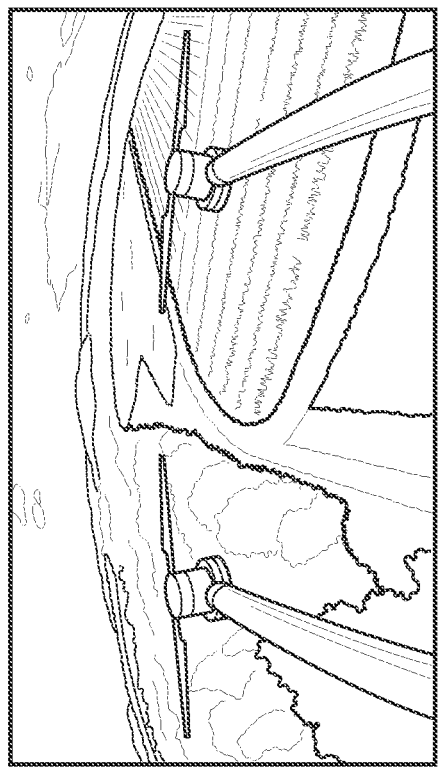
Figure 36E:
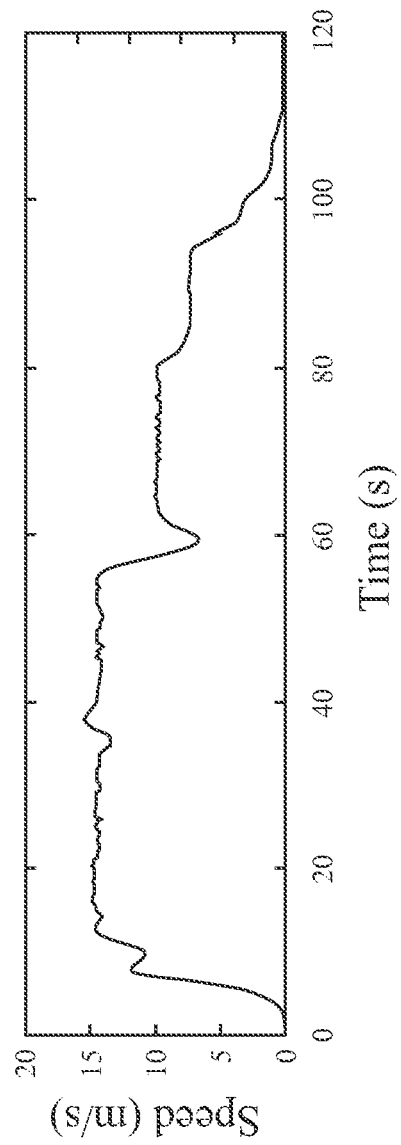

Further, the methods and systems described herein conduct autonomous flights to realize aerial mapping. With reference to FIGS. 35A-35E, a ground-based map is built first by hand-held mapping at 1-2 m/s for 672 m of travel around the flight area. The map and sensor trajectory are shown in FIG. 35A. Then based on the map, way-points are defined and the drone follows the way-points to conduct aerial mapping. As shown in FIG. 35B, the curve is the flight path, the large points on the curve are the way-points, and the points form the aerial map. In this experiment, the drone takes off inside a shed on the left side of the figure, flies across the site and passes through another shed on the right side, then returns to the first shed to land. The speed is 4 m/s crossing the site and 2 m/s passing through the shed. FIG. 35C and FIG. 35D are two images taken by an onboard camera when the drone flies toward the shed on the right and is about to enter the shed. FIG. 35E shows the estimated speed during the mission.

Finally, the methods and systems described herein conduct another experiment over a longer distance. As shown in FIGS. 36A-36E, the ground-based mapping involves an off-road vehicle driven at 10 m/s from the left end to the right end, over 1463 m of travel. With the ground-based map and way-points, the autonomous flight crosses the site. Upon take-off, the drone ascends to 20 m high above the ground at 15 m/s. Then, it descends to 2 m above the ground to fly through a line of trees at 10 m/s. The flight path is 1118 m long as indicated by the curve 3601 in FIG. 36B. Two images are taken as the drone flies high above the trees (see FIG. 36C) and low underneath the trees (see FIG. 36D).

In accordance with an exemplary and non-limiting embodiment, global positioning data such as from a GPS may be incorporated into the processing pipeline. Global positioning data can be helpful to cancel ego-motion estimation drift over a long distance of travel and register maps in a global coordinate frame.

In some embodiments, GPS data may be recorded simultaneously with mapping activity. As the system moves there is some level of drift that causes an error to grow over distance. One may typically experience only 0.2% drift rate but when traveling 1000 meters that is still 2 meters for every 1000 meters of travel. At 10 km this grows to 20 meters, etc. Without closing the loop (in the traditional sense of coming back to the beginning of the route) this error cannot be corrected. By providing external information in the form of GPS coordinates, the system can know where it is and correct the current position estimate. While this is typically done in a post-processing effort, the present system is able to accomplish such a correction in real-time or near real-time.

Thus, utilizing GPS provides a method by which one may close the loop. GPS, of course, has some amount of error as well, but it is usually consistent in a given area and many GPS systems today can provide better than 30 cm accuracy in position X and Y on the surface. Other more expensive and sophisticated systems can provide cm level positioning.

This use of GPS provides important capabilities: 1. The location of the point cloud on the planet. 2. the ability to use the course-corrected information to align and "fix" the map so that the map becomes even more accurate since one knows one's position and any data taken at that position may now be referenced to the series of GPS points that are also collected. 3. The ability for the system to act as an IMU when GPS is lost.

In accordance with an exemplary and non-limiting embodiment, dynamic vision sensors may be utilized to further improve estimation robustness with respect to aggressive motion. A dynamic vision sensor reports data only on pixels with illumination changes, delivering both a high rate and a low latency.

This high rate (typically defined as more than approximately 10 Hz) may provide rapid information quickly to the ego-motion and estimation system thus improving values for localization and, subsequently, mapping. If the system is able to capture more data with fewer delays, the system will be more accurate, and more robust. The features that are identified and tracked by the dynamic vision sensor enable better estimates since more features, and faster updates enable more accurate tracking and motion estimation.

Direct methods may be used to realize image matching with a dynamic vision sensor for ego-motion estimation. Specifically, direct methods match sequential images for feature tracking from image to image. In contrast, the feature tracking method disclosed herein is superior to the direct method.

In accordance with an exemplary and non-limiting embodiment, parallel processing may be implemented to execute on a general purpose GPU or FPGA and therefore enable data processing in larger amount and higher frequencies.

Using parallel processing techniques, a number of feature may be tracked simultaneously or data in defined areas or directions may be partitioned into multiple smaller problems. Parallel architectures may take the form of multiple cores, thread, processors or even specialized forms such as Graphics Processing Units (GPUs). By employing a divide and conquer approach, there may be a significant speed-up in overall processing as each node in the parallel architecture works on its portion of the problem at the same time. Typically such speed-ups are not linear. That is, by dividing the problem into 16 parts and processing each part separately does not necessarily speed up the processing by 16 times. There is overhead in making the division, communications, and then re-assembling the results.

In contrast, with linear processing, each sub-problem or calculation is worked on once and data is shuttled in and out of memory, the CPU, and then back into memory or storage. This is slower although a pipeline architecture, if set up correctly, such as in systolic arrays can improve things as long as the pipeline is kept filled.

In accordance with an exemplary and non-limiting embodiment, loop closures may be introduced to remove ego-motion estimation drift by global smoothing.

For example, when you return to your starting point you know that the position estimate can be corrected since you were there already. The starting point is your origin and there must have been an accumulated error, which, at the end of the traverse, becomes evident. By taking the difference between the origin (0,0,0) and the position you think you are at when you return to the beginning (e.g. (1,2,3)) you now know that error value. But the value accumulated, perhaps evenly, over the traverse.

For example, if you traveled 100 meters and returned to your starting point and found you were off by 1 meter in xyz, you now have the problem of determining where to apply that error over the whole distance. One way would be to spread that error over the entire distance then you might correct the travel by 1 cm at each meter increment to stay on the path and, importantly, be back where you started with no error. This is global smoothing.

Another way may be to use some other measure of error during the traverse and applying corrections for only those places where the measure of error is high. For example, the covariance matrix provides a convenient metric for map quality and may be used to proactively distribute this error over the full traverse. In other words, locations with low-quality matching that show up in the covariance matrix could be used to unevenly spread the error across the traverse in accordance with the proportion of the error over that traverse. This will act to correct the error in the precise areas where low-quality values were associated with particular locations.

In accordance with exemplary and non-limiting embodiments, there is disclosed one or more means to determine position, velocity, and other information of a sensing device such as a commonly-carried cellular phone, smart phone, or other device that picks up, for example, a variety of wireless signals and uses a camera or other sensors to provide visual or geometric information of the environment such as may be utilized to produce a 3D model or map of said environment.

Once a position is known, then other separate measurements, such as with other sensors, may be made and assessed at the known location. By moving around either in random or pre-determined patterns such as a raster pattern to provide complete or sufficient coverage, a map of the environment may be visualized and/or stored that will provide the separately sensed data values coordinated with the mapped locations, such as within a facility.

This calculation of position or, more generally, pose, can be combined with data from the other sensors to produce maps of any of the sensed qualities in multiple dimensions, including the same dimensions being captured over time to, for example, model time-varying qualities by location. This combined data may be used to model time-varying qualities, and the like. Time is a useful aspect of dynamic data and adds another dimension of interest. Variations can be just as important. One may either provide time-based measurements assuming some periodicity to the signals or extract salient information about distribution using slower traverses.

Figure 37A:
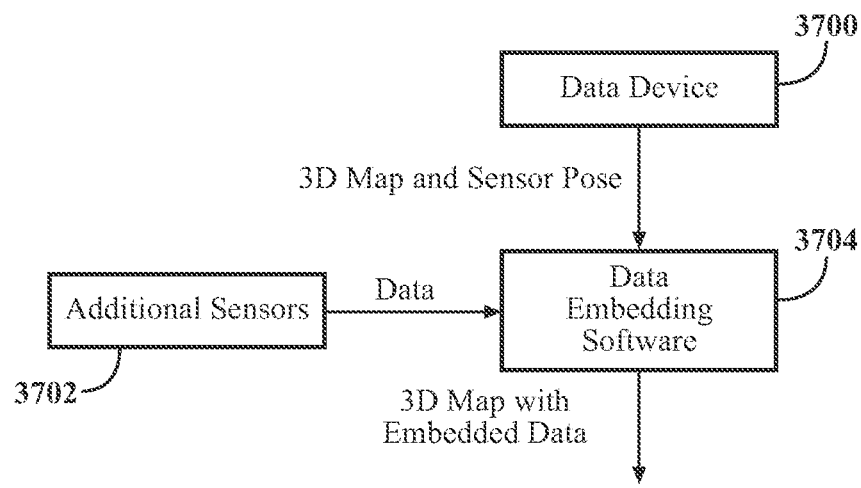
FIGS. 37A and 37B illustrate an exemplary and non-limiting embodiment of a method creating a map that includes both geometry and sensor information and establishing position.

With reference to FIG. 37A, there is illustrated an exemplary and non-limiting embodiment of mapping and data embedding. First, at step 3700, a data gathering device, such as a SLAM, is moved through an environment to create a map recording both point cloud data and sensor pose information. Simultaneously, at step 3702, non-geospatial sensor data is recorded and time information is used to synchronized the map position with the sensor information. Lastly, at step 3704, an overall map that includes geometry and additional non-geospatial sensor information is created. Non-geospatial sensors may be one or more of RF detection, thermal, visual, acoustic, electrical signal, magnetic, radioactive, or other sensing modalities.

Figure 37B:
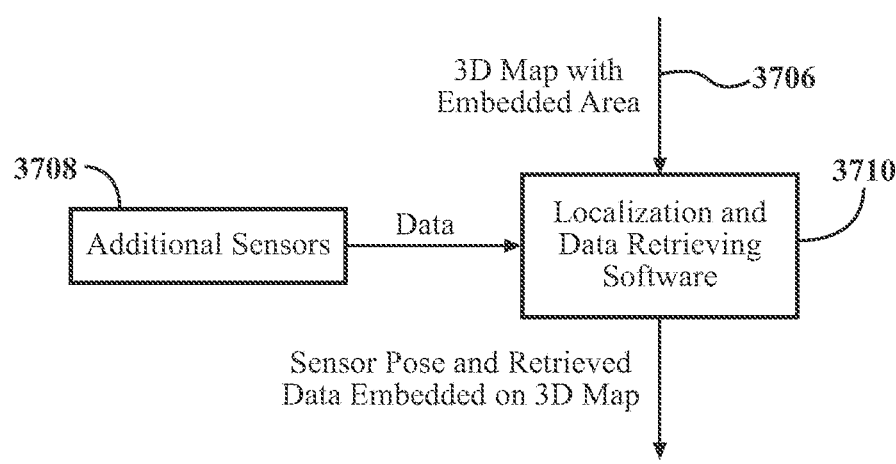

With reference to FIG. 37B, there is illustrated an exemplary and non-limiting embodiment of deriving sensor position from the map of FIG. 37A. First, at step 3706, the map embedded with non-geospatial sensor data is retrieved. At step 3708, newly acquired non-geospatial sensor data is collected from a device. Then, at step 3710, localization software matches the received sensor readings with one or more positions in the map that exhibits similar values corresponding to the sensor readings. Lastly, one may optionally embed the newly acquired sensor pose data into the map.

As used herein, a "heat map" refers to a map comprised of a plurality of non-spatial attributes each having a value indicative of an intensity of measurement. In some instances, a heat map may comprise non-spatial attribute values for a region or sub-region of the extent comprising the map. In other instances, the heat map may be formed of a plurality of discreet non-spatial attribute values from which additional heat map values may be interpolated. Location-based examples and sensing modalities may include:

Mapping of buried ordnance, or other objects through the use magnetometers. Wherein magnetic fields, or other quantities are indicative of the presence or absence of ferrous materials.

Mapping of magnetic field along high-voltage power lines. Still using magnetometers, to evaluate the magnetic interference to other electrical devices close to the power lines.

Mapping of radioactivity levels in a facility such as a nuclear power plant or processing plants.

Mapping of temperature, thermal information, in all locations—a heat map.

Light level mapping to capture spectral power distribution or photometric values from which a variety of other measurements can be calculated.

Temporal changes—If done at different times of the day or over a season or less or greater frequency than a temporal and spatial map of such values can be created to provide useful time-varying information. Measurements done at different times of the day or over a season or less or greater frequency than a temporal and spatial map of such values can be created to provide useful time-varying information.

Measures of RF sources to provide signal strength as a function of distance.

Audio measurements in 3D, such as to map the acoustics of a performing arts hall or other arena where sound quality matters.

Figure 38:
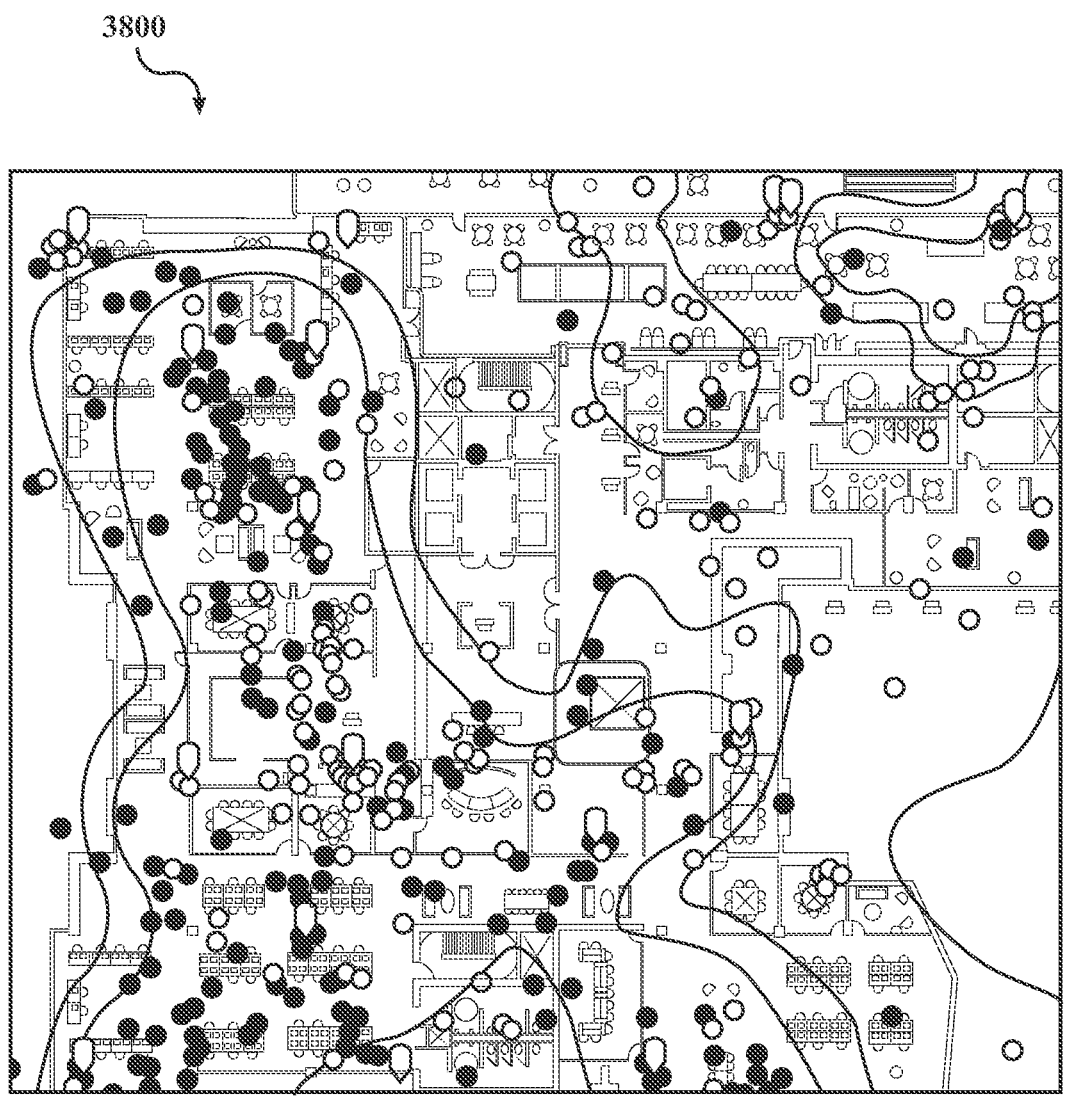
FIG. 38 is an exemplary and non-limiting embodiment of a heat map style representation of sensed information superimposed on floor plan geometry.

With reference to FIG. 38, there is illustrated an exemplary and non-limiting embodiment of a heat map style representation 3800 of sensed information superimposed on floor plan geometry. Such data could represent one or more of many sensing modalities and/or sensor attributes. As illustrated, contour lines reflect areas of similar attribute value.

In these examples, the colocation of a localization means, such as a SLAM device with that of an additional sensor, or a wireless communication device to provide another measurement may provide an accurate map of the sensed quantity or quantities of the information including the information collected by the additional sensor in space and/or time.

When scanning an environment, movement of the device provides variation over a much larger set of inputs and calculations. In some embodiments, one may utilize advanced SLAM-based real-time mapping techniques thus providing much greater information. For example, 100 HZ information versus 0.1 Hz information would supply several orders of magnitude more information and better tie information at any instant to information before and after a given measurement.

In this way, an accurate map may be made with a sensor set, such as a SLAM device and a mobile phone or other signal detection device as described above and elsewhere herein, that may be impractical to deploy frequently. This set may be too expensive, too large, too heavy, or too unwieldy to use or be limited in duration and accuracy. But by using a more sophisticated mapping system to create an initial accurate map that may include multiple modes of sensing (e.g., SLAM plus WiFi signal, heat, radioactivity, sunlight, and others), a lesser system can later be enabled to facilitate determination of a position that is more accurate than the lesser system by itself would provide.

For example, a robot or a person might carry a mapping and localization device, such as a SLAM device, to produce a registered 3D point cloud that can later be converted into a map of the 3D geometry of the environment. Other signals such as RF sources such as Wi-Fi and Bluetooth can be integrated into that map and database so that when a device that uses one or more of these other signals is introduced into the environment, such as at an unknown position, the integrated map and database may be used to provide a position fix for the newly introduced device.

The density and quality of the resultant maps can be improved by interpolating between measured points within a given sensor type (e.g., RF) or across sensor types (e.g., RF and magnetic) to provide a more continuous representation of the various different sensor data in the environment. Such an interpolation may or may not be linear as some sensed quantities may fall off as a power function with distance. Magnetic fields are one example where the level may drop off exponentially.

The use of this multi-modal data set may include determining placement of RF or other signaling devices to ensure adequate coverage.

One example commercial need is the placement of transmitting and receiving micro antennas for RF sources including, but not limited to, 5G, LTE, Wi-Fi, or Bluetooth to provide adequate and complete coverage. In essence, this may be the opposite of 'fingerprinting' because the problem is determining the best placement of the source rather than recording current placement.

The superposition of wireless communication reception and 3D mapping tools allow a detailed analysis of the signal strength across large areas. This enables initial correspondence and mapping of those signal sources and this may, in turn, be used to determine one's position. For telecommunications, Long-Term Evolution (LTE) is one example of a standard for high-speed wireless communication for cell phones and other data sources. This process can also be used to evaluate the reception of signals from such devices to ensure they provide full coverage or specialized coverage of a site. This is an important application because if this placement is not optimized then either gaps exist, or there is inefficient overlapping coverage.

Location-aware services continue to expand beyond outside GPS-location services. Interiors, which are usually GPS-denied, offer a new generation of location needs and services. Many alternatives have been suggested using infrastructure, beacons, RF signals, bar codes, and so forth. Wi-Fi, one such RF signal, is attractive because smartphones are equipped to receive such signals. In spaces such as shopping malls, offices, airports, factories, warehouses, and service industry venues such as restaurants and hotels, Wi-Fi and Bluetooth signals are widely used and a combination of features such as signal strength and relative geometry can be used to help determine position of a phone and thus, the person carrying it. A signal propagation model using signal strength may be used as a basis for determining position.

An exemplary approach to generating and using a multi-modal map of an environment includes determining position. A user may create real-time and interactive 3D models using a device such as a SLAM device while simultaneously gathering information on signal strength from a variety of sources such as Bluetooth, Wi-Fi, cell tower, and the like. By identifying these and other RF-based information sources, for example, the 3D model generated by the SLAM device may be used to determine signal strength, which may translate into position of RF or other beacon sources. In addition, smartphone or other cameras may also be used to help identify places within the environment. By knowing the camera position (note that the camera may be part of a smartphone or other device) and orientation, the image and subsequent analysis may be used to further determine the position and even be used to layer graphics and identifying information such as direction of travel, places of interest, and directions. Examples include: (i) finding one's position; (ii) formulating a path to a destination, such as an exit, fire extinguisher, human rescue, other interior location (e.g., another store in a mall); (iii) identifying a place of interest; (iv) forming a basis for augmented reality of the image being captured through the phone camera or the like.

Indoor positioning may be based on signal strength from several sources including, but not limited to, Wi-Fi. One approach includes using localization algorithms to find a position that corresponds to a particular set of signals. Another approach may include using those algorithms based on a fingerprinted position. The former uses the signal propagation model to convert measured signal strength into distance information. Then, the target coordinates can be calculated according to the distance between the moving target and the multiple access points with known coordinates.

In most buildings, the actual deployment of Wi-Fi access points is very irregular, such as due to a lack of centralized planning and because signal propagation is seriously influenced by some factors such as the building structure. Wi-Fi signals are susceptible to environmental factors including walls, windows, equipment, and windows, even people. The attenuation level is related to the shape, size, and material of the materials. Therefore, for indoor environments with complex structure, a generalized signal propagation model may not directly and accurately correspond between the actual distance and the signal strength, even given a good understanding of the position of the Wi-Fi signal sources (e.g., the routers, repeaters, and the like).

Fingerprint localization consists of offline location-fingerprint database generation and online positioning. Typically, to build the database, some appointed locations in the building are sampled for signal strength. A collection of Wi-Fi signals and their intensity will be recorded and considered as signal fingerprint.

In some embodiments, signals may be normalized and statistical measures including regression, Chi-squared, or Bayesian formulations may all be used to classify data, determining if sensed quantities are independent or not. Other classifiers include neural networks (CNN, ANN, etc) and this would require training sets to successfully classify inputs and sensor reading. Over time certain signals that show less variation may be accorded greater confidence and thus greater confidence implies greater trust in those values and resultant calculations of position.

The collection and fingerprinting is done in coordination with the high-resolution mapping (e.g., SLAM based) so that the fingerprints can be aligned to the map. To perform online positioning after the off-line multi-modal database is available, signal information is collected around the position to be localized and used to generate a currently sensed fingerprint. These currently sensed fingerprints may be compared with fingerprints in the offline database by, for example, determining a best match to the fingerprints in the offline database. The corresponding map position matching the position whose fingerprint can attain the best match is chosen as the estimated position. In contrast, although the Wi-Fi fingerprint-based positioning technology needs to make a fingerprint database, or map, at the early stage, it may effectively avoid the influence of building structure. Furthermore, fingerprint-based methods do not require that Wi-Fi access points are known beforehand. Therefore, it has a higher practicability.

One problem that can be simplified using the methods described herein include determining how best to provide good LTE or the like signal coverage indoors. A warehouse-type store or a multi-facility environment is a typical environment. Current solutions include installing micro antennas, often in the ceilings at some model-based distribution algorithm. In contrast, walking around the environment with a 3D real-time mapping device and recording the signal strength at each position can be used to optimize antenna positioning. This multi-modal data could be processed to create, among other things a color-coded volume showing changes in signal strength. Antenna placement could then be optimized by knowing visually where the signal is strong and where it is weak.

Uses of this data could also help with placement of ultra-high bandwidth coverage, such as 5G networks to provide high bandwidth data. Some applications could greatly benefit from these systems that have bandwidths that are up to three orders of magnitude greater bandwidth than Wi-Fi rates. For example, medical imaging and the like could use high-resolution 4K, 8K, and the like cameras, microphones, EKG machines, ultrasound machines, and the like. Ensuring that bandwidth coverage for such devices, while ensuring lower bandwidth coverage elsewhere in an environment may allow real-time remote monitoring and control.

Another use may include providing a localization system utilizing a combination of active and passive sensing modalities to measures local geometry to provide a map that is based on the simultaneous gathering of RF sources that also provides readings of signal strength of RF sources in the environment.

An exemplary multi-modal sensing system may use one or more of each of the following: LIDAR, camera, depth camera, infrared camera, IMU, ultrasonic, Wi-Fi, Bluetooth, temperature sensor, barometer. The LIDAR may be a 1D (single point distance) or a 2D (line) or a 3D LIDAR with mechanical or solid-state means to control the beam. The camera may operate at a high or low frame rate. The camera may be high (e.g., 4K) or low resolution. The depth camera may have long or short range. Such a device operated with the methods and systems described herein may provide accurate measurement with noisy data sources.

With one or more sensors, one may localize on a map that is embedded with data acquired by the same sensors. Once localization is determined, one can retrieve the old data embedded on the map, compare it with the new data to detect environmental changes, e.g. temperature change and color change in the infrared domain. One can also embed the new data on the map, such that a map can have multiple layers, while each layer contains data logged at a different time. Such a procedure provides a record of environmental changes over time, all embedded on a single map.

By performing localization on a map, one can also retrieve the color, texture, and 3D information from the map. Information as such may be helpful for visual assistance to people in determining their self-locations. The information may also be used by a computer software to generate a path to a destination, e.g. a restaurant or café, for guidance of people in GPS occluded areas.

Sensors such as cameras and LIDAR produce signals that can vary considerably in capability and accuracy. Range measurement for example, in some systems can range from meters to sub-millimeters depending on the design, construction, and calibration of these units. Very often there is a trade-off between accuracy and cost.

Other aspects of the methods and systems of multi-modal SLAM-based 3D mapping with additional sensing may include a user interface to facilitate measurements between the means. A user interface tool that allows the measurements by taking the spatial median value of point cloud sub-groups such as walls and providing a measure to another such point cloud structure. The mean-to-mean distance is thus more accurate than any one set of measurements between the two surfaces. The user interface may take the form of a measurement by drawing a line or a curve. The software may then cluster the overlaid points and provide a single line corresponding to the median value of the line.

Another aspect may include combining low-resolution with high-resolution to produce high quality maps. The combination of a lower resolution LIDAR to provide good-enough positioning information with a higher resolution LIDAR to provide high-resolution geometry of the environment combined with high fidelity LIDAR imagery. This combines the use of a lower resolution device to provide good positioning by referencing the maps produced by the higher resolution devices while using the lower resolution device.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

In accordance with some exemplary embodiments, combinations of maps from multiple mapping units may be combined by wireless transmission or file transfers so many mappers update a complete map in real-time. In other embodiments, multiple consumers may be led towards each other to find someone else or for two people to efficiently find each other in the shortest time possible. In other embodiments, paths may be stored for first responders to find people quickly.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "has sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method comprising:
obtaining a map of a 3D geometry of an environment;
receiving a plurality of sensor readings from a device within the environment wherein each of the sensor readings corresponds to at least one non-spatial attribute of a location within the environment; and
matching the plurality of received sensor readings to a representative corresponding location in the map to produce a resulting map of 3D aspects of the environment, the map comprising at least on non-spatial attribute value for each non-spatial attribute at the corresponding location within the environment,
wherein the matching comprises utilizing a plurality of lower resolution sensor readings to determine an approximate sensor location and utilizing a plurality of higher resolution sensor readings to determine a determined sensor location.

2. The method of claim 1, wherein the received plurality of sensor readings correspond to a generally stationary position of the device.

3. The method of claim 1, wherein the received plurality of sensor readings correspond to a movement of the device through the environment.

4. The method of claim 1, wherein each of the sensor readings is derived from at least one of LIDAR, a camera, a depth camera, an infrared camera, an IMU, an ultrasonic sensor, a Wi-Fi sensor, a Bluetooth sensor, a temperature sensor, magnetometer, SONAR, RADAR, X-ray imaging, magnetic resonance imaging, tomography imaging, ground penetrating radar, radioactivity detector, or a barometer.

5. A system comprising:
a device comprising at least one sensor the device adapted to receive a plurality of sensor readings within an environment wherein each of the sensor readings corresponds to at least one non-spatial attribute; and
a processor adapted to obtain a map of a 3D geometry of the environment, the map comprising a plurality of non-spatial attribute values each corresponding to one of a plurality of non-spatial attributes and indicative of a plurality of non-spatial sensor readings acquired throughout the environment, wherein the processor is further adapted to match the plurality of received sensor readings to at least one location in the map,
wherein the matching comprises utilizing a plurality of lower resolution sensor readings to determine an approximate sensor location and utilizing a plurality of higher resolution sensor readings to determine a determined sensor location.

6. The system of claim 5, wherein a portion of the plurality of non-spatial attribute values are determined via an interpolation of the non-spatial sensor readings.

7. The system of claim 6, wherein the interpolation is non-linear.

8. The system of claim 5, wherein the received plurality of sensor readings correspond to a generally stationary position of the device.

9. The system of claim 5, wherein the received plurality of sensor readings correspond to a movement of the device through the environment.

10. The system of claim 5, wherein each of the sensor readings is derived from at least one of LIDAR, a camera, a depth camera, an infrared camera, an IMU, an ultrasonic sensor, a Wi-Fi sensor, a Bluetooth sensor, a temperature sensor, magnetometer, SONAR, RADAR, X-ray imaging, magnetic resonance imaging, tomography imaging, ground penetrating radar, radioactivity detector, or a barometer.

11. A method comprising:
accessing a map comprising a point cloud of an environment comprising a plurality of non-spatial attribute values;
receiving, for each of a plurality of non-spatial attributes, a plurality of non-spatial sensor readings within the environment; and
referencing the received plurality of non-spatial sensor readings to the map resulting in a referenced map,
wherein the referencing comprises utilizing a plurality of lower resolution sensor readings to determine an approximate sensor location and utilizing a plurality of higher resolution sensor readings to determine a determined sensor location.

12. The method of claim 11, wherein a portion of the plurality of non-spatial attribute values are determined via an interpolation of the non-spatial sensor readings.

13. The method of claim 12, wherein the interpolation is non-linear.

14. The method of claim 11, wherein the received plurality of sensor readings correspond to a generally stationary position of a device.

15. The method of claim 11, wherein the received plurality of sensor readings correspond to a movement of a device through the environment.

16. The method of claim 11, wherein each of the sensor readings is derived from at least one of LIDAR, a camera, a depth camera, an infrared camera, an IMU, an ultrasonic sensor, a Wi-Fi sensor, a Bluetooth sensor, a temperature sensor, magnetometer, SONAR, RADAR, X-ray imaging, magnetic resonance imaging, tomography imaging, ground penetrating radar, radioactivity detector, or a barometer.

17. The method of claim 11, wherein the referenced map is a heat map.

18. The method of claim 17, where the heat map is a georeferenced heat map.

19. The method of claim 1, wherein non-spatial attributes include at least one of a radio frequency, a thermal, a visual, an acoustic, an electrical, a magnetic, or a radioactive attribute.

20. The system of claim 5, wherein non-spatial attributes include at least one of a radio frequency, a thermal, a visual, an acoustic, an electrical, a magnetic, or a radioactive attribute.

21. The method of claim 11, wherein non-spatial attributes include at least one of a radio frequency, a thermal, a visual, an acoustic, an electrical, a magnetic, or a radioactive attribute.

* * * * *

UNITED STATES PATENT AND TRADEMARK OFFICE
CERTIFICATE OF CORRECTION

PATENT NO. : 10,989,542 B2
APPLICATION NO. : 16/745775
DATED : April 27, 2021
INVENTOR(S) : Zhang et al.

It is certified that error appears in the above-identified patent and that said Letters Patent is hereby corrected as shown below:

In the Specification

In Column 3, Line 57, delete "Kalmann" and insert -- Kalman --, therefor.

In Column 10, Line 19, delete "322b." and insert -- 322b, --, therefor.

In Column 10, Line 23, delete "in" and insert -- In --, therefor.

In Column 14, Line 58, delete "$X_c = d_c X_c$." and insert -- $X_c = d_c \overline{X_c}$. --, therefor.

In Column 15, Line 3, delete "$-y_c t(1)]$" and insert -- $-\overline{y_c}t(1)]$ --, therefor.

In Column 21, Line 50, delete "$V_V$" and insert -- $\overline{V_V}$ --, therefor.

In Column 21, Line 51, delete "$-V_V$" and insert -- $-\overline{V_V}$ --, therefor.

In Column 21, Line 61, delete "$[(\theta_{c-1}^c)^T,(t_{c-1}^c)^T]^T$." and insert -- $[(\theta'_{c-1}^c)^T,(t'_{c-1}^c)^T]^T$. --, therefor.

In Column 21, Line 62, delete "note" and insert -- Note --, therefor.

In Column 21, Line 67, after "$]^T$" insert -- . --.

In Column 22, Line 8, after "$f_1$" insert -- . --.

In Column 33, Line 28, delete "that that" and insert -- that --, therefor.

In Column 35, Line 59, delete "scan," and insert -- scan. --, therefor.

In Column 36, Line 30, delete "If" and insert -- if --, therefor.

Signed and Sealed this
Twenty-seventh Day of September, 2022

Katherine Kelly Vidal
*Director of the United States Patent and Trademark Office*